United States Patent
Sakai et al.

(10) Patent No.: US 6,358,179 B1
(45) Date of Patent: Mar. 19, 2002

(54) CLUTCH CONTROL DEVICE OF INFINITE VARIABLE SPEED RATIO TRANSMISSION

(75) Inventors: Hiromasa Sakai; Toshikazu Oshidari, both of Yokosuka; Hiroyuki Hirano, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 12 days.

(21) Appl. No.: 09/584,402

(22) Filed: Jun. 1, 2000

(30) Foreign Application Priority Data

Jun. 2, 1999 (JP) .......................... 11-154924
Mar. 30, 2000 (JP) ........................ 2000-094754

(51) Int. Cl.$^7$ ............................................. F16H 37/06
(52) U.S. Cl. ........................................ 475/216; 475/218
(58) Field of Search ............................ 475/208, 209, 475/215, 216, 218

(56) References Cited

U.S. PATENT DOCUMENTS

| 5,063,815 A | * 11/1991 | Oshidari | 477/39 X |
| 5,935,039 A | * 8/1999 | Sakai et al. | 477/37 X |
| 5,980,420 A | * 11/1999 | Sakamoto et al. | 477/50 X |
| 6,287,232 B1 | * 9/2001 | Sakai et al. | 475/216 |

FOREIGN PATENT DOCUMENTS

| JP | 4300449 | * 10/1992 | 475/214 |
| JP | 9-89071 | 3/1997 | |
| JP | 10-267117 | 10/1998 | |
| JP | 10-325459 | 12/1998 | |

* cited by examiner

Primary Examiner—Charles A. Marmor
Assistant Examiner—Ha Ho
(74) Attorney, Agent, or Firm—Foley & Lardner

(57) ABSTRACT

An output shaft (4) of a continuously variable transmission (2) is joined to a sun gear (5A) of a planetary gear mechanism (5), and joined to a final output shaft (6) via a direct mode clutch (10). An output shaft (3C) of a fixed speed ratio transmission (3) is joined to a planet carrier (5B) of the planetary gear mechanism (5) via a power recirculation mode clutch (9). Oil pressure supply to the direct mode clutch (10) and power recirculation mode clutch (9) is controlled by a controller (80) via a mode fixing valve (160). A cam (280) which moves in synchronism with a trunnion (23) of the continuously variable transmission (2) locks the mode fixing valve (160) in a position which shuts off oil supply to one of the clutches (9), (10) when the speed ratio of a continuously variable transmission (2) is smaller than a predetermined value lcC, and releases the lock when the speed ratio of the continuously variable transmission (2) is larger than the predetermined value lcC.

16 Claims, 33 Drawing Sheets

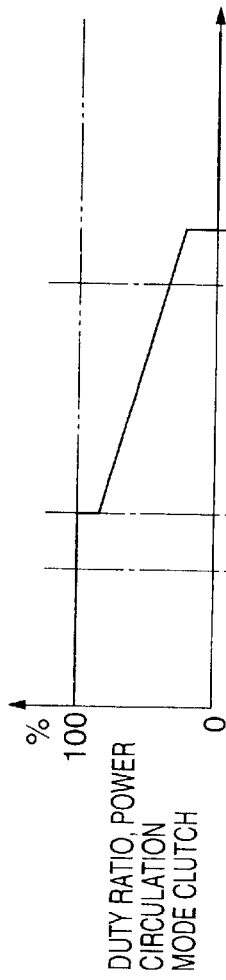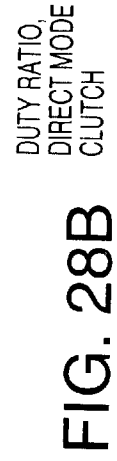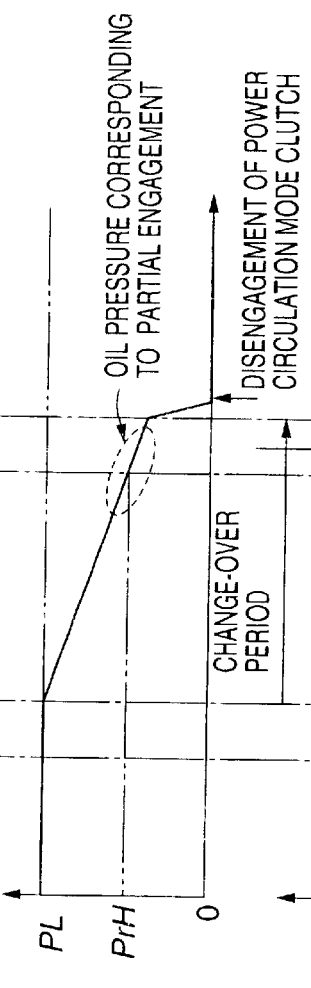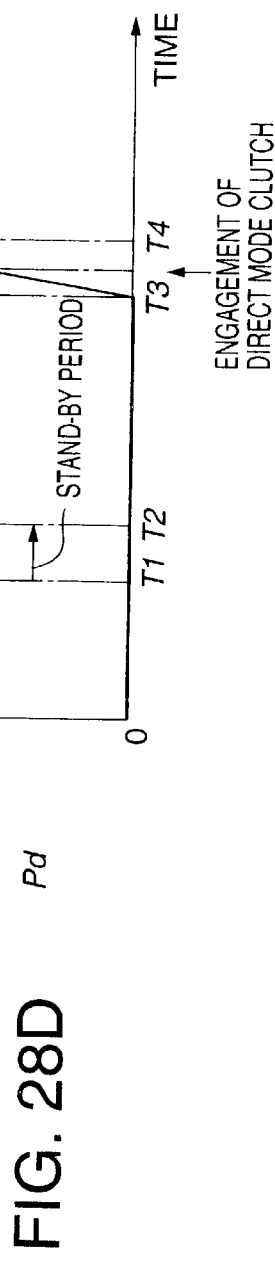
FIG. 28A
FIG. 28B
FIG. 28C
FIG. 28D

CLUTCH CONTROL DEVICE OF INFINITE VARIABLE SPEED RATIO TRANSMISSION

FIELD OF THE INVENTION

This invention relates to control of a clutch used for an infinite variable speed ratio transmission for vehicles.

BACKGROUND OF THE INVENTION

Tokkai Hei 10-325459 published by the Japanese Patent Office in 1998 discloses an infinite variable speed ratio transmission (hereinafter referred to as IVT) wherein a speed ratio is continuously varied to infinity by combining a fixed speed ratio transmission and planetary gear mechanism with a continuously variable transmission (hereinafter referred to as CVT).

In the IVT, the CVT whereof the speed ratio can be changed continuously, and the fixed speed ratio transmission, are respectively joined to an input shaft connected to an engine. The output shaft of the CVT is joined to a sun gear of the planetary gear mechanism, and the output shaft of the fixed speed ratio transmission is joined to a planet carrier of the planetary gear mechanism via a power recirculation mode clutch.

A ring gear of the planetary gear mechanism is connected to a final output shaft so as to extract an output rotation of the IVT.

The rotation output of the CVT can also be directly input to the final output shaft via a direct mode clutch.

In the power recirculation mode wherein the power recirculation mode clutch is engaged and the direct mode clutch is disengaged, the speed ratio of the IVT, i.e., the ratio of the rotation speeds of the input shaft and final output shaft, changes continuously from a negative value to a positive value including infinity according to the difference of the speed ratios of the toroidal CVT and the fixed speed ratio transmission,.

In the direct mode wherein the power recirculation mode clutch is disengaged and the direct mode clutch is engaged, the product of the speed ratio of the CVT and the speed ratio due to a chain which joins the CVT with the sun gear, is the speed ratio of the IVT.

SUMMARY OF THE INVENTION

In the IVT, the clutch pressures of the power recirculation mode clutch and the direct mode clutch are controlled independently except when there is a change-over of mode.

Hence, if the controller which controls the clutch pressure breaks down, or when a valve stick occurs in the oil pressure system which supplies the clutch pressure, both of the clutches may be engaged simultaneously.

When both the power recirculation mode clutch and direct mode clutch are engaged, the IVT forcibly changes the speed ratio so that the rotation speed of the final output shaft in the power recirculation mode coincides with the rotation speed of the final output shaft in the direct mode.

Thus, due to this forced variation of speed ratio, a speed ratio variation unintended by the driver may occur even when the vehicle is running in the power recirculation mode or direct mode.

It is therefore an object of this invention to prevent a speed change unintended by the driver when there is a malfunction of the controller or oil pressure system.

In order to achieve the above object, this invention provides a clutch control device for such an infinite variable speed ratio transmission for a vehicle that comprises an input shaft, a continuously variable transmission which transmits a rotation of the input shaft at an arbitrary speed ratio to a continuously variable transmission output shaft, a fixed speed ratio transmission which transmits the rotation of the input shaft at a fixed speed ratio to a fixed speed ratio transmission output shaft, a planetary gear mechanism having a first rotation member connected to the continuously variable transmission output shaft, a second rotation member connected to the fixed transmission output shaft, and a third rotation member varying a rotation direction and a rotation speed according to a difference of a rotation speed of the first rotation member and a rotation speed of the second rotation member, a direct mode clutch which engages to connect the continuously variable transmission output shaft and the third rotation member, and disengages to disconnect the continuously variable transmission output shaft and the third rotation member according to a supplied oil pressure, and a power recirculation mode clutch which engages to connect the fixed speed ratio transmission output shaft and the second rotation member, and disengages to disconnect the fixed speed ratio transmission output shaft and the second rotation member according to a supplied oil pressure.

The clutch control device comprises a first valve for supplying an oil pressure to the direct mode clutch and power recirculation mode clutch, a mechanism for detecting a running condition of the vehicle, a mechanism for controlling the first valve according to the running condition, and a mechanism for preventing simultaneous engagement of the direct mode clutch and the power recirculation mode clutch by overriding a control of the first valve by the control mechanism when the running condition does not correspond to a predetermined specific region, and permits simultaneous engagement of the direct mode clutch and the power recirculation mode clutch when the running condition corresponds to the predetermined specific region.

The details as well as other features and advantages of this invention are set forth in the remainder of the specification and are shown in the accompanying drawings.

BRIEF DESCRIPTION OF THE DRAWINGS

FIGS. 28A–28D are timing charts describing a change-over of the power recirculation mode clutch and the direct mode clutch according to the eighth embodiment of this invention.

DESCRIPTION OF THE PREFERRED EMBODIMENTS

Figure 1:
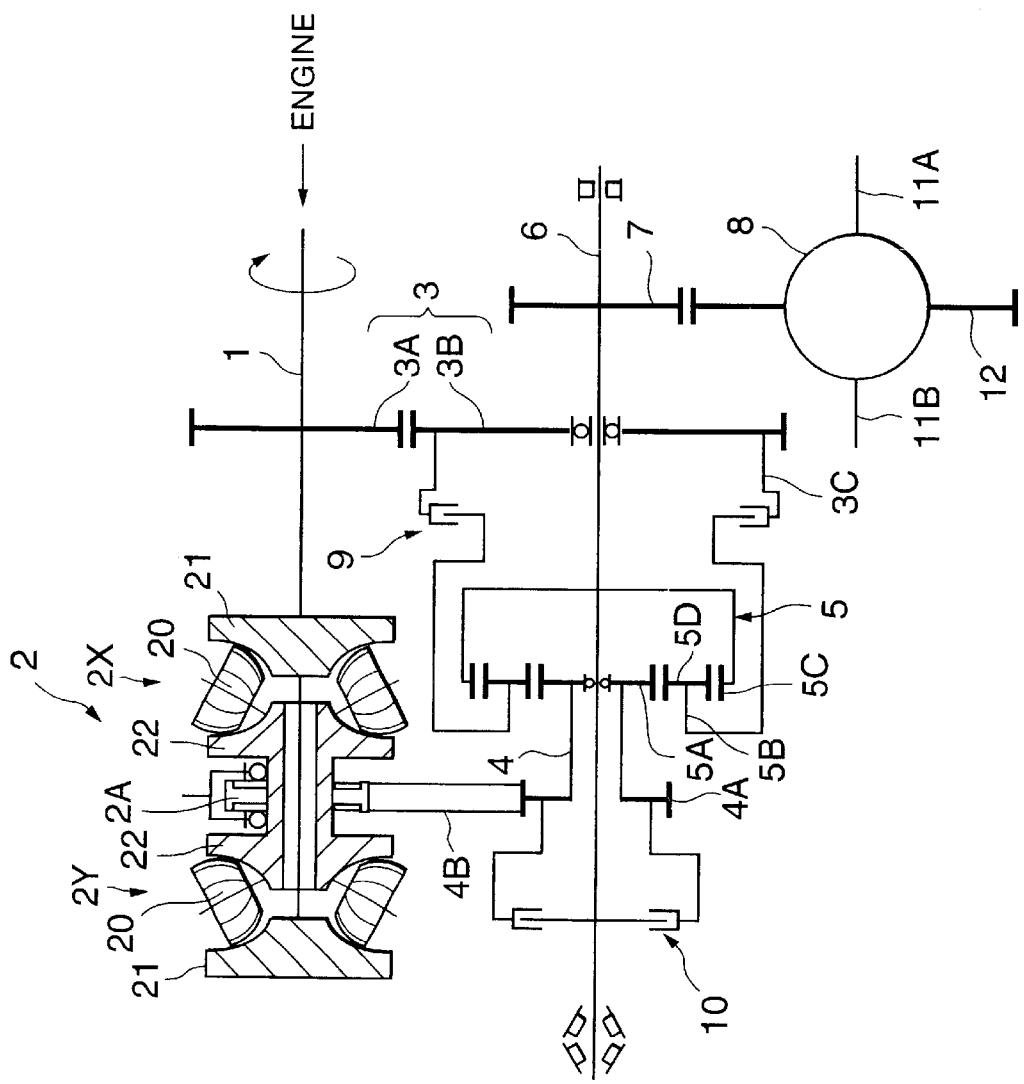
FIG. 1 is a schematic block diagram of an infinite variable speed ratio transmission according to this invention.

Referring to FIG. 1 of the drawings, an infinite variable transmission (hereinafter referred to as IVT) for a vehicle is equipped with an input shaft 1, toroidal continuously variable transmission (hereinafter referred to as CVT) 2, reduction gear 3, planetary gear mechanism 5, and final output shaft 6.

The CVT 2 is equipped with two sets of input disks 21 and output disks 22. In the following explanation, the right pair of the input and output disks 21, 22 in FIG. 1 is referred to as a first toroidal unit 2X, and the left pair of the input and output disks 21, 22 in the figure is referred to as a second toroidal unit 2Y.

In each toroidal unit, a pair of power rollers 20 are gripped between the input disk 21 and output disk 22. The input disks 21 are joined to the input shaft 1. The input shaft 1 is joined to the output shaft of an engine, not shown. The rotation of the output disk 22 is transmitted to a CVT output shaft 4 via a sprocket 2A, chain 4B and sprocket 4A.

The CVT output shaft 4 is joined to a sun gear 5A of a planetary gear mechanism 5, and also joined to a final output shaft 6 via a direct mode clutch 10.

The reduction gear (fixed speed ratio transmission) 3 is equipped with gears 3A, 3B and a gear output shaft 3C which rotate together with the input shaft 1. The gear 3A is meshed with the gear 3B, and the gear 3B is joined to the gear output shaft 3C.

The gear output shaft 3C is joined to a planet carrier 5B carrying planet gears 5D of the planetary gear mechanism 5 via a power recirculation mode clutch 9. A ring gear 5C of the planetary gear mechanism 5 is joined to the final output shaft 6.

The rotation of the final output shaft 6 is transmitted to drive wheels 11A, 11B of the vehicle via a transmission output gear 7, final gear 12, and differential gear 8.

Figure 4:
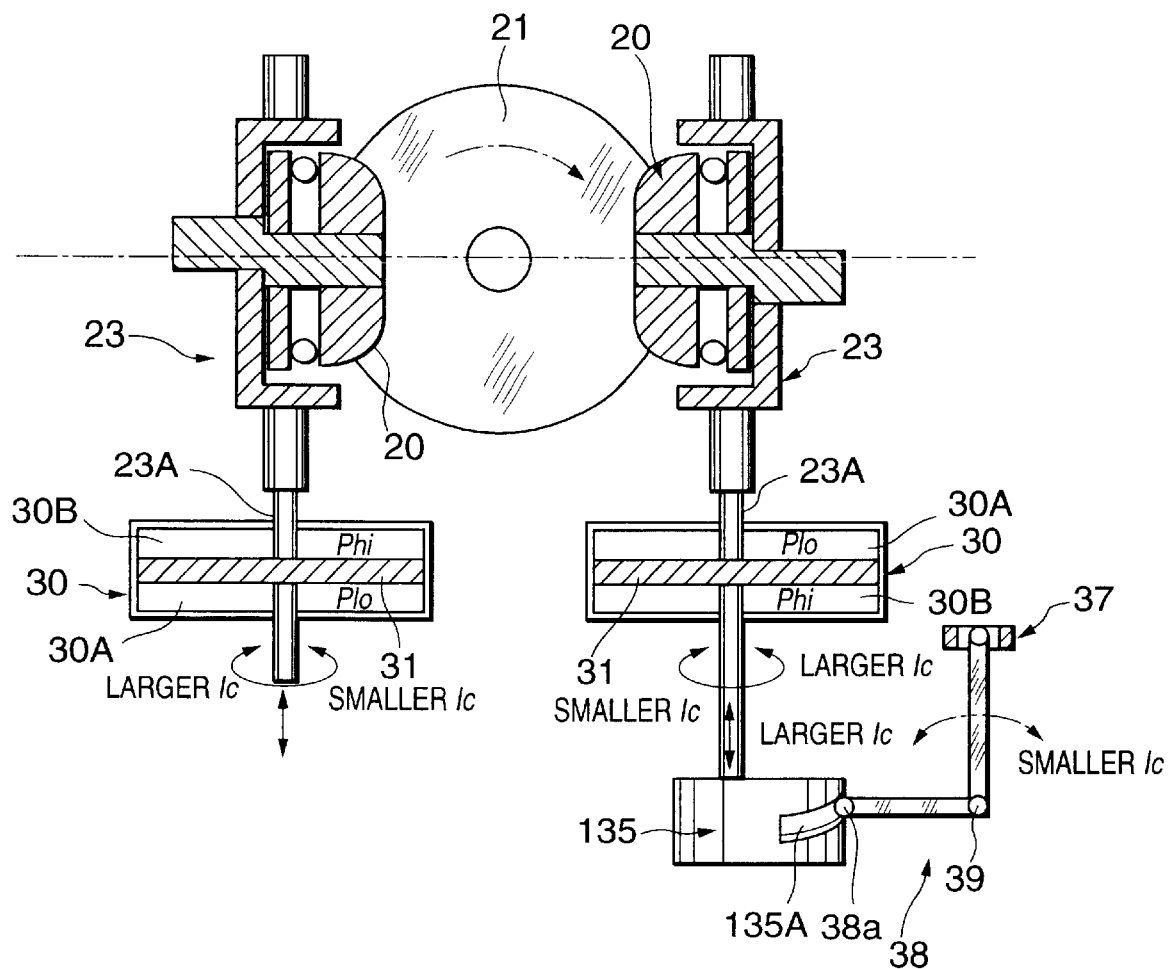
FIG. 4 is a schematic diagram of a toroidal continuously variable transmission according to this invention.

Referring to FIG. 4, the power roller 20 is supported by a trunnion 23 via an eccentric axis 48. The trunnion 23 is driven in the vertical direction of the figure by an oil pressure cylinder 30. The oil pressure cylinder 30 comprises a piston 31 fixed to the trunnion 23, and oil chambers 30A, 30B formed facing the piston 31. The trunnion 23 displaces in an axial direction according to the differential pressure of the oil chambers 30A, 30B, and the contact points of the power roller 20 with the input disk 21 and output disk 22 are thereby varied. As a result, the balance of force around the axis of the trunnion 23 which the disks 21, 22 exert on the power roller 20 changes, and the gyration angle of the power roller 20 changes.

The trunnion 23 also suffers a rotational displacement with the gyration of the power roller 20.

As the gyration angle of the power roller 20 varies, the proportion of rotation transmitted from the input disk 21 to the output disk 22, i.e., the speed ratio, varies continuously.

The oil chamber 30A of one of the trunnions 23 is provided above the piston 31, and the oil chamber 30A of the other trunnion 23 is provided below the piston 31. Similarly, the oil chamber 30B of one of the trunnions 23 is provided below the piston 31, and the oil chamber 30B of the other trunnion 23 is provided above the piston 31. The same oil pressure is supplied to the two oil chambers 30A, and likewise, the same oil pressure is supplied to the two oil chambers 30B. Due to this arrangement of the oil chambers 30A and 30B, the two trunnions 23 are mutually driven in reverse directions.

The CVT 2 is provided with a total of four of the trunnions 23, and a precess cam 135 is attached to one of the trunnions 23 in the second toroidal unit 2Y. An oil pressure is selectively supplied to the oil chambers 30A, 30B from a shift control valve 246 which is a direction change-over valve shown in FIGS. 2 and 3B. The precess cam 135 feeds back the rotation angle of the trunnion 23, i.e., the gyration angle φ of the power roller 20, and the axial displacement of the trunnion 23, to the shift control valve 246. A cam groove 135A inclined in the circumferential direction is formed in the precess cam 135, and one end of an L-shaped feedback link 38 engages with the cam groove 135A.

The feedback link 38 is supported free to pivot around a pivot shaft 39, one of its ends engaging with the cam groove 35A and the other end being connected to one end of a speed change link 37.

Figure 2:
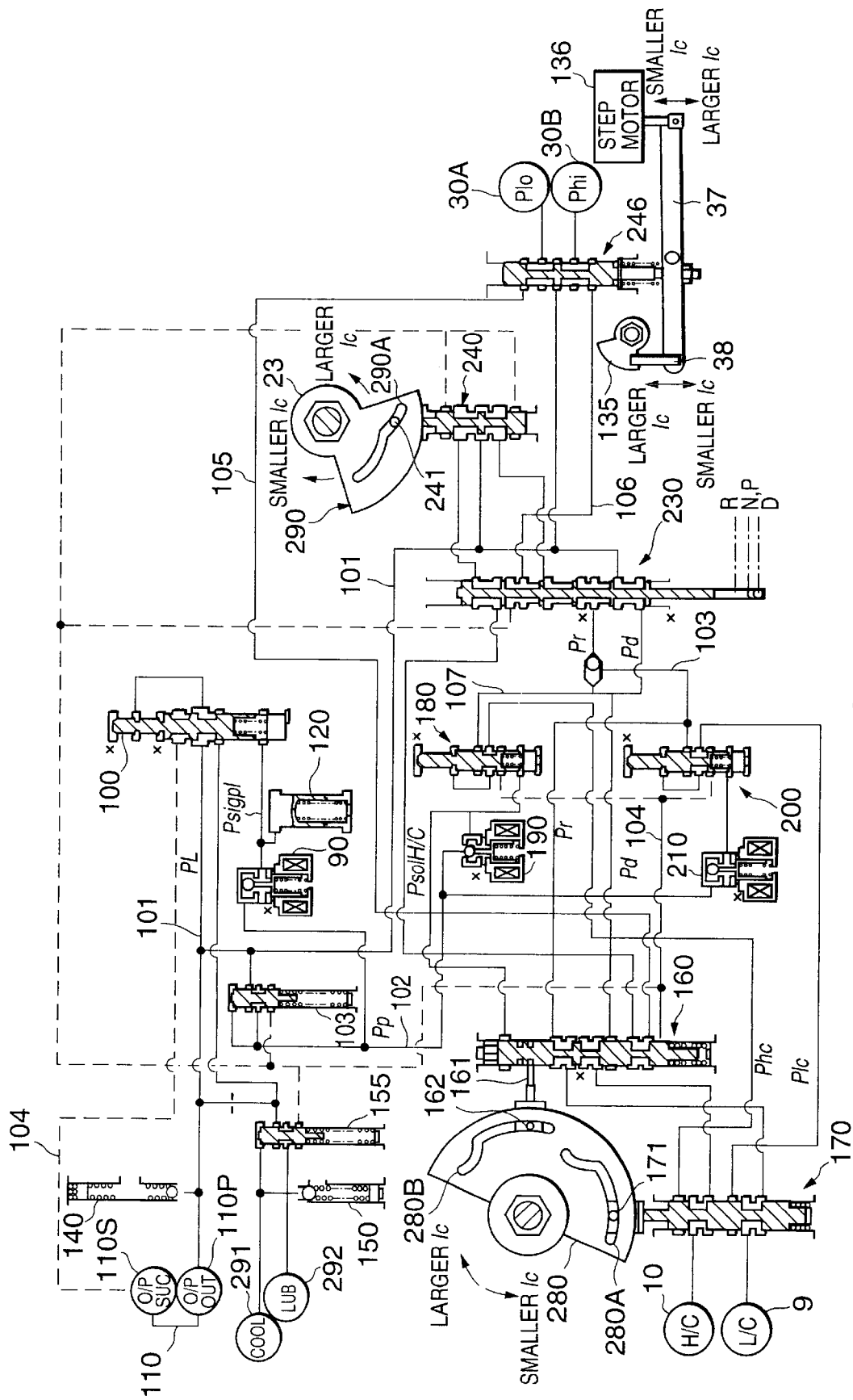
FIG. 2 is an oil pressure circuit diagram of the infinite variable speed ratio transmission.
Figure 3A:
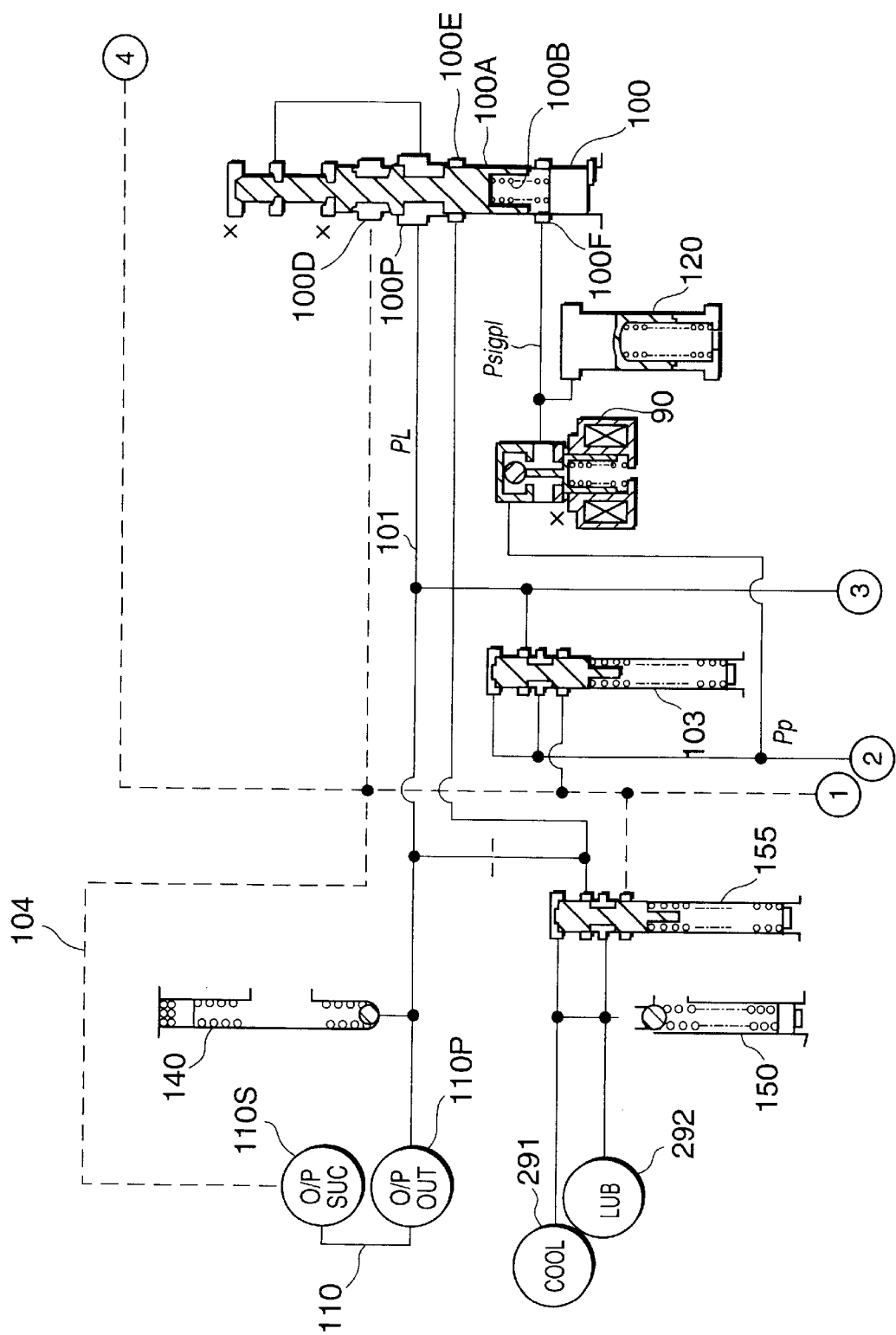
FIGS. 3A–3C are enlarged views of FIG. 2.
Figure 3B:
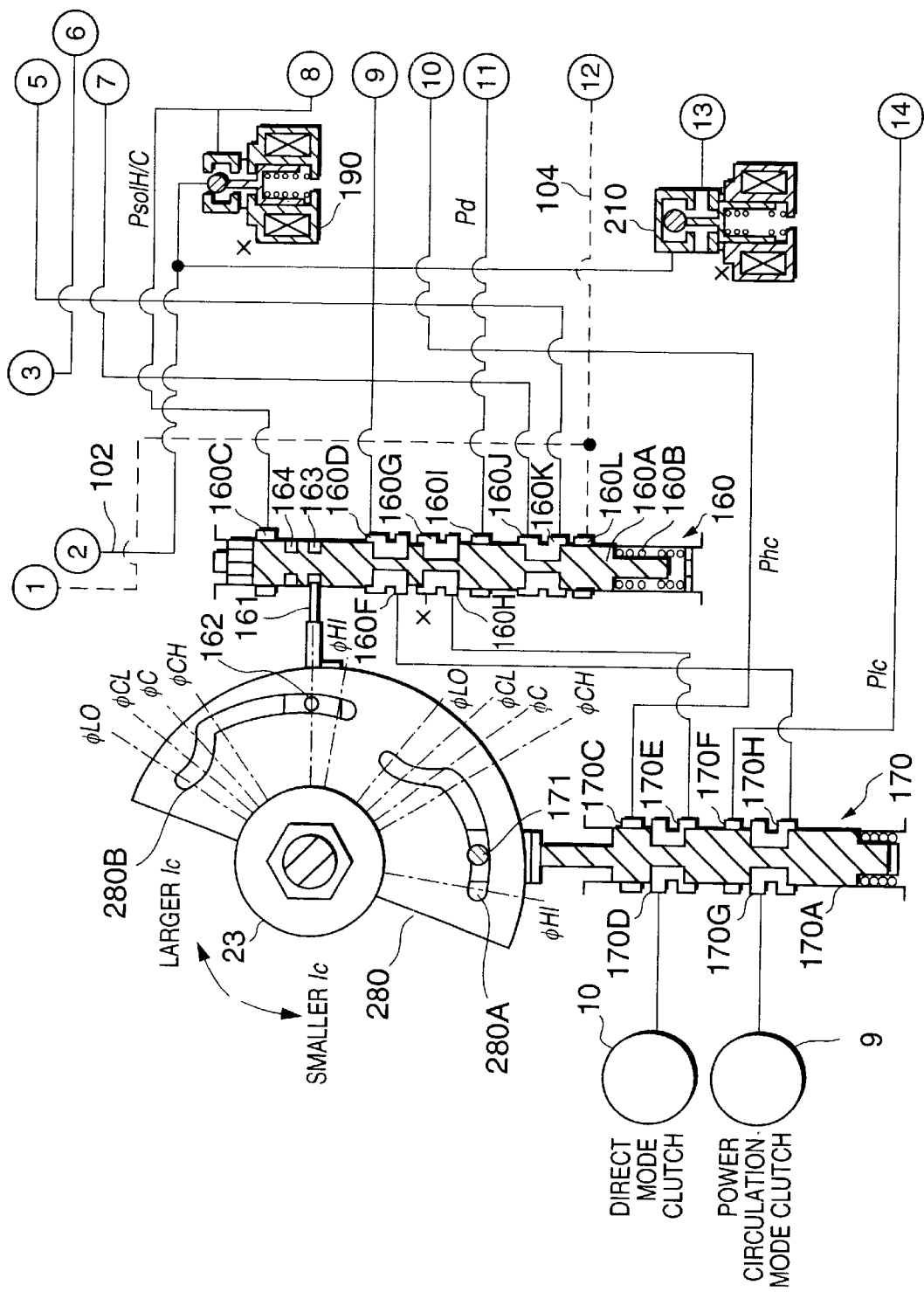

Referring to FIGS. 2 and 3B, the center part of the speed change link 37 is connected to the edge of a spool 246S of the shift control valve 246, and the end on the opposite side of the connecting part with the feedback link 38 is connected to a step motor 136. Due to this arrangement, the speed change link 37 causes the spool 246S to displace in an axial direction according to the drive of the step motor 136, and causes the spool 246S to displace in an axial direction according to the rotational displacement and axial displacement of the precess cam 35. As a result, the spool 246S is maintained in a position where the step motor 36 and the displacement of the precess cam 35 are balanced.

In this IVT, there are two kinds of power transmission modes, i.e., a power recirculation mode wherein the power recirculation mode clutch 9 is engaged and the direct mode clutch 10 is disengaged, and a direct mode wherein the power recirculation mode clutch 9 is disengaged and the direct mode clutch 10 is engaged.

Either of these modes is used to drive the drive wheels 11A and 11B.

In the power recirculation mode, the rotation speed of the planet carrier 5B is equal to a value obtained by dividing the rotation speed of the engine with by the reduction ratio of the reduction gear 3. The reduction ratio of the reduction gear 3 is a fixed value. On the other hand, the rotation speed of the sun gear 5A is equal to a value obtained by dividing the rotation speed of the engine by the speed ratio lc of the CVT 2. The rotation directions of the sun gear 5A and planet carrier 5B are always fixed. Under the above conditions, the rotation direction of the ring gear 5C joined to the final output shaft 6 changes according to the ratio of the rotation speed of the planet carrier 5B and the rotation speed of the sun gear 5C. In other words, it changes with the ratio of the rotation speed of the engine and the rotation speed of the CVT output shaft 4, i.e., with the speed ratio lc of the CVT 2. The change-over point is referred to as a geared neutral point GNP shown in FIG. 31.

At this geared neutral point GNP, the ring gear 5C, i.e., the final output shaft 6, does not rotate, and the vehicle stops.

If the speed ratio lc increases compared to the geared neutral point GNP, the ring gear 5C will rotate in a forward direction, and if the speed ratio lc decreases compared to the GNP, the ring gear 5C will rotate in a reverse direction. That is, forward and reverse motion of the vehicle are changed over by control of the speed ratio lc in the power recirculation mode.

Figure 31:
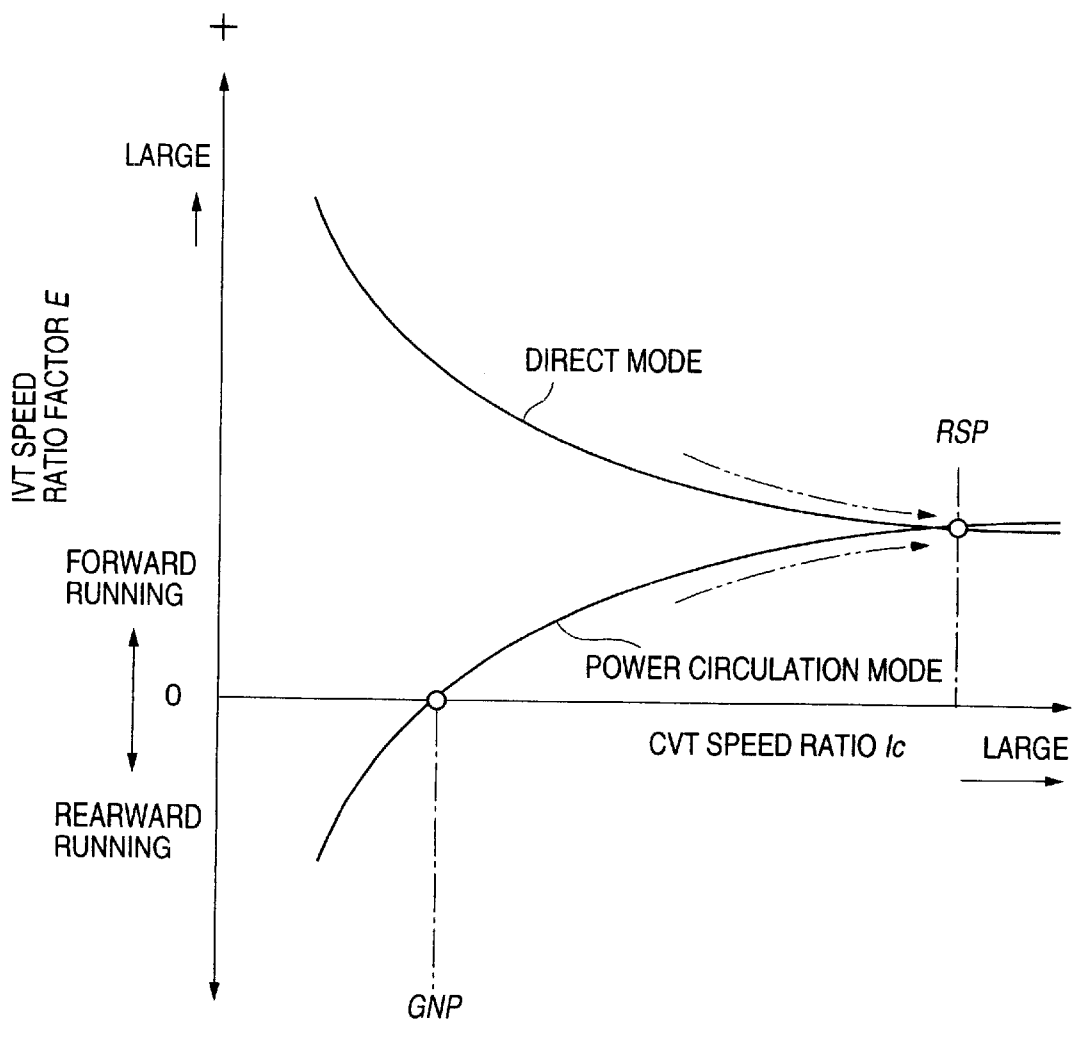
FIG. 31 is a diagram showing a relation between the speed ratio lc of the toroidal continuously variable transmission, and the speed ratio factor E of the infinite variable speed ratio transmission.

When the vehicle moves forward in the power recirculation mode, a speed ratio li of the IVT decreases. If the inverse of the IVT speed ratio li is defined as an IVT speed ratio factor E, the IVT speed ratio factor E increases as the CVT 2 increases the speed ratio lc, as shown in FIG. 31. When the IVT speed ratio factor E reaches a rotation synchronous point RSP, the power recirculation mode clutch 9 and the direct clutch 10 are operated, and the power transmission mode shifts to the direct mode from the power recirculation mode. In the direct mode, as the rotation of the CVT output shaft 4 is directly output to the final output shaft 6, the IVT speed ratio factor E increases as the speed ratio lc of the CVT 2 decreases. That is, the IVT speed ratio factor E is small on startup, and it increases as the vehicle speed increases after startup. On the other hand, the speed ratio lc of the CVT first increases until the rotation synchronous point RSP is reached, and then decreases after changing over from the power recirculation mode to the direct mode at the rotation synchronous point RSP. When the running vehicle is decelerating, the speed ratio lc of the CVT 2 increases, conversely to the behavior during acceleration.

Such a property of the IVT is disclosed by Tokkai Hei 9-89071 published by the Japanese Patent Office in 1997.

When the vehicle is moving forward, it corresponds to the case when a running range D or a sports running range Ds is selected by a selector lever, not shown, with which the vehicle is provided. When the vehicle is moving in reverse, it corresponds to the case when a reverse range R is selected by the selector lever. When the vehicle is moving in reverse, the speed ratio lc is smaller than the geared neutral point GNP, and the IVT speed ratio factor E increases its negative value as the speed ratio lc decreases. That is, the speed ratio li of the IVT approaches zero.

Next, the construction and operation of the oil pressure circuit of the IVT will be described.

This oil pressure circuit comprises a line pressure and lubricating pressure supply system, shift control valve 246, manual valve 230, clutch control valves 180 and 200, inhibitor valve 170, mode fixing valve 160, and reverse torque cutoff valve 240.

1. Line Pressure and Lubricating Pressure System

Referring to FIGS. 2 and 3A, a line pressure PL used for control of the IVT, and oil for lubrication and cooling of the IVT, are supplied by an oil pump 110 and pressure regulator valve 100.

The pressure regulator valve 100 comprises ports 100D, 100E, 100F and a pressure port 100P, and a spool 100A elastically supported by a spring 100B.

A discharge port 110P of the oil pump 110 is led to the pressure port 100P of the pressure regulator valve 100 via a line pressure circuit 101. On the other hand, a signal pressure Psigpl from a solenoid valve 90 is led to the port 100F of the pressure regulator valve 100.

The spool 100A of the pressure regulator valve 100 displaces to a position where this signal pressure Psigpl, the elastic supporting force of the spring 100B and the oil pressure from the discharge port 110P, are balanced. Consequently, the line pressure PL of the line pressure circuit 101 connected to the pressure port 100P is controlled to have a fixed relation with the signal pressure Psigpl.

Figure 5:
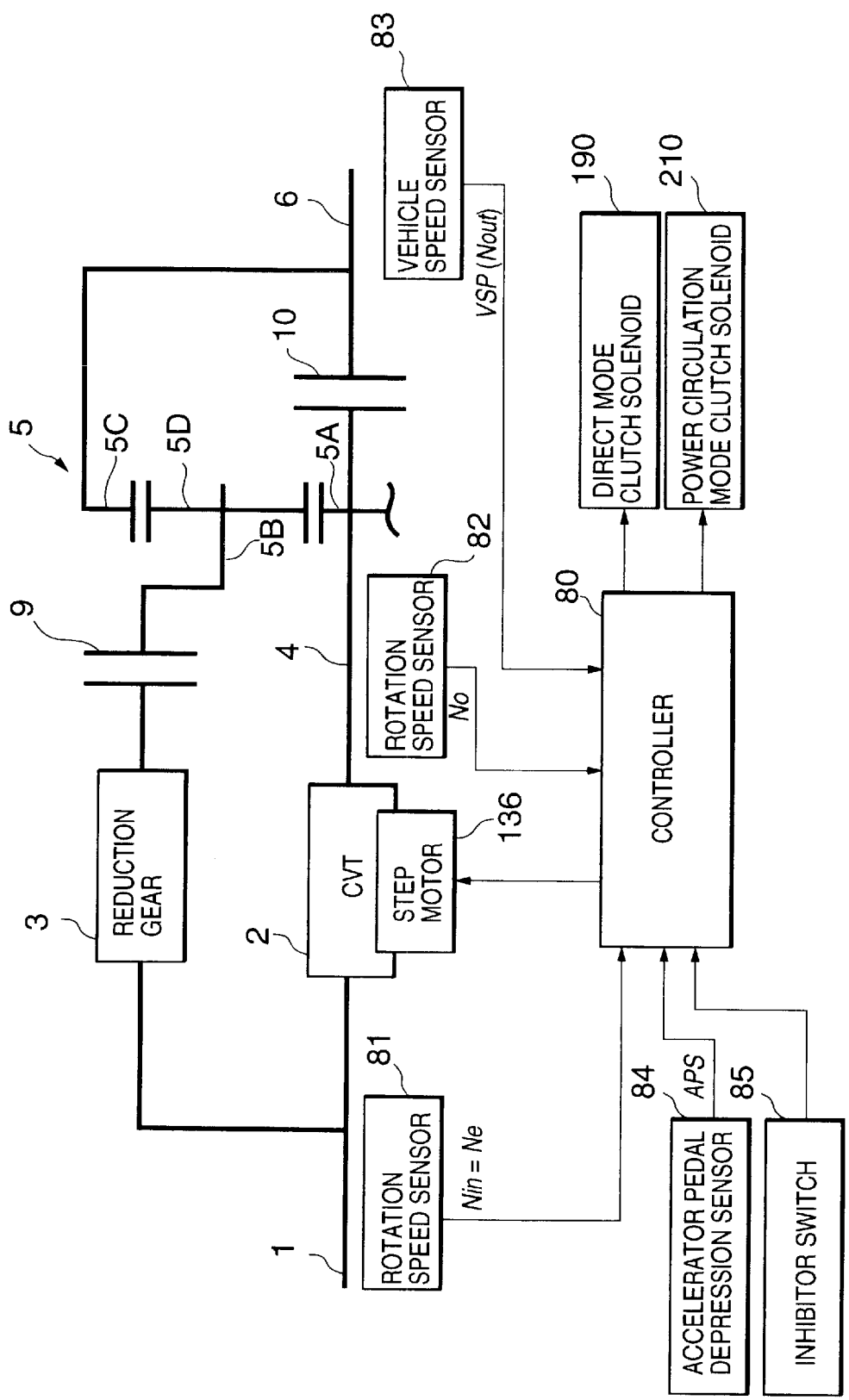
FIG. 5 is a schematic block diagram of a controller according to this invention.

The solenoid valve 90 is controlled by a control unit 80 shown in FIG. 5, and generates the signal pressure Psigpl according to the output signal from the control unit 80 using a pilot pressure Pp from a pilot pressure circuit 102 as an original pressure. The pilot pressure Pp is generated by a pilot valve 103 in proportion to the line pressure PL from the pressure regulator valve 100. An accumulator 120 is interposed between the solenoid valve 90 and the port 100F of the pressure regulator valve 100.

An intake port 110S of the oil pump 110 connects with a pump suction passage 104. If the line pressure PL rises, the drain port 100D of the pressure regulator valve 100 and the pressure port 100P are connected, and the line pressure PL is reduced. Further, when the line pressure PL exceeds a predetermined value, a relief valve 140 operates and the pressure of the line pressure circuit 101 is reduced.

A cooling port 100E of the pressure regulator valve 100 is connected to a cooler 291 of the transmission via a pressure reduction valve 155. The pressure reduction valve 155 prevents the supply pressure to the cooler 291 from exceeding a fixed pressure to protect the pipe system of the cooler 291. Further, a fast action relief valve 150 is provided so that the pressure of the cooler 291 does not rise abnormally even if the pressure reduction valve 155 sticks.

The pressure which is suitably controlled by the pressure reduction valve 155 is also connected to a lubricating mechanism 292 via an orifice.

Thus, each part of the IVT is cooled and lubricated by oil supplied from the cooling port 100E.

The line pressure PL which is regulated by the pressure regulation valve 100 is supplied to the manual valve 230 which responds to the selector lever and the reverse torque cutoff valve 240 which responds to the gyration angle φ of the trunnion 23 via the line pressure circuit 101 and the shift control valve 246 which responds to the step motor 136 and precess cam 135 via the speed change link 37.

2. Shift Control Valve

Figure 3C:
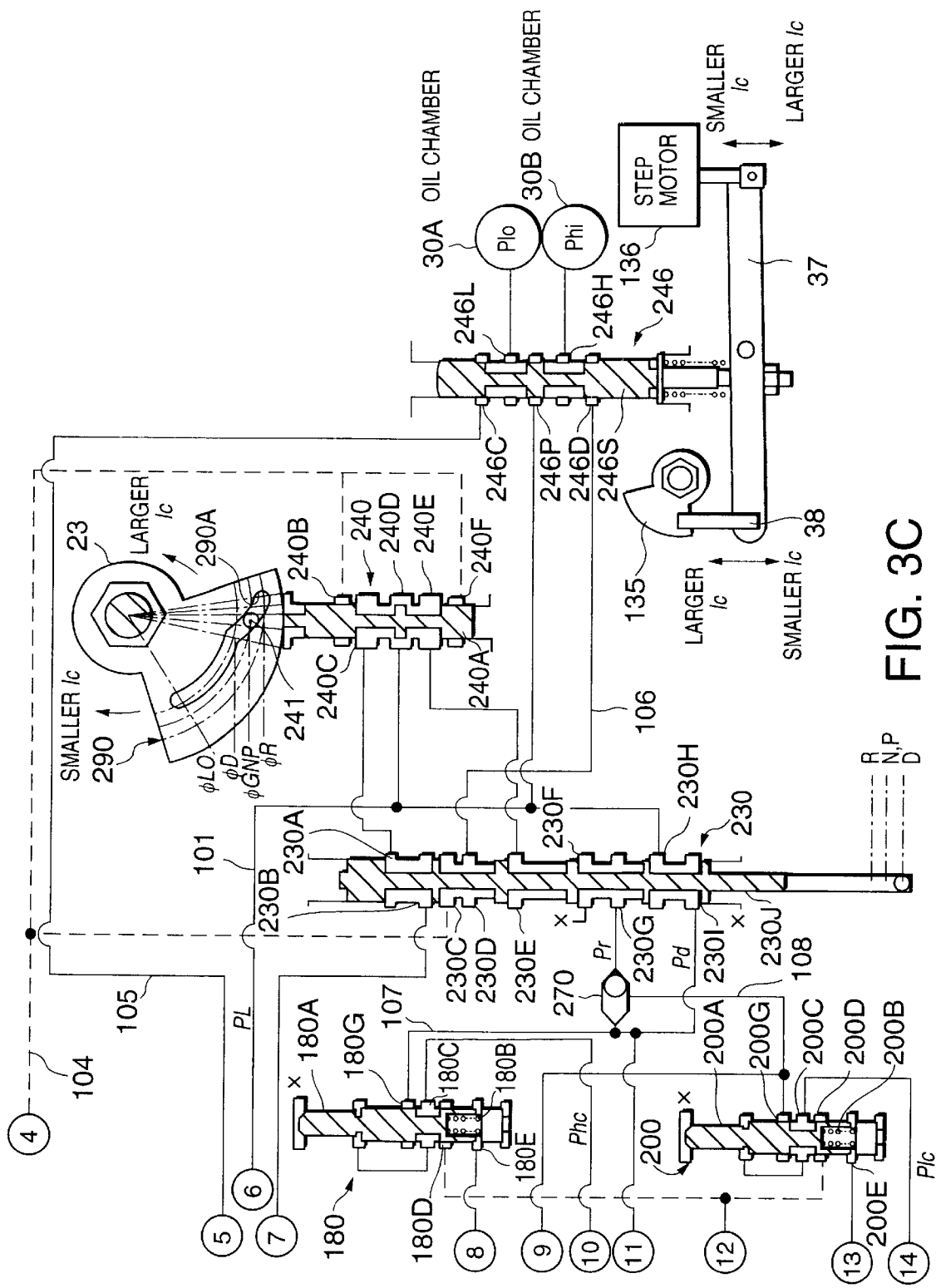

Referring to FIGS. 2 and 3C, the shift control valve 246 comprises a supply port 246P communicating with the line pressure circuit 101, a first port 246H communicating with the oil chamber 30B of the oil pressure cylinder 30, and a second port 246L communicating with the oil chamber 30A of the oil pressure cylinder 30. The shift control valve 246 supplies the line pressure PL to either one of the first port 246H and the second port 246L according to the displacement of the spool 246S connected to the speed change link 37, while connecting the other port to drain ports 246C or 246D.

The drain port 246C communicating with a port 160K of a mode fixing valve 160 via an oil passage 105 is connected to the second port 246L according to the displacement of the spool 246S. The port 246D communicating with a port 230D of the manual valve 230 via an oil passage 106 is connected to the port 246H according to the displacement of the spool 246S.

3. Manual Valve

Referring to FIGS. 2, 3C and 6A–6C, the manual valve 230 is provided with a spool 230J, and ports 230A, 230B, 230C, 230D, 230E, 230F, 230G, 230I facing the spool.

The spool 230J is located in one of three positions, i.e., reverse (R), neutral/parking (N/P) and drive (D), by the operation of a selector lever. That is, when the D range is selected by the selector lever, the spool 230J displaces to the position shown in FIG. 6A, when the N/P range is selected, it displaces to the position shown in FIG. 6B, and when the R range is selected, it displaces to the position shown in FIG. 6C.

In the D range position, the line pressure port 230H communicating with the line pressure circuit 101 is connected to a D range pressure port 230I, and the line pressure PL is supplied to a D range pressure circuit 107 from the D range pressure port 230I.

The R range pressure port 230G communicating with a shuttle valve 270 is connected to the drain port 230F. The shuttle valve 270 supplies the oil pressure of the R range port 230G or D range pressure circuit 107 to the R range pressure circuit 108, whichever is the higher.

When the D range is selected, the valve body of the shuttle valve 270 moves to the right in FIG. 3C, and the line pressure PL is supplied to the R range pressure circuit 108 from the D range pressure circuit 107.

That is, the line pressure PL is supplied to both a direct mode clutch control valve 180 and power recirculation mode clutch control valve 200.

The direct mode clutch 10 and power recirculation mode clutch 9 are engaged by operation of these valves using the line pressure PL.

In the D range position, the manual valve 230 also connects the port 230D to the pump suction passage 104. Further, the port 230A communicating with a port 240C of the reverse torque cutoff valve 240, and the port 230B communicating with a port 160J of the mode fixing valve 160, connect with each other. Thereby, the drain port 246C of the shift control valve 246 is connected to the port 240C of the reverse torque cutoff valve 240 via the oil passage 105 and the mode fixing valve 160. The port 230E of the manual valve 230 communicating with a port 240E of the reverse torque cutoff valve 240, is closed in the D range position.

In the N/P range position, the spool 230J closes the line pressure port 230H. Also, the D range pressure port 230I is released to a drain.

The R range pressure port 230G is connected to the drain port 230F, and both pressures of both the D range pressure circuit 107 and R range pressure circuit 108 are released to the drain. Thereby, supply of the line pressure PL to the direct mode clutch control valve 180 and the power recirculation mode clutch control valve 200 is cut off, and the power recirculation mode clutch 9 and direct mode clutch 10 are released.

The port 230B communicating with the drain port 246C of the shift control valve 246 via the oil passage 105 and the mode fixing valve 160, and the port 230D communicating with the drain port 246C of the shift control valve 246 via the oil passage 106, are both connected to the pump suction passage 104 via the port 230C.

Also, the port 230A communicating with the port 240C of the reverse torque cutoff valve 240, and the port 240E of the reverse torque cutoff valve 240, are both closed.

In the R range position, the spool 230J connects the R range pressure port 230G with the line pressure port 230H, and releases the D range pressure port 230I to the drain.

As a result, the oil pressure of the D range pressure circuit 107 falls, and the line pressure PL is supplied to the R range pressure port 230G.

The valve body of the shuttle valve 270 moves to the left in FIG. 3C, and the line pressure PL is supplied only to the R range pressure circuit 108. Due to this line pressure PL supplied to a pressure port 200G, the power recirculation mode clutch control valve 200 can cause the power recirculation mode clutch 9 to engage. On the other hand, as oil pressure is not supplied to a pressure port 180G of the direct mode clutch control valve 180, the direct mode clutch 10 is released.

The port 230D communicating with the drain port 246D of the shift control valve 246, connects with the port 240E of the reverse torque cutoff valve 240 via the port 230E. As a result, the oil chamber 30B of the oil pressure cylinder 30 and the port 240E of the reverse torque cutoff valve 240 are connected according to the operation of the shift control valve 246.

Likewise, the port 230B communicating with the drain port 246C of the shift control valve 246 via the oil passage 105 and the mode fixing valve 160, is connected to the pump suction passage 104 via the port 230C.

The port 230A communicating with the port 240C of the reverse torque cutoff valve 240 is closed.

4. Clutch Control Valve

The direct mode clutch control valve 180 is provided with a spool 180A supported by a spring 180B, and an output port 180C, a drain port 180D, a signal pressure port 180E and a pressure port 180G facing the spool 180A. The power recirculation mode clutch control valve 200A is provided with a spool 200A supported by a spring 200B, and an output port 200C, a drain port 200D, a signal pressure port 200E and a pressure port 200G facing the spool 200A.

The pilot pressure Pp generated by the pilot valve 103 is supplied to the direct mode clutch solenoid 190 which controls the direct mode clutch control valve 180, and a power recirculation mode clutch solenoid 210 which controls the power recirculation mode clutch control valve 200 via a pilot pressure circuit 102.

The direct mode clutch solenoid 190 and the power recirculation mode clutch solenoid 210 are duty controlled by output signals of the controller 80, and generate signal pressures PsolH/C and PsolL/C from the pilot pressure Pp, which are output, as shown in FIG. 5. The signal pressure PsolH/C is supplied to the port 180E of the direct mode clutch control valve 180, and a signal port 160C of the mode fixing valve 160. The signal pressure PsolL/C is supplied to the port 200E of the power recirculation mode clutch control valve 200.

The D range pressure Pd from the D range pressure circuit 107 is supplied to the pressure port 180G of the direct mode clutch control valve 180. Here, the D range pressure Pd is equal to the line pressure PL.

Also, the drain port 180D of the direct mode clutch control valve 180 is connected to the pump suction passage 104.

Figure 7:
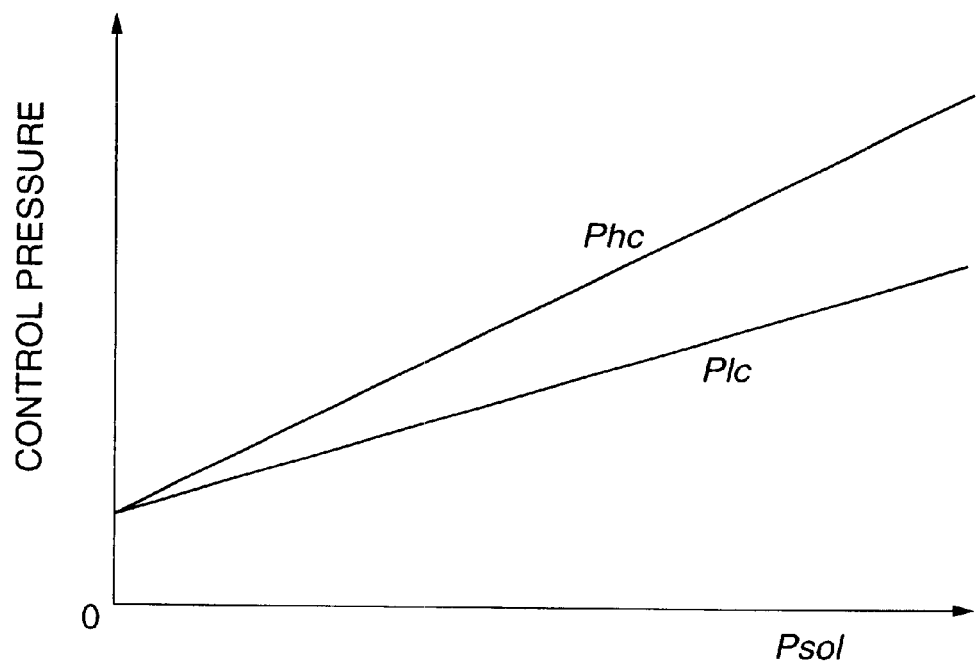
FIG. 7 is a diagram describing a relation between a signal pressure and a clutch pressure according to this invention.

The direct mode clutch control valve 180 connects the pressure port 180G and drain port 180D to the output port 180C in a proportion according to the displacement of the spool 180A. As a result, the D range pressure Pd of the pressure port 180G is reduced, and the reduced pressure is supplied to the output port 180C as a control pressure Phc. The signal pressure PsolH/C of the signal pressure port 180E pushes the spool 180A against the D range pressure Pd of the pressure port 180G together with the spring 180B. Therefore, the control pressure Phc of the output port 180C varies according to the signal pressure PsolH/C, and the control pressure Phc also increases according to increase of the signal pressure PsolH/C, as shown in FIG. 7.

When the signal pressure PsolH/C is zero, the direct mode clutch control valve 180 generates the control pressure Phc equivalent to the elastic supporting force of the spring 180B. This control pressure Phc causes the direct mode clutch 10 to perform a stroke by the amount of an ineffectual stroke, and the engaging force of the clutch is set to a pressure which is almost non-existent.

Likewise, the R range pressure Pr from the R range pressure circuit 108 is supplied to the pressure port 200G of the power recirculation mode clutch control valve 200. Here, the R range pressure Pr is equal to the line pressure PL. Also, the drain port 200D of the power recirculation mode clutch control valve 200 is connected to the pump suction passage 104.

The power recirculation mode clutch control valve 200 connects the pressure port 200G and drain port 200D to the output port 200C in a proportion according to the displacement of the spool 200A. Consequently, the R range pressure Pr of the pressure port 200G is reduced, and the reduced pressure is supplied to the output port 200C as a control pressure Plc. The signal pressure PsolL/C of the signal pressure port 200E pushes the spool 200A against the R range pressure Pr of the pressure port 200G together with the spring 200B. Therefore, the control pressure of the output port 200C varies according to the signal pressure PsolL/C, and the control pressure Plc also increases according to the increase of signal pressure PsolL/C, as shown in FIG. 7.

When the signal pressure PsolL/C is zero, the power recirculation mode clutch control valve 200 generates the control pressure Plc equivalent to the pressing force of the spring 200B. This control pressure Plc causes the power recirculation mode clutch 9 to perform a stroke by the amount of an ineffectual stroke, and the engaging force of the clutch is set to a pressure which is almost non-existent.

Moreover, the control valves 180 and 200 adjust the control pressures Phc and Plc so that the shock is small when there is a running mode change-over.

5. Inhibitor Valve

The control pressures Plc, Phc supplied from the direct mode clutch control valve 180 and the power recirculation mode clutch control valve 200 are supplied respectively to the power recirculation mode clutch 9 and the direct mode clutch 10 via an inhibitor valve 170.

The inhibitor valve 170 is provided with a spool 170A which responds to the gyration angle $\phi$ of the power roller 20. A pin 171 is fixed to the edge of the spool 170A. The pin 171 is engaged with a cam groove 280A of a cam 280. The cam 280 is fixed to the trunnion 23, which is provided with the precess cam 135, and the rotational displacement of the cam 280 is performed according to the gyration angle variation of the power roller 20 so as to displace the spool 170A. The inhibitor valve 170 is provided with a port 170C connected to the output port 180C of the direct mode clutch control valve 180, and a port 170F connected to the output port 200C of the power recirculation mode clutch control valve 200. It is further provided with a port 170E connected to an output port 160H of the mode fixing valve 160, and a port 170H connected to an output port 160F of the mode fixing valve 160. It is still further provided with an output port 170D connected to the direct mode clutch 10 and an output port 170G connected to the power recirculation mode clutch 9.

The output port 170D is selectively connected to the port 170C and port 170E according to the displacement of the spool 170A. The output port 170G is selectively connected to the port 170F and port 170H according to the displacement of the spool 170A.

In FIG. 3B, when the speed ratio lc of the CVT 2 increases, the cam 280 undergoes a rotational displacement in the clockwise direction of the figure, and if the speed ratio lc of the CVT 2 decreases, it undergoes a rotational displacement in the counterclockwise direction.

Figure 9:
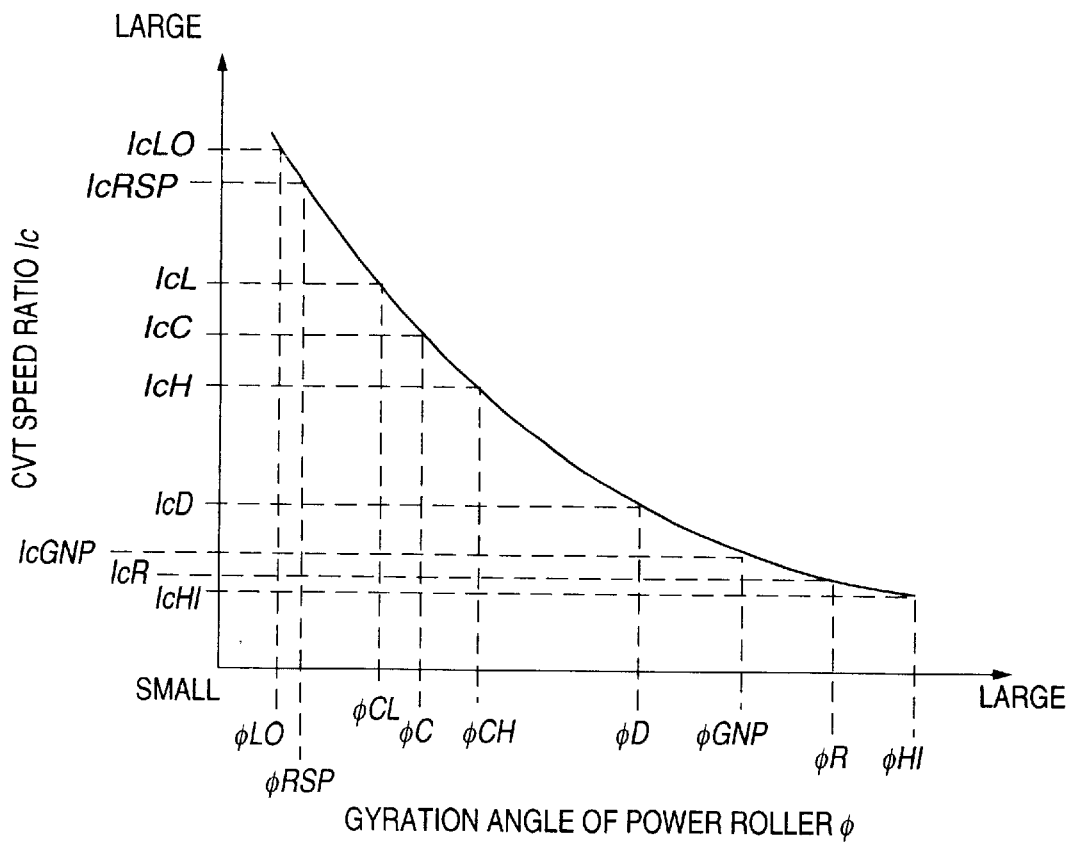
FIG. 9 is a diagram showing the contents of a map specifying the relation of a gyration angle φ of power rollers and a speed ratio lc of the toroidal continuously variable transmission stored by the controller.

The relation of the speed ratio lc of the CVT 2 and the gyration angle $\phi$ of the power roller 20 is such that the gyration angle $\phi$ decreases when the speed ratio lc increases, and the gyration angle $\phi$ increases when the speed ratio lc of the CVT 2 decreases, as shown in FIG. 9. The range of gyration angle $\phi$ used for control of the speed ratio lc of the CVT 2 is set from a gyration angle $\phi$LO corresponding to the maximum value of the speed ratio lc of the CVT 2 to a gyration angle $\phi$Hl corresponding minimum value of the speed ratio lc of the CVT 2. $\phi$Hl is larger than $\phi$LO.

When the gyration angle $\phi$ of the power roller 20 changes in the direction which increases the speed ratio lc of the CVT 2, the cam groove 280A of the cam 280 displaces clockwise in FIG. 3B, and the spool 170A is made to displace upward in the figure. The cam groove 280A is formed corresponding to the gyration angle variation from φLO to φHl, but the spool 170A displaces only when the cam 280 undergoes a rotational displacement between φCL and φCH. The shape of the cam groove 280A is such that a displacement is not performed in a region where the speed ratio lc is larger than φCL, or in a region where the speed ratio lc is smaller than φCH.

Figures 8A, 8B, 8C, 8D, 8E, 8F:
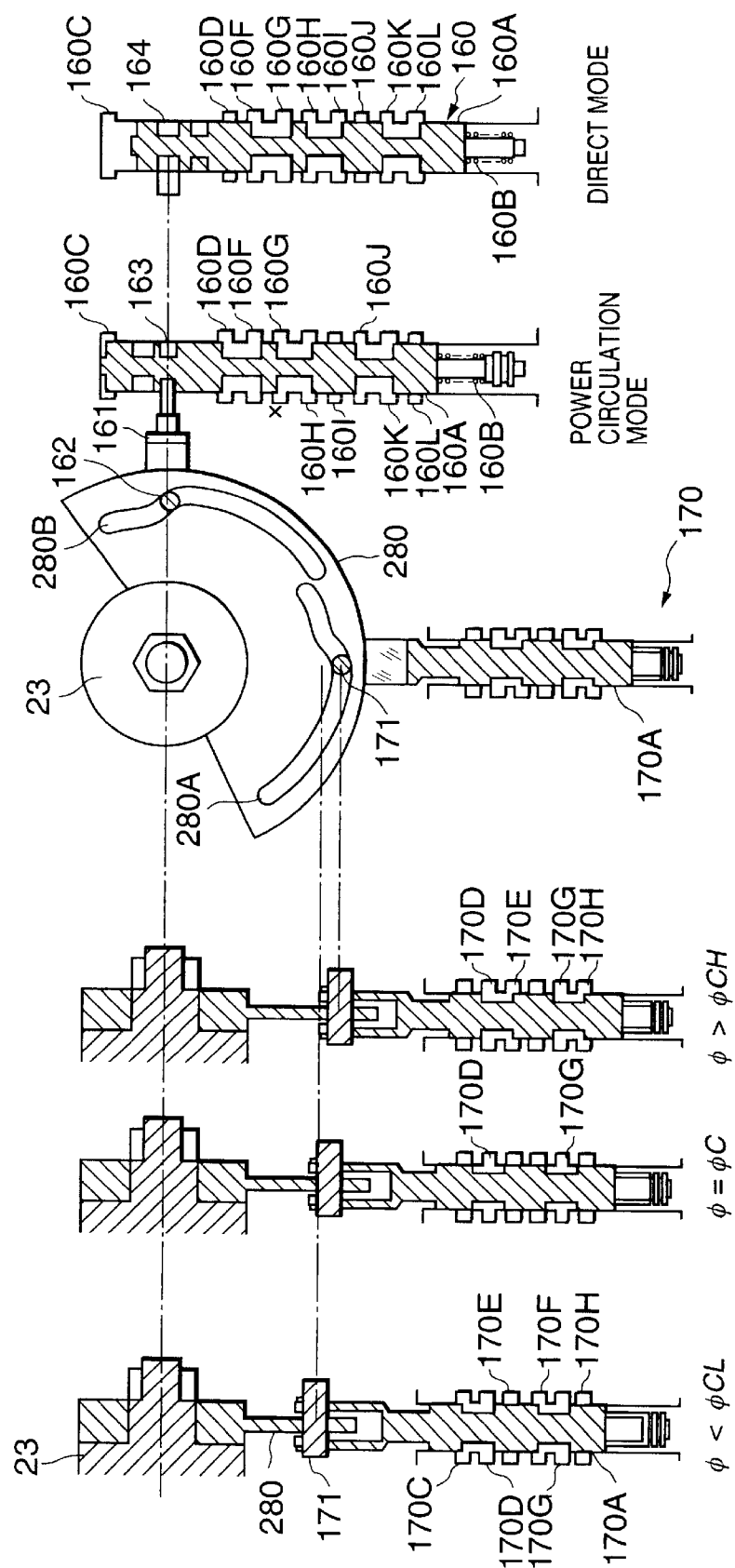
FIGS. 8A–8F are diagrams describing relations between a cam rotation position, and the operating state of an inhibitor valve and a mode fixing valve, according to this invention.

When the pin 171 is in the range of φLO to φCL in FIG. 3B, the spool 170A connects the port 170C to the port 170D, and connects the port 170F to the output port 170G, as shown in FIG. 8A. As a result, the control pressure Phc is supplied to the direct mode clutch 10 from the direct mode clutch control valve 180. The control pressure Plc from the power recirculation mode clutch control valve 200 is supplied to the power recirculation mode clutch 9.

When the pin 171 is in the region from φCH to φHl in FIG. 3B, the port 170E connects with the output port 170D, and the port 170F connects with the output port 170G, as shown in FIG. 8C. As a result, the direct mode clutch 10 connects with the output port 160H of the mode fixing valve 160. The power recirculation mode clutch 9 connects with the output port 160F of the mode fixing valve 160.

When the pin 171 is in the region φC of FIG. 3B, the output ports 170D, 170G are closed, and the direct mode clutch 10 and power recirculation mode clutch 9 both maintain the engaged state or disengaged state as shown in FIG. 8B. The gyration angle φC corresponds to the speed ratio lc=lcC of the CVT 2, as shown in FIG. 9. Let this speed ratio lcC be a first speed ratio.

When the gyration angle is smaller than φC, i.e., when the speed ratio lc of the CVT 2 is larger than lcC, the inhibitor 170 therefore supplies the control pressures Phc, Plc to the power recirculation mode clutch 9 and direct mode clutch 10.

When the gyration angle is larger than φC, i.e., when the speed ratio lc of the CVT 2 is smaller than lcC, the line pressure PL is supplied to the power recirculation mode clutch 9 or the direct mode clutch 10 and the pressure in the other clutch is released to the drain according to the position of the spool 160A of the mode fixing valve 160.

Consequently, when the gyration angle of the power roller 20 is smaller than φC, engagement and disengagement of the power recirculation mode clutch 9 and the direct mode clutch 10 can be performed as desired.

On the other hand, when the gyration angle of the power roller 20 is larger than φC, only one of the power recirculation mode clutch 9 and direct mode clutch 10 can be engaged and the other clutch is disengaged. That is, the when the gyration angle of the power roller 20 is larger than φC, the operating mode is determined by the position of the spool 160A of the mode fixing valve 160.

Figure 10:
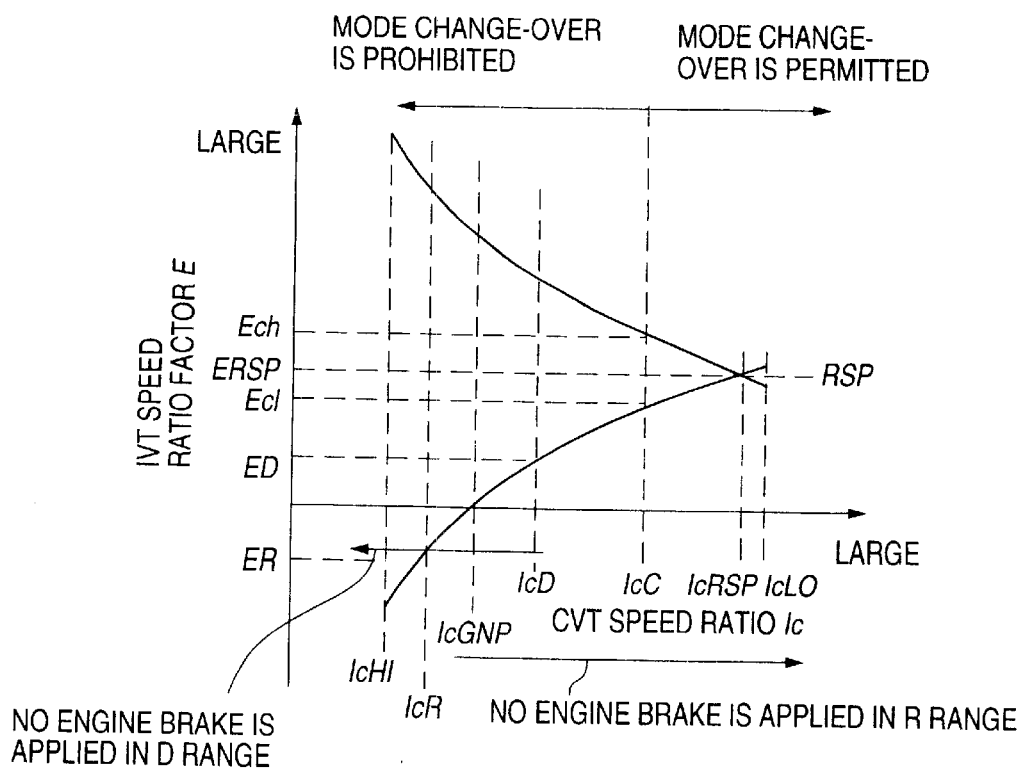
FIG. 10 is a diagram showing the contents of a map specifying the relation of the speed ratio lc of the toroidal continuously variable transmission and a speed ratio factor E of the infinite variable speed ratio transmission stored by the controller.

Now, the relation between the operating mode and the IVT speed ratio factor E will be considered. The relation between the speed ratio lc of the CVT 2 and the IVT speed ratio factor E is shown in FIG. 10.

In the power recirculation mode, the IVT speed ratio factor Ecl corresponds to the first speed ratio lcC of the CVT 2, and in the direct mode, the speed ratio Ech corresponds to the first speed ratio lcC of the CVT 2. As shown in this figure, when the speed ratio lc of the CVT 2 is larger than the first speed ratio lcC, the running mode can be changed over by operating the power recirculation mode clutch 9 and the direct mode clutch 10, and when the speed ratio lc of the CVT 2 is smaller than the first speed ratio lcC, engaging of only one of the power recirculation mode clutch 9 and the direct mode clutch 10 is permitted while change-over of running mode is prohibited.

Supply of the control pressure Plc by the inhibitor valve 170 to the power recirculation mode clutch 9 via the power recirculation mode clutch control valve 200 is limited to the case when the speed ratio lc of the CVT 2 is larger than lcC. In other words, it is restricted to the case when the IVT speed ratio factor E is larger than Ecl. Therefore, control of the control pressure Plc is required of the power recirculation mode clutch control valve 200 only when the IVT speed ratio factor E is larger than Ecl.

Figure 15:
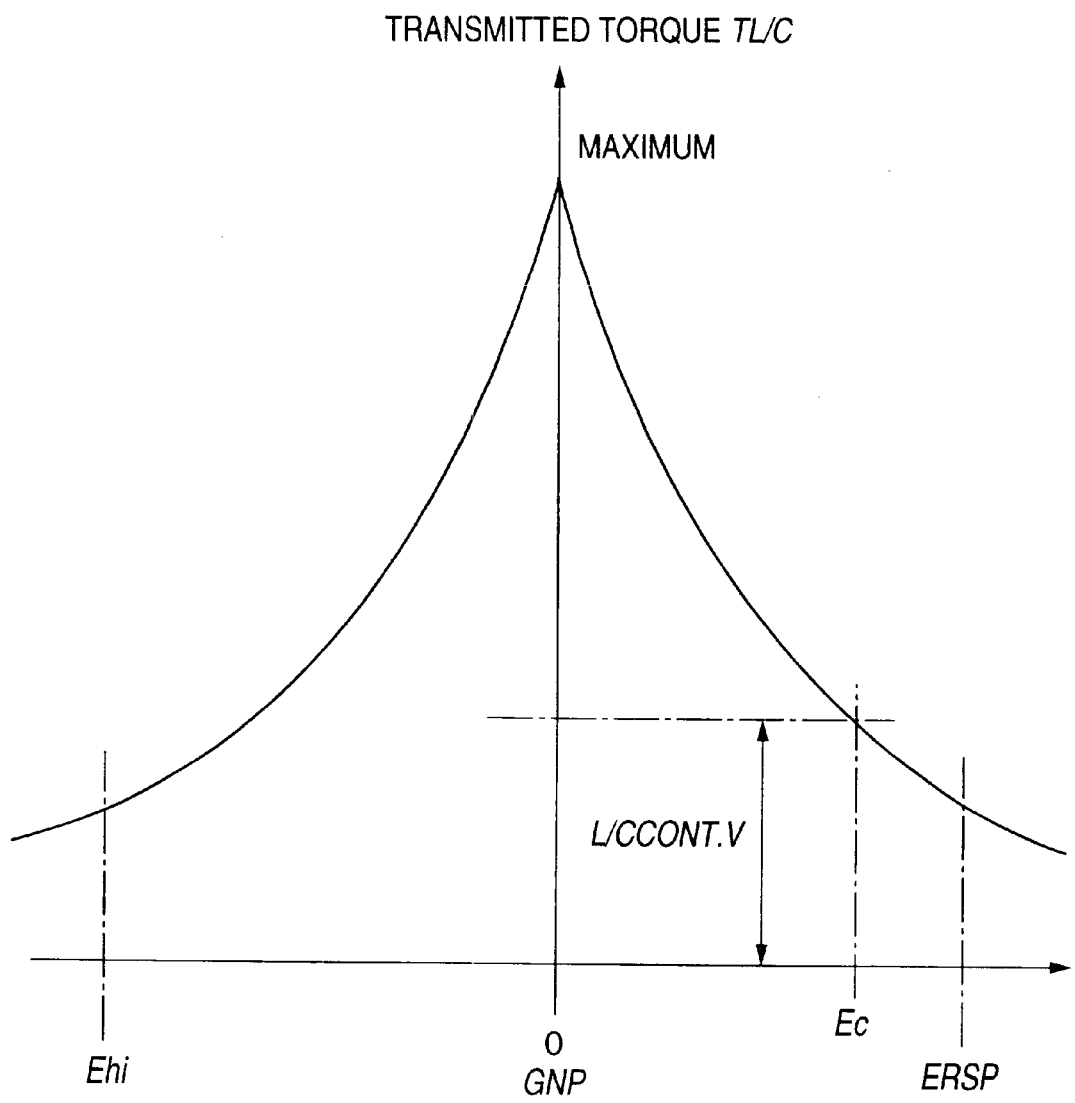
FIG. 15 is a diagram describing the relation of the speed ratio factor E of the infinite variable speed ratio transmission and a transmitted torque of the power recirculation mode clutch according to this invention.

FIG. 15 shows the relation of the IVT speed ratio factor E and the transmitted torque TL/C of the IVT in the power recirculation mode, and the power recirculation clutch 9. As seen from this diagram, the transmitted torque TL/C of the power recirculation clutch 9 is a maximum at the geared neutral point GNP. The left side of the GNP in the diagram shows the characteristics when reversing and the right side shows the characteristics when moving forward. Therefore, the transmitted torque TL/C when the vehicle is moving forward decreases as the IVT speed ratio factor E increases.

If the IVT speed ratio factor E is larger than Ecl, it means that the transmitted torque TL/C is less than the required transmitted torque L/CCONT.V shown in the diagram. Therefore, the oil pressure control range of the power recirculation mode clutch control valve 200 is smaller than L/CCONT.V. This contributes to decreasing the scatter in the control pressure Plc and increasing control precision, and it improves the precision of change-over control of the running mode. It is also useful also for reducing shock when the running mode is changed over.

6. Mode Fixing Valve

Referring to FIG. 3B, the change-over valve 160 permits change-over of the running mode by controlling the oil pressure supplied to the ports 170E, 170H of the inhibitor valve 170.

The mode fixing valve 160 comprises the spool 160A which responds to a signal pressure PsolH/C from the direct mode clutch solenoid 190.

Along with the signal port 160C, the ports 160J and 160K, and the output ports 160F and 160H, the valve is further provided with ports 160D, 160L, 160I and a drain port 160G facing the spool 160A.

The signal pressure PsolH/C from the direct mode clutch solenoid 190 is led to the signal port 160C. The spool 160A is held in a position where the signal pressure PsolH/C and the elastic supporting force of the spring 160B balance.

In the state where the signal pressure PsolH/C is low, and the spool 160A is pushed up by the spring 160B, the output port 160D connects with the output port 160F, the output port 160H connects with the drain port 160G, and the port 160K connects with the output port 160J, as shown in FIG. 8D.

As a result, the output port 160D communicating with the R range pressure circuit 108 is connected to the line circuit 101 via the manual valve 230 when the manual valve 230 is in either the R range position or D range position.

The output port 160F communicating with the port 170H of the inhibitor valve 170 is connected to the power recirculation mode clutch 9 according to the operation of the inhibitor valve 170.

The output port 160H communicating with the port 170E of the inhibitor valve 170 is connected to the direct mode clutch 10 according to the operation of the inhibitor valve 170. Also, the port 160K is connected with the drain port 246C of the shift control valve via the oil passage 105.

Also, the port 160J communicating with the port 230B of the manual valve 230 is connected to the 240C of a reverse torque cutoff valve 240 according to the operation of the manual valve 230.

On the other hand, when the spool 160A is moved down to the lower part of the diagram by the signal pressure PsolH/C, the port 160I connects with the output port 160H, the output port 160F connects with the drain port 160G, and the port 160K connects with a port 160L, as shown in FIG. 8E. The port 160I connects with the D range pressure circuit 107, and the port 160L connects with the pump suction passage 104.

As mentioned above, the spool 160A displaces between two displacement positions, i.e., a raised position and a lowered position.

The IVT comprises a lock mechanism driven by a cam 280 to fix the spool 160A in one of these positions.

The lock mechanism is provided with a slider 161 shown in FIGS. 2, 3B and 8D, and FIGS. 11A–11D. A pin 162 is implanted at one end of the slider 161. The pin 162 engages with a cam groove 280B formed in the cam 280.

Grooves 163, 164 which receive the other end of the slider 161 are formed in the spool 160A.

The cam groove 280B adjoins the cam groove 280A formed in the same cam 280. As shown in FIG. 11A–11D, the cam 280 displaces the slider 161 via the pin 162 according to the gyration angle $\phi$ of the power roller 20. Hence, when the slider engages with the slot 163 or the slot 164 according to the position of the spool 160A, the axial displacement of the spool 160A is stopped.

The groove 163 is formed above the groove 164 as shown in FIG. 3B.

In the power recirculation mode, as it is not necessary to engage the direct mode clutch 10, the direct mode clutch solenoid 190 does not generate the signal pressure PsolH/C, and oil pressure is not supplied to the signal port 160C. Therefore, the spool 160A will be in the state where it is pushed up by the spring 160B shown in FIG. 8D.

In this state, the R range pressure Pr, i.e., the line pressure PL, is led to the port 170H of the inhibitor valve 170 via the output port 160F, port 160D, and R range pressure circuit 108. Also, the output port 170E is released to the drain via the output port 160H and the drain port 160G.

The drain port 246C of the shift control valve 246 connects with the port 230B of the manual valve 230 via the oil passage 105 and the ports 160K, 160J of the mode fixing valve 160. In the D range, the port 230B also connects with the port 240C of the reverse torque cutoff valve 240 via the port 230A. In the R range, the port 230B connects with the pump suction passage 104.

In the direct mode, in order to engage the direct mode clutch 10, the signal pressure PsolH/C is generated by the direct mode clutch solenoid 190, and the signal pressure PsolH/C is supplied to the signal port 160C.

Due to the signal pressure PsolH/C, the spool 160A of the mode fixing valve 160 is moved down to the lower part of the diagram against the spring 160B, as shown in FIG. 8E.

In this position, the D range pressure Pd is led to the port 170E of the inhibitor valve 170 via the output port 160H, port 160I, and D range pressure circuit 107, and the port 170H is released to the drain via the output port 160F and the drain port 160G.

The drain port 246C of the shift control valve 246 connects with the pump suction passage 104 via the oil passage 105, and the ports 160K, 160L of the mode fixing valve 160.

Next, the gyration angle $\phi$ of the power roller 20 and the lock mechanism of the mode fixing valve 160 will be described.

In FIG. 3B, when the gyration angle $\phi$ of the power roller 20 decreases, i.e., if the speed ratio lc of the CVT 2 increases, the cam groove 280B drives the slider 161 to the right of the figure during the period when the gyration angle $\phi$ varies from the predetermined gyration angle $\phi$CL to the predetermined gyration angle $\phi$CH.

As a result, the slider 161 slides into the groove 163 or the groove 164 of the spool 160A. When the gyration angle is larger than $\phi$CH, the slider 161 is held in the state where it has entered the groove 163 or the groove 164. When the gyration angle is smaller than $\phi$CL, the slider 161 is held in the retracted position wherein it does not slide into the groove 163 or the groove 164.

In the state where the slider 161 has slid into the groove 163 or the groove 164, displacement of the spool 161 is prevented and change-over of the operating mode due to operation of the mode fixing valve 160 is prohibited.

On the other hand, when the slider 161 is in the retracted position where it does not slide into the groove 163 or the groove 164, the spool 160A can be displaced according to the signal pressure PsolH/C. That is, a change-over of operating mode is permitted.

The shape and dimension of the groove 280A is determined such that the gyration angle $\phi$C at which the slider 161 starts sliding into the groove 163 or the groove 164 corresponds to the above-mentioned first speed ratio lcC. When the gyration angle of the power roller 20 is larger than this gyration angle $\phi$C, i.e., when the speed ratio lc of the CVT 2 is smaller than the first speed ratio lcC, the displacement of the spool 160A is stopped. When, on the other hand, the gyration angle is smaller than $\phi$C, i.e., when the speed ratio lc of the CVT 2 is larger than the first speed ratio lcC, the slider 161 is out of the groove 163 or the groove 164, so the spool 160A can be displaced according to the signal pressure PsolH/C.

This lock mechanism drives the slider 161 only in the region between $\phi$CL and $\phi$CH, and the slider 161 is simply held where it is in the other regions.

Due to this setting, the stroke of the slider 161 can be reduced and the lock mechanism can be made more compact.

7. Reverse Torque Cutoff Valve

Referring to FIG. 3C, the reverse torque cutoff valve 240 comprises the spool 240A and the aforementioned ports 240C and 240E, a line pressure port 240D, a port 240B and a port 240F facing the spool 240A.

A pin 241 is implanted at one end of the spool 240A. The pin 241 engages with the cam groove 290A of the cam 290 fixed to the same trunnion 23 that is provided with the cam 280. When the trunnion 23 rotates in the direction in which the speed ratio lc of the CVT 2 increases, the cam groove 290A lifts the spool 240A in the upper direction of the figure via the pin 241, and when the trunnion 23 rotates in the reverse direction, the spool 240A is pushed in the downward direction of the figure.

The spool 240A is driven when the gyration angle of the power roller 20 is between $\phi$D and $\phi$R The angles $\phi$D and $\phi$R are set on both sides and in the vicinity of the gyration angle $\phi$GNP corresponding to the geared neutral point GNP.

The relation between the gyration angle $\phi$GNP, $\phi$D and $\phi$R is $\phi$LO<$\phi$D<$\phi$GNP<$\phi$R<$\phi$Hl, as shown in FIG. 9. $\phi$GNP corresponds to the speed ratio lcGNP of the CVT 2, $\phi$D corresponds to the speed ratio lcD of the CVT 2, $\phi$R corresponds to the speed ratio lcR of CVT 2, $\phi$LO corresponds to the speed ratio lcLO of the CVT 2, and $\phi$Hl corresponds to the speed ratio lcHl of the CVT 2 respectively.

Figures 12A, 12B, 12C, 12D, 12E, 12F:
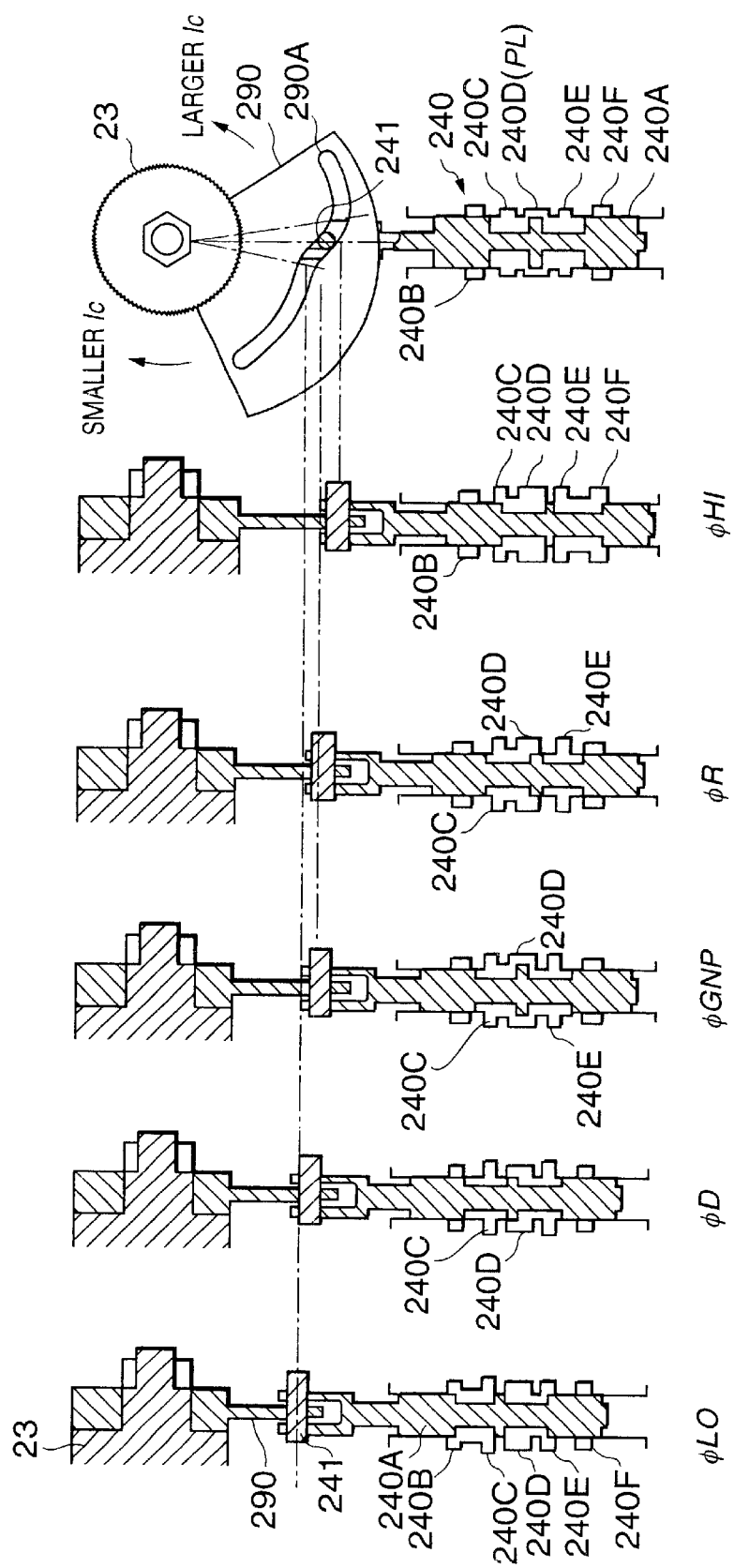
FIGS. 12A–12F are diagrams describing the relation of the cam rotation position and the operating state of a reverse torque control valve according to this invention.

Referring to FIGS. 12A–12F, when the gyration angle is equal to or greater than $\phi LO$ and less than $\phi D$, the spool 240A is held in the topmost position shown in FIG. 12A. In this position of the spool 240A, the line pressure port 240D connects with the port 240E, and the line pressure PL is supplied to the port 230E of the manual valve 230. The port 240C connects with the port 240B, and the port 230A of the manual valve 230 is connected to the pump suction passage 104.

The overall length of the valves can be shortened by not displacing the spool 240A when the gyration angle $\phi$ of the power roller 20 is less than the gyration angle $\phi D$.

If the gyration angle becomes equal to or greater than $\phi D$, the spool 240A displaced to the lower part of the figure will close the port 240C, as shown in FIG. 12B.

When the gyration angle reaches $\phi GNP$, the spool 240A it situated effectively in the middle of the overall displacement range, the line pressure port 240D is connected with the ports 240C, 240E, and the line pressure PL is supplied to the ports 230A, 230E of the manual valve 230.

When the gyration angle reaches $\phi R$, the port 240E is closed while the line pressure port 240D and port 240C remain connected, as shown in FIG. 12D.

If the gyration angle exceeds $\phi R$ and varies towards $\phi Hl$, the port 240E is connected with the port 240F while the line pressure port 240D and the port 240C remain connected, and the port 230E of the manual valve 230 is connected to the pump suction passage 104.

The speed ratio lcD of the CVT 2 corresponding to the predetermined gyration angle $\phi D$ is set to a value at least smaller than the maximum value lcLO in the control range of the speed ratio lc of the CVT 2.

It is also set to a value smaller than a speed ratio lcRSP of the CVT 2 corresponding to a gyration angle $\phi RSP$ of the rotation synchronization point RSP in the power recirculation mode and direct mode.

The controller 80 controls the step motor 136, the direct mode clutch solenoid 190 and the power recirculation mode clutch solenoid 210 in the above-mentioned oil pressure circuit of the IVT via a control circuit shown in FIG. 5.

For this purpose, signals are input to the controller 80 respectively from a rotation speed sensor 81 which detects a rotation speed Nin of the input shaft 1, rotation speed sensor 82 which detects the rotation speed No of the CVT output shaft 4, vehicle speed sensor 83 which detects the vehicle speed VSP, accelerator pedal depression sensor 84 which detects the depression amount of an accelerator pedal of the vehicle, and inhibitor switch 85 which detects a selection range of the selector lever. A vehicle speed sensor 83 detects the vehicle speed VSP from a rotation speed Nout of the final output shaft 6. Therefore, the detection result of the vehicle speed sensor 83 is used not only as the vehicle speed VSP, but also as the rotation speed Nout of the final output shaft 6. The controller 80 determines the target value of the speed ratio lc of the CVT 2 based on these signals.

The controller 80 controls the speed ratio lc of the CVT 2 to the target value by a signal output to the step motor 136. The controller 80 also selects the running mode of the IVT and generates the control pressures Plc, Phc by outputting signals corresponding to the selection result to the direct mode clutch solenoid 190 and the power recirculation mode clutch solenoid 210. The controller comprises a microcomputer provided with a central computing unit (CPU), read-only memory (ROM), random access memory (RAM), and an input/output interface (I/O interface).

8. Operation of IVT 8.1 N Range or P Range

In the N range or P range which are mainly selected when the vehicle is at rest, the line pressure port 230H of the manual valve 230 is closed, and the port 230I connected to the D range pressure circuit 107 and the port 230G connected to the R range pressure circuit 108 are respectively released to the drain. Therefore, oil pressure is not supplied to the power recirculation mode clutch 9 or the direct mode clutch 10, and the CVT 2 does not transmit torque. Consequently, the IVT does not transmit drive power, and a neutral state is produced. The drain port 246C used for the oil chamber 30A of the CVT 2 is connected to the pump suction passage 104 via the port 230B of the manual valve 230, and the drain port 246D used for the oil chamber 30B is connected to the pump suction passage 104 via a port 230D. Therefore, if the oil chamber 30A or 30B is connected to the supply port 246P, the speed ratio lc of the CVT 2 can be freely varied in both an acceleration direction and a deceleration direction by operating the shift control valve 246.

When the vehicle is at rest, i.e. the vehicle speed is zero, the speed ratio lc and IVT speed ratio factor E of the CVT 2 are usually controlled to the geared neutral point GNP.

8.2 Operation from N Range to D Range

Figure 6A:
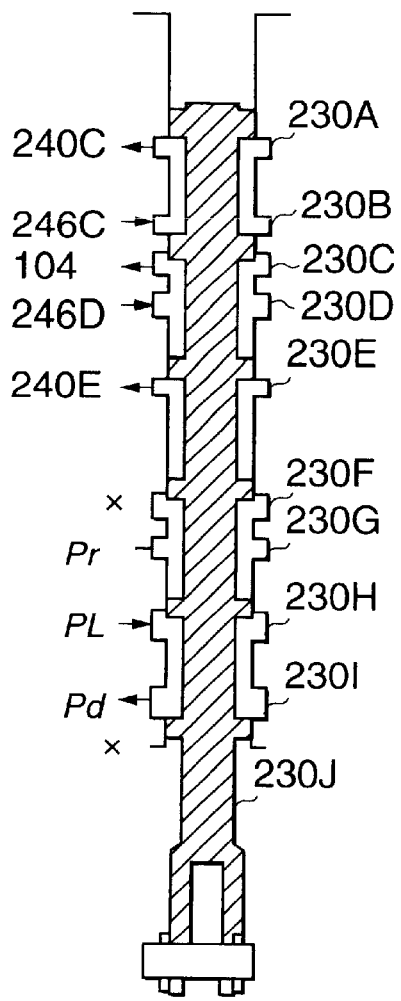
FIGS. 6A–6C are diagrams showing a relation between a spool position of a manual valve and interport connections according to this invention.
Figure 6B:
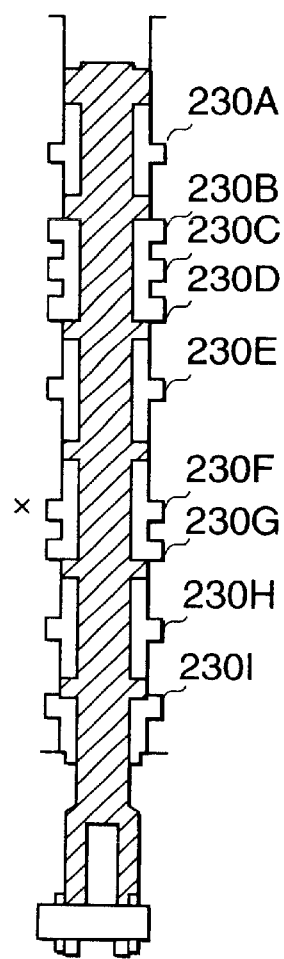

If the driver selects the D range by the selector lever when the vehicle is at rest, the spool 230J of the manual valve 230 will descend to the position shown in FIG. 6A from the position of FIG. 6B. In this position, the manual valve 230 connects the line pressure port 230H to the port 230I.

Consequently, the line pressure PL is supplied to the D range pressure circuit 107 as a D range pressure Pd.

When the vehicle is in a stopped state, the power recirculation mode is applied and the speed ratio lc of the CVT 2 is held at lcGNP of the geared neutral point GNP. In this state, as shown in FIG. 9, the gyration angle $\phi=\phi GNP>\phi C$. Therefore, the spool 160A of the mode fixing valve 160 is locked in a position where it is pulled up to the upper part of the figure as shown in FIG. 8D.

The D range pressure Pd of the D range pressure circuit 107 is supplied to the port 160D of the mode fixing valve 160 via the shuttle valve 270 and R range pressure circuit 108. The D range pressure Pd is further supplied to the power recirculation mode clutch 9 via the output port 160, port 170H of the inhibitor valve, and output port 170G. As a result, the power recirculation mode clutch 9 released in the N range or the P range is engaged.

8.3 Startup and Running in Power Recirculation Mode

When the accelerator pedal is not depressed in the D range or Ds range, the step motor 136 is driven in the forward direction, i.e., the direction which increases the CVT speed ratio lc to obtain a predetermined creep torque. The occurrence of such a creep torque is disclosed in Tokkai Hei 10-267117 published by the Japanese Patent Office in 1998.

When the accelerator pedal is depressed, the speed ratio 1C of the CVT 2 is controlled relative to the vehicle speed VSP so that a predetermined input shaft rotation speed is attained. For example, the controller 80 determines a target value of the input shaft rotation speed Nin according to the accelerator pedal depression amount APS and the vehicle speed VSP by looking up a speed change map shown in FIG. 13.

Figure 13:
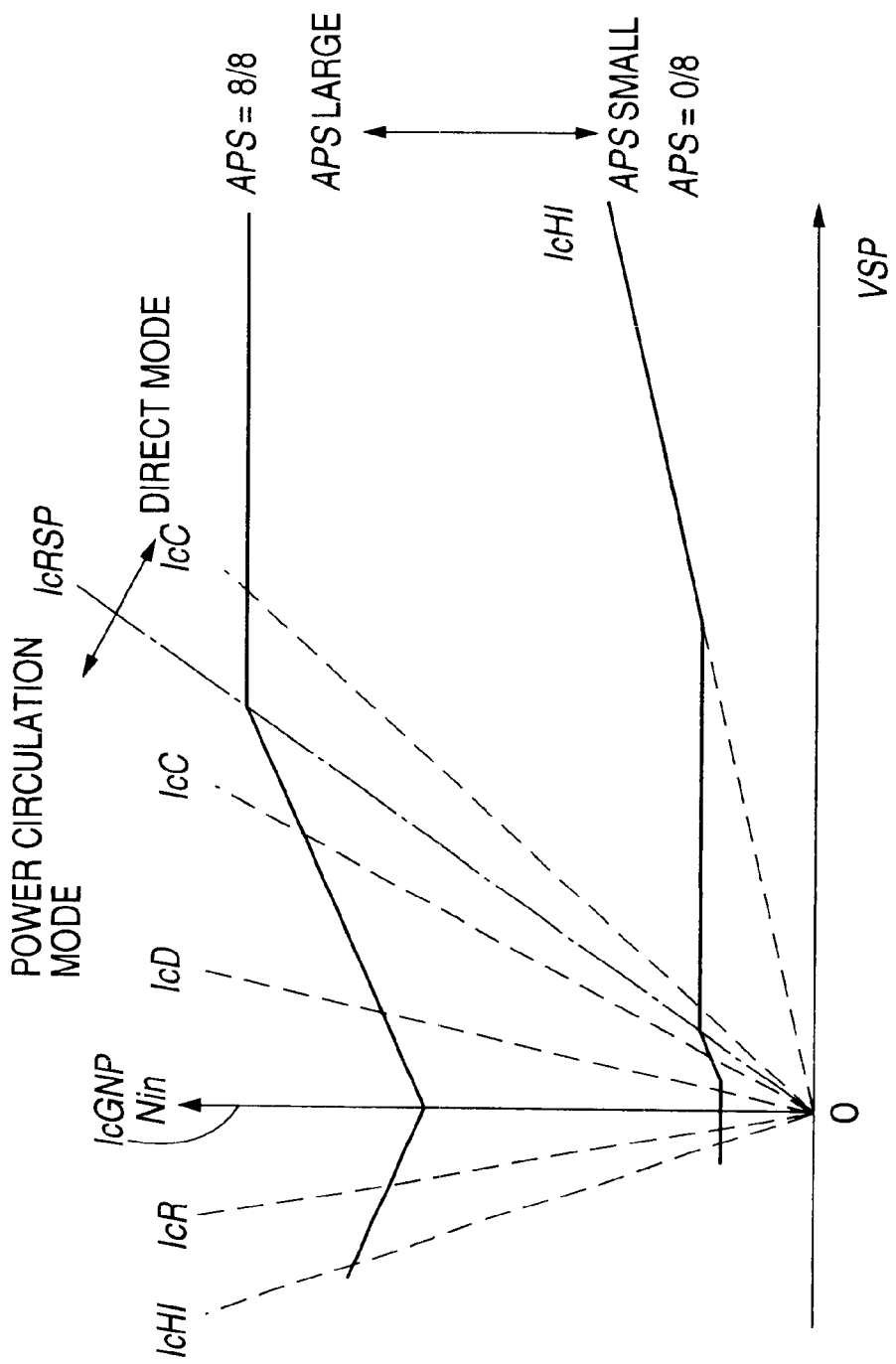
FIG. 13 is a diagram showing the contents of a map specifying a target input shaft rotation speed Nin relative to a vehicle speed VSP and accelerator pedal depression amount APS stored by the controller.

In the speed change map of FIG. 13, $$\frac{Nin}{No}$$

shows the target value of the speed ratio lc of the CVT 2. The running mode is also determined based on the speed ratio lcRSP of the CVT 2 corresponding to the rotation synchronization point RSP, the target speed ratio of the CVT 2 and the vehicle speed VSP. In this map, change-over of running mode is performed at a speed ratio lcRSP of the CVT 2 corresponding to the rotation synchronization point RSP.

Figure 14:
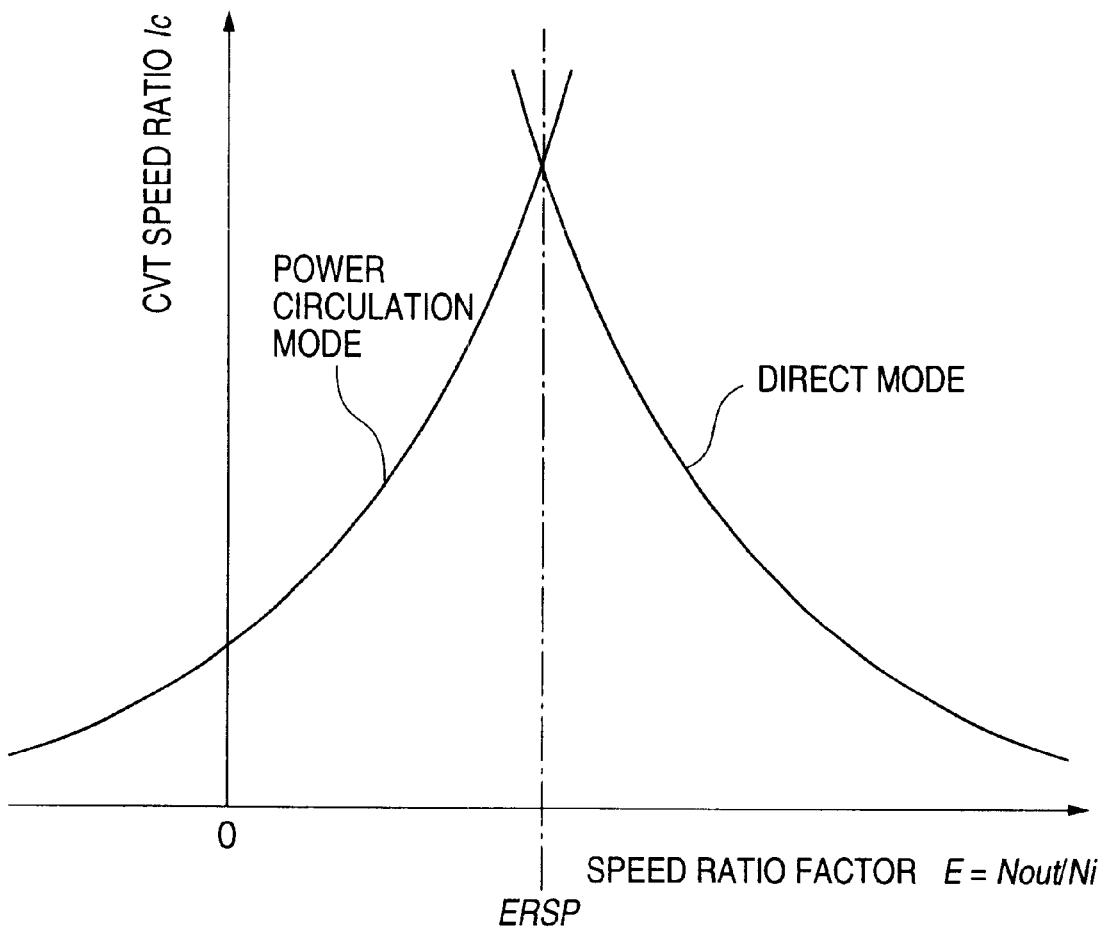
FIG. 14 is a diagram describing a relation between the running mode, speed ratio factor E of the infinite variable speed ratio transmission and speed ratio lc of the toroidal continuously variable transmission according to this invention.

The controller 80 computes the IVT speed ratio factor $$E = \frac{Nout}{Nin}$$

by dividing the final output shaft rotation speed Nout by the target input shaft rotation speed Nin, taking account of the running mode by looking up a map shown in FIG. 14. The controller 80 then computes the target gyration angle φ from the target speed ratio lc of the CVT 2 by performing an inverse computation on the map of FIG. 9, and feedback controls the position of the step motor 136 so that the target gyration angle of the power rollers 20 is obtained.

The operation of the oil pressure circuit in this power recirculation mode is as follows.

The spool 230J of the manual valve 230 is in the position shown in FIG. 6A, and the mode fixing valve 160 is held in the position shown in FIG. 8D. Therefore, the drain port 246C for the oil chamber 30A of the shift control valve 246 is connected to the port 240C of the reverse torque cutoff valve 240 via the ports 160K, 160J and the ports 230B, 230A, as shown in FIG. 2 and FIGS. 3A–3C.

On the other hand, the drain port 246D for the oil chamber 30B of the shift control valve 246 is connected to the pump suction passage 104 via the ports 230D, 230C.

The line pressure PL is supplied to the port 240D of the reverse torque cutoff valve 240, and the spool 240A is in the position of the geared neutral point GNP shown in FIG. 3C due to the groove 290A of the cam 290. At the gyration angle φGNP corresponding to the geared neutral point GNP, the port 240C of the reverse torque cutoff valve 240 connects with the line pressure port 240D, and is cut off from the port 240B. The port 240C is connected to the drain port 246C of the shift control valve 246.

Therefore, as the drain port 246C for the oil chamber 30A of the shift control valve 246 is at the line pressure PL at the geared neutral point GNP, the oil pressure Plo of the oil chamber 30A will be the line pressure PL regardless of the spool position of the shift control valve 246.

On the other hand, the drain port 246D for the oil chamber 30B of the shift control valve 246 is connected to the pump suction passage 104.

Consequently, although the oil pressure Phi of the oil chamber 30B varies effectively from around zero to the line pressure PL according to the position of the spool 246S, the oil pressure Phi does not exceed the oil pressure Plo.

Therefore, at the geared neutral point GNP in the power recirculation mode of the D range, Plo≧Phi always holds.

The position and shape of the cam groove 290A of the cam 290 are previously set so that this differential pressure relation holds when the gyration angle of the power roller 20 is equal to or greater than the gyration angle φD shown in FIGS. 9 and 10.

Due to this setting, in the D range (forward motion range) of the power recirculation mode where the IVT speed ratio factor E≧0, and in a region nearer the geared neutral point GNP than a predetermined value ED corresponding to the speed ratio lcD of the CVT 2, a torque in the reverse direction causing engine braking can be prevented from acting.

Next, the control when the IVT speed ratio factor E changes from the geared neutral point GNP in the forward direction, i.e., the direction which increases the speed ratio lc of the CVT 2, will be described.

In this case, the spool 240A of the reverse torque cutoff valve 240 is pulled up to the upper part of FIG. 3C by the rotational displacement of the cam 290.

When the gyration angle of the power roller 20 changes from φGNP to φD, the port 240C of the reverse torque cutoff valve 240 communicating with the drain port 246C for the oil chamber 30A is cut off from the line pressure port 240D, as shown in FIG. 12B.

When the gyration angle of the power roller 20 further changes to φLO, the spool 240A is pulled up further, and the port 240C connects with the port 240B as shown in FIG. 12A. As a result, the port 240C connects with the pump suction passage 104, and the pressure is reduced until the oil pressure Plo of the oil chamber 30A becomes almost equal to atmospheric pressure.

Consequently, the relation between the oil pressure Plo of the oil chamber 30A and the oil pressure Phi of the oil chamber 30B can be inverted according to the position of the spool 246S of the shift control valve 246.

In this way, in the D range of the power recirculation mode, when the IVT speed ratio factor E is larger than the predetermined value ED shown in FIG. 10, torque in the reverse direction which causes engine braking can be generated.

Therefore, in the D range of the power recirculation mode, in a low-speed region for which the IVT speed ratio factor E shown in FIG. 10 is less than the predetermined value ED where engine braking is not necessary, generation of torque in the reverse direction causing engine braking is prevented even if the step motor 136 drives the power roller 20 of the CVT 2 in the speed ratio increase direction due for example to a malfunction or incorrect operation of the controller 80. The predetermined value ED corresponds to the predetermined speed ratio lcD before the speed ratio lc of the CVT 2 reaches the geared neutral point GNP.

8.4 Change-over from Power Recirculation Mode to Direct Mode

If the target IVT speed ratio factor E exceeds a rotation synchronization point speed ratio factor ERSP, a change-over is performed from the power recirculation mode to the direct mode. This can be determined from whether the target value of the speed ratio lc of the CVT 2 determined from the vehicle speed VSP and accelerator pedal depression amount APS exceeds the speed ratio lcRSP of the CVT 2 corresponding to the rotation synchronization point RSP in the map of FIG. 13.

In the power recirculation mode, in the region where the speed ratio of the CVT 2 is larger than the first speed ratio lcC, i.e., when the gyration angle φ of the power roller exceeds a predetermined value φC, the spool 170A connects the ports 170C, 170D, and connects the ports 170F, 170G as shown in FIG. 8A. Due to this, the control pressure Plc can be supplied to the power recirculation mode clutch 9, and the control pressure Phc can be supplied to the direct mode clutch 10, respectively.

If the running mode change-over region is expressed in terms of the IVT speed ratio factor E, this is the region from Ecl to Ech, as shown in FIG. 10. Ecl is the IVT speed ratio factor E corresponding to the first speed ratio lcC as mentioned above.

In a running mode change-over prohibition region where the speed ratio of the CVT 2 is below the first speed ratio lcC, the mode fixing valve 160 cannot perform change-over of running mode as displacement of the spool 160A is stopped by the lock mechanism, as shown in FIG. 8D.

Therefore, change-over of running mode is limited to the region where the speed ratio lc of the CVT 2 exceeds the first speed ration lcC, as shown in FIG. 10. In this region, a smooth change-over is performed by simultaneously operating the power recirculation mode clutch control valve 200 and the direct mode clutch control valve 180.

When the accelerator pedal depression amount APS is fixed, and when the vehicle speed VSP increases, the target value of the IVT speed ratio factor E varies continuously. In this case, while performing the speed change control of the power recirculation mode, a clutch change-over start determination is performed at the time when the speed ratio lc of the CVT 2 becomes larger than the first speed ratio lcC in FIG. 10. After performing clutch change-over at the rotation synchronization point RSP, the speed change control is performed with the target speed ratio of the CVT 2 in the direct mode. At the rotation synchronization point RSP, as the rotation speed of the CVT output shaft 4 and the final output shaft 6 are equal and the rotation speeds of the reduction gear output shaft 3C and planet carrier 5B are identical, the shock due to engagement and disengagement of the clutches can be prevented, and a smooth change-over can be performed.

When the accelerator pedal which was depressed while running in the power recirculation mode is released, the target value of the IVT speed ratio factor E may change suddenly from a value corresponding to the power recirculation mode to a value corresponding to the direct mode. In this case, in FIG. 10, the CVT 2 is first controlled so that the speed ratio lc of the CVT 2 becomes larger than the first speed ratio lcC; and when the speed ratio lc enters the change-over permission region shown in FIG. 10, the power recirculation mode clutch control valve 200 and the direct mode clutch control valve 180 are operated simultaneously to produce a partially engaged state. After performing clutch change-over in this partially engaged state, direct mode speed change control is performed to make the speed ratio lc of the CVT 2 approach the target value. When the target value of the IVT speed ratio factor E varies sharply beyond the rotation synchronous point RSP, the response of the transmission is maintained by producing the partially engaged state and starting mode change-over before the IVT speed ratio factor E reaches the rotation synchronous point RSP.

Figure 11A:
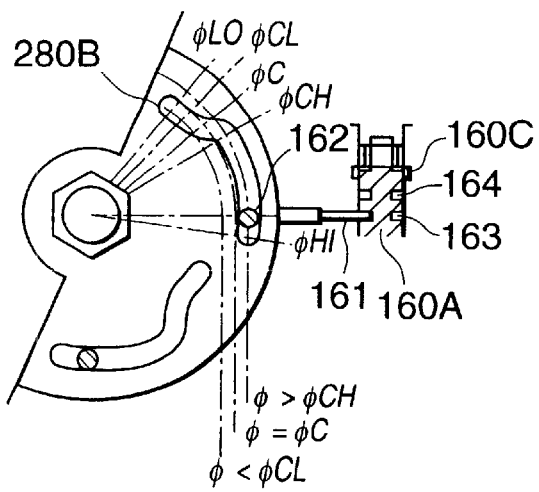
FIGS. 11A–11D are diagrams describing the relation of the cam rotation position and the operating state of a lock mechanism of a mode fixing valve according to this invention.
Figure 11B:
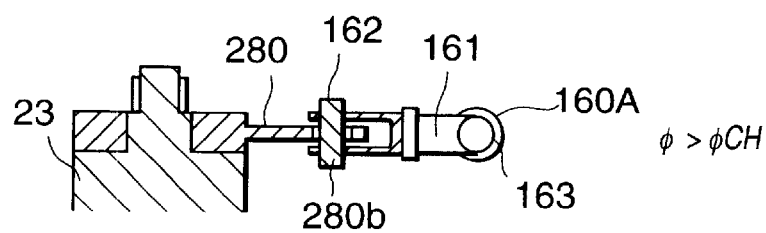
Figure 11C:
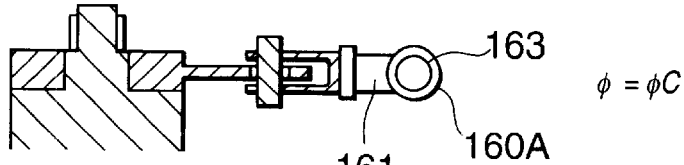
Figure 11D:
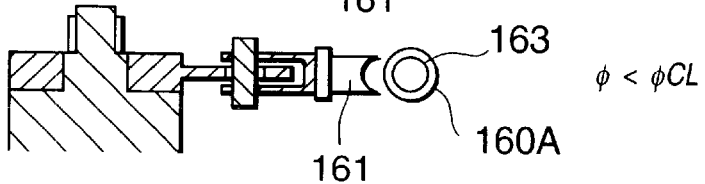

In the mode change over permission region where the speed ratio lc of the CVT 2 is larger than the first speed ratio lcC, the lock of the mode fixing valve 160 is released as shown in FIG. 11D. In this state, the spool 160A displaces due to the signal pressure PsolH/C from the direct mode clutch solenoid 190. However, in this region, the inhibitor valve 170 supplies the control pressure Plc of the power recirculation mode clutch control valve 200 to the power recirculation mode clutch 9 via the ports 170F, 170G, and supplies the control pressure Phc of the direct mode clutch control valve 180 to the direct mode clutch 10 via the ports 170C, 170D. As the ports 170E, 170H communicating with the mode fixing valve 160 are closed, running mode change-over is performed via the partially engaged state by controlling the power recirculation mode clutch control valve 200 and the direct mode clutch control valve 180 regardless of the mode fixing valve 160. Due to this control characteristic, the running mode is gradually changed over smoothly rather than one clutch being switched on and the other clutch being switched off abruptly.

The first speed ratio lcC of the CVT 2 above which the power recirculation mode clutch control valve 200 and the direct mode clutch control valve 180 can be operated simultaneously, is set nearer the rotation synchronous point RSP than the speed ratio lcD of the CVT 2.

The speed ratio lcD is defined to permit/prohibit transmission of torque which causes engine braking. In the mode change-over permission region shown in FIG. 10, the CVT 2 can transmit torque in both the acceleration direction and the deceleration direction, and the torque transmission direction of the CVT 2 reverses when there is a mode change-over. The reason why the first speed ratio lcC is set nearer the rotation synchronous point RSP than the speed ratio lcD is to prevent worsening of speed ratio control characteristics of the CVT 2 due to the mode change-over.

In this IVT, the direction of the transmitted torque which passes through the CVT 2 is different as follows when the vehicle is moving forward in the direct mode and power recirculation mode.

In FIG. 1, let torque transmission from the input disk 21 to the output disk 22 be the positive torque transmission direction, and torque transmission from the output disk 22 to the input disk 21 be the negative torque transmission direction. In the direct mode, as the output torque of the CVT 2 is transmitted to the final output shaft 6, the vehicle is driven with a positive transmitted torque, and a negative transmitted torque acts as an engine brake.

Therefore, in the direct mode, the transmitted torque of the vehicle is controlled by controlling the positive transmitted torque of the CVT 2.

In the power recirculation mode, the power recirculation mode clutch 9 is engaged and the direct mode clutch 10 is disengaged, so in FIG. 1, forward/reverse motion of the vehicle is determined by the difference between the rotation speed of the planet carrier 5 which rotates due to the output of the reduction gear 3, and the rotation speed of the sun gear 5 which depends on the speed ratio lc of the CVT 2. In the power recirculation mode, therefore, the direction of the torque passing through the CVT 2 varies according to the motion direction of the vehicle.

When the vehicle is moving forward in the power recirculation mode, it corresponds to the case where the rotation speed of the planet carrier 5B is greater than the rotation speed of the sun gear 5A, i.e., to the case where the speed ratio lc of the CVT 2 is greater than the geared neutral point GNP shown in FIG. 10. In this case, the torque transmitted by the planet gear 5B is transmitted by the ring gear 5C and sun gear 5A. In other words, torque is input to the CVT 2 from the output disk 22 via the chain 4B, and it is a negative transmission torque. The torque transmitted from the output disk 22 to the input disk 21 is transmitted from the unit input shaft 1 to the reduction gear 3, and the drive force is recirculated.

When the vehicle is reversing in the power recirculation mode, it corresponds to the case when the rotation speed of the sun gear 5A is much larger than the rotation speed of the planet carrier 5B, i.e., to the case when the speed ratio of the CVT 2 is smaller than the geared neutral point GNP shown in FIG. 10. In this case, the torque transmitted by the sun gear 5A is transmitted to the planet carrier 5B and ring gear 5C. In other words, the torque transmitted in the CVT 2 is a positive torque, The torque transmitted from the sun gear 5A to the planet carrier 5B is again recirculated to the input disk 21 via the reduction gear 3.

Therefore, when the vehicle is moving forward in the power recirculation mode, the drive torque of the vehicle can be controlled by controlling the negative torque passing through the CVT 2, and when the vehicle is reversing in the power recirculation mode, the drive torque of the vehicle can be controlled by controlling the positive torque passing through the CVT 2.

8.5 Direct Mode Running

After a change-over of running mode is performed from the power recirculation mode to the direct mode, the vehicle runs in the direct mode with the direct mode clutch 10 engaged until there is another change-over from the direct mode to the power recirculation mode.

In the direct mode, even if the control pressure Plc dropped sharply due to a malfunction of the power recirculation mode clutch control valve 200 or error in the controller 80, in the mode change-over prohibition region when the speed ratio lc of the CVT 2 is equal to or less than the first speed ratio lcC, the spool 170A of the inhibitor valve 170 is pushed down as shown in FIG. 8C, and the spool 160A of the mode fixing valve 160 is also pushed down as shown in FIG. 8E.

As a result, the output port 170G connecting with the power recirculation mode clutch 9 is connected to the drain via the ports 170H, 160F, and the oil pressure of the power recirculation mode clutch 9 is equal to atmospheric pressure regardless of the state of the power recirculation mode clutch control valve 200. It may be noted that, in terms of the IVT speed ratio factor E, the mode change-over prohibition region corresponds to the region from Ecl to Ech as shown in FIG. 10.

Due to the above reason, the power recirculation mode clutch 9 is not engaged even if the control pressure Plc drops due to a malfunction or incorrect operation of the power recirculation mode clutch control valve 200, and therefore a speed change operation unintended by the driver does not occur.

On the other hand, as shown in FIG. 10, when the speed ratio lc of the CVT 2 is larger than lcC, the power recirculation mode clutch 9 and direct mode clutch 10 can be engaged simultaneously, but the variation of the IVT speed ratio factor E is limited to the region from the Ech to Ecl in FIG. 10 even if both clutches are engaged simultaneously, so a large variation of speed ratio does not occur.

Hence, by setting the mode change-over permission region which permits the clutches 9 and 10 to be engaged simultaneously, to near the rotation synchronous point RSP, the difference of the IVT speed ratio factor E in the direct mode and that of the power recirculation mode at an identical speed ratio lc of the CVT 2 is maintained small, and even when the power recirculation mode clutch control valve 200 has a malfunction or incorrect operation while the vehicle is running in the direct mode, an unintended downshift is prevented.

8.6 Change-over from Direct Mode to Power Recirculation Mode

Change-over of running mode from the direct mode to the power recirculation mode is the reverse of change-over of running mode from the power recirculation mode to the direct mode.

When there is a drop of the vehicle speed VSP or the accelerator pedal is depressed while the vehicle is running in the direct mode, and the target value of the speed ratio lc of the CVT 2 crosses the speed ratio lcRSP corresponding to the rotation synchronous point RSP in the speed change map shown in FIG. 13, change-over control from direct mode running to power recirculation mode running is started.

When the vehicle is coasting due to release of the accelerator, the target value of the IVT speed ratio factor E varies continuously. Hence, when the speed ratio lc of the CVT 2 has increased more than lcC, a running mode change-over determination is performed, and after the engaged state of the clutches 9 and 10 have been changed over at the rotation synchronous point RSP, the speed ratio lc of the CVT 2 is made to vary in the decreasing direction.

On the other hand, when the target value of the IVT speed ratio factor E sharply decreases due to depression of the accelerator pedal, the IVT speed ratio factor E is decreased until the speed ratio lc of the CVT 2 is greater than the first speed ratio lcC, and a change-over is then performed by operating the power recirculation mode clutch control valve 200 and direct mode clutch control valve 180. After the shift to the power recirculation mode, the speed ratio lc of the CVT 2 is controlled to the target value in the power recirculation mode.

In the mode change-over permission region where the speed ratio lc of the CVT 2 is larger than the first speed ratio lcC, the lock of the mode fixing valve 160 is released as shown in FIG. 11D. In this state, the spool 160A displaces due to the signal pressure PsolH/C from the direct mode clutch solenoid 190. However, in this region, the inhibitor valve 170 supplies the control pressure Plo of the power recirculation mode clutch control valve 200 to a power recirculation mode clutch 9 via the ports 170F, 170G, and supplies the control pressure Phc of the direct mode clutch control valve 180 to the direct mode clutch 10 via the ports 170C, 170D. As the ports 170E, 170H connecting with the mode fixing valve 160 are closed, the running mode change-over is performed via the partially engaged state due to control of the power recirculation mode clutch control valve 200 and the direct mode clutch control valve 180 regardless of the mode fixing valve 160. Due to this control characteristic, the mode is gradually changed over smoothly rather than one clutch being switched on and the other clutch being switched off abruptly.

8.7 R Range

Figure 6C:
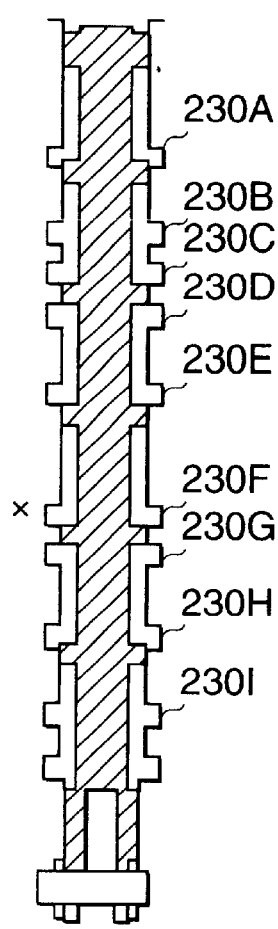

When the driver sets the selector lever from the N/P range to the R range, the manual valve 230 displaces the spool 230J as shown in FIG. 6C. As a result, the R range pressure port 230G connects with the line pressure port 230H, and the line pressure PL is supplied to the R range pressure circuit 108.

When the vehicle is in a stopped state, the running mode is the power recirculation mode, and the speed ratio lc of the CVT 2 is controlled to lcGNP corresponding to the geared neutral point GNP, so the spool 160A of the mode fixing valve 160 is locked by the slider 161 in a position where it is pulled up to the upper part of the figure as shown in FIG. 8D.

When the R range is selected in this state, the R range pressure Pr is supplied to the power recirculation mode clutch 9 via the port 160D and output port 160F of the mode fixing valve 160, and the port 170H and output port 170G of the inhibitor valve 170, and the power recirculation mode clutch 9 engages.

In the state where the accelerator pedal is not depressed in the R range, the step motor 136 is driven in the reverse direction, i.e., the speed ratio lc of the CVT 2 is decreased from lcGNP so as to obtain a predetermined creep torque.

The control of the speed ratio lc of the CVT 2 in the R range is performed in the same way as when the D range or Ds range is selected in the power recirculation mode.

The controller 80 calculates the target input rotation speed Nin from the speed change map of FIG. 13 based on the vehicle speed VSP and accelerator pedal depression amount APS. The target value of the speed ratio lc of the CVT 2 is then calculated and the step motor 136 is driven.

In the R range, the manual valve 230 is fixed at the position in FIG. 6C, the mode fixing valve 160 is fixed at the position in FIG. 8D, and the drain port 246C for the oil chamber 30A of the shift control valve 246 connects with the pump suction passage 104 via the ports 160K, 160J of the mode fixing valve 160 and the ports 230B, 230C of the manual valve 230. The drain port 246D for the oil chamber 30B of the shift control valve 246 is connected to the port 240E of the reverse torque cutoff valve 240 via the ports 230D, 230E of the manual valve 230.

Immediately after a change-over from N or P range to the R range, the spool 240A of the reverse torque cutoff valve 240 is in a position corresponding to the geared neutral point GNP shown in FIG. 3C. At the gyration angle φGNP of the power roller 20 corresponding to the geared neutral point GNP, the drain port 246D for the oil chamber 30B of the shift control valve 246 connects with the port 240E of the reverse torque cutoff valve 240 via the ports 230D, 230E of the manual valve 230 which are in the positions shown in FIG. 6C. In the reverse torque cutoff valve 240, the port 240E is connected to the line pressure port 240D, and is cut off from the port 240F communicating with the pump suction passage 104.

Therefore, at the geared neutral point GNP, the line pressure PL acts on the drain port 246D for the oil chamber 230B of the shift control valve 246, and the oil pressure Phi of the oil chamber 30B is equal to the line pressure PL regardless of the spool position of the shift control valve 246.

In the power recirculation mode, the drain port 246C for the oil chamber 30A is connected to the pump suction passage 104 via the ports 160K, 160J of the mode fixing valve 160, and the ports 230B, 230C of the manual valve 230, as shown in FIG. 8D. Therefore, the oil pressure Plo of the oil chamber 30A varies from around zero to the line pressure PL according to the position of the shift control valve 246, but Plo cannot exceed Phi.

Therefore, at the geared neutral point GNP of the R range, the relation Phi≧Plo always holds.

The groove 290A of the cam 290 is set so that this relation holds when the gyration angle is equal to or greater than φR, i.e., when the speed ratio lc of the CVT 2 is equal to or less than lcR. Hence, in the R range, in the region where the IVT speed ratio factor E is negative and the gyration angle φ is nearer φGNP than the predetermined value φR, a forward direction torque which would cause engine braking is not produced.

When the IVT speed ratio factor E changes in the reverse direction from the geared neutral point GNP, the speed ratio lc of the CVT 2 varies in the decreasing direction. As a result, the spool 240A of the reverse torque cutoff valve 240A moves downward as shown in FIGS. 12C, 12D.

At the gyration angle φR, the port 240E communicating with the drain port 246D for the oil chamber 30B is cut off from the line pressure port 240D as shown in FIG. 12. When the gyration angle φ further advances to the gyration angle φHl, the spool 240A of the reverse torque cutoff valve 240 is connected to the pump suction passage 104 via the ports 240E, 240F, as shown in FIG. 12E. As a result, the oil pressure Phi of the oil chamber 30B becomes effectively the same as atmospheric pressure.

As a result, the oil pressure Plo of the oil chamber 30A and the oil pressure Phi of the oil chamber 30B can be inverted according to the displacement of the spool 246S of the shift control valve 246.

Therefore, in the R range, when the IVT speed ratio factor E exceeds a predetermined value ER and varies in the increasing direction of the vehicle speed, a transmitted torque which causes engine braking can be generated.

On the other hand, in the low speed region where engine braking is not required in the reverse range, a forward direction torque which would cause engine braking is not produced from when the speed ratio lc of the CVT 2 is the predetermined speed ratio lcR to when it is the geared neutral point GNP even if the step motor 136 performs an incorrect operation which causes the speed ratio lc of the CVT 2 to vary in the increasing direction.

Therefore, in the IVT according to this invention, by providing the inhibitor valve which responds to the gyration angle φ of the power roller 20, the reverse torque cutoff valve 240, and the mode fixing valve 160 which responds to the gyration angle φ and signal pressure PsolHC/, the power recirculation mode clutch 9 and direct mode clutch 10 are definitively prevented from engaging simultaneously until the speed ratio lc of the CVT 2 increases to larger than the predetermined value lcD. Further, by setting the first speed ratio lcC of the CVT 2, which is the boundary between the mode change-over prohibition region wherein the power recirculation mode clutch 9 and direct mode clutch 10 are prohibited from engaging simultaneously, and the mode change-over permission region wherein they are permitted to engage simultaneously, to be between the geared neutral point GNP and the rotation synchronous point RSP, variation of the IVT speed ratio factor E due to simultaneous engaging is suppressed small even if such an operation does occur, as compared to the infinite variable speed ratio transmission of the prior art where the power recirculation mode clutch 9 and direct mode clutch 10 are permitted to engage simultaneously in all running regions.

Further, the reverse torque cutoff valve 240 cuts off torque transmission which leads to engine braking in the low speed region where the speed ratio lc of the CVT 2 is smaller than lcD when the vehicle is moving forward, and the low speed region where the speed ratio of the CVT 2 is larger than the lcR when the vehicle is reversing. Consequently, engine braking does not occur in the low speed region even if the step motor 136 performs a speed change of the CVT 2 which would lead to engine braking due to a malfunction or incorrect operation.

In this embodiment, the spool 160A of the mode fixing valve 160 is made to displace according to the signal pressure PsolH/C of the direct mode clutch solenoid 190, but it may also be made to displace according to the signal pressure PsolL/C of the power recirculation mode clutch solenoid 210.

It should be noted that in this embodiment, the mode fixing valve 160 is a first valve, and the inhibitor valve 170 is a second valve.

Figure 16:
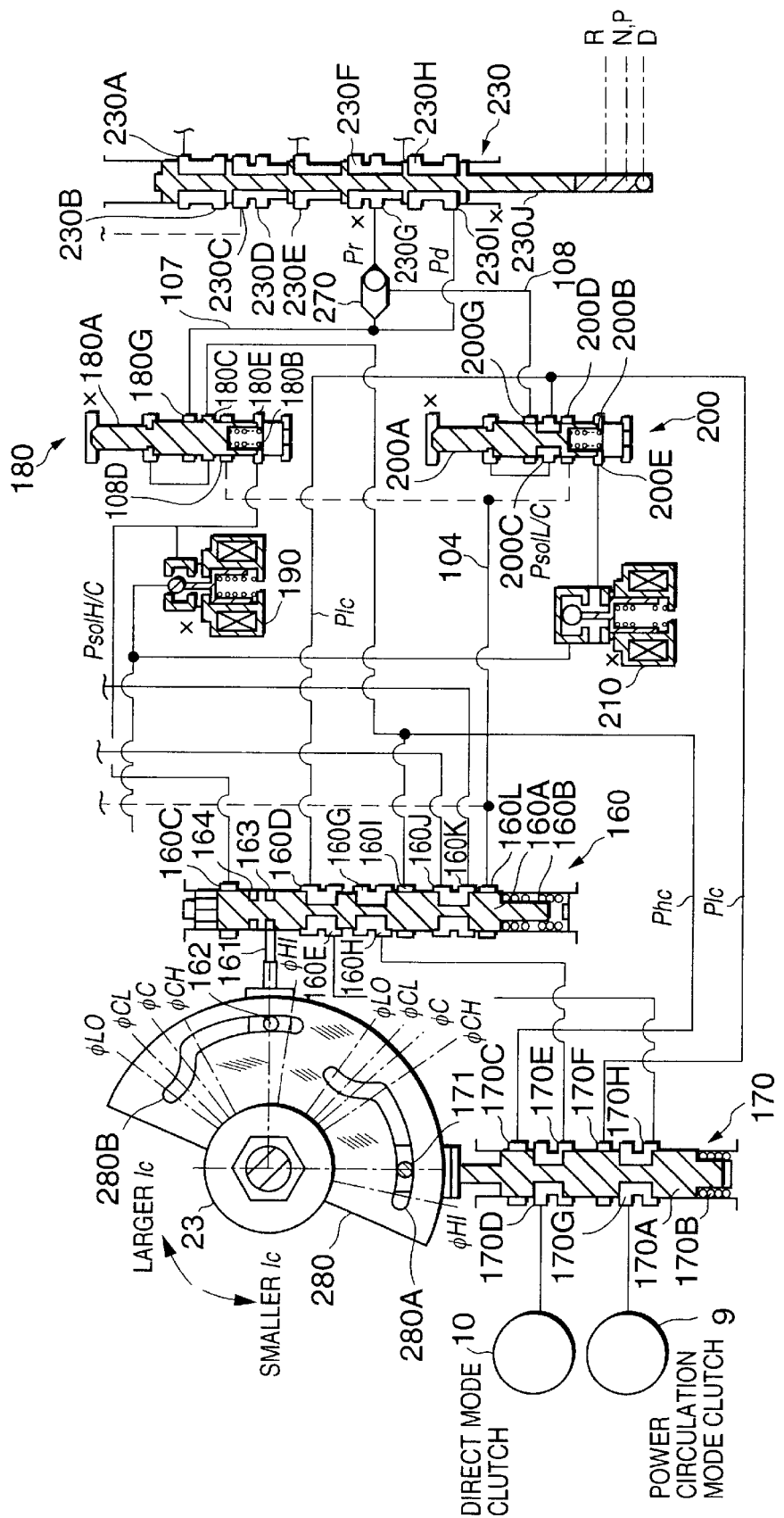
FIG. 16 is similar to FIG. 3B, but showing a second embodiment of this invention.

Next, a second embodiment of this invention will be described referring to FIG. 16.

According to this embodiment, instead of supplying the D range pressure Pd and R range pressure Pr to the mode fixing valve 160 as in the first embodiment, the control pressure Phc generated by the direct mode clutch control valve 180 and the control pressure Plc generated by the power recirculation mode clutch control valve 200 are supplied to the mode fixing valve 160.

The output port 180C of the direct mode clutch control valve 180 is also connected to the port 160I of the mode fixing valve 160 in addition to the port 170C of the inhibitor valve 170.

The output port 200C of the power recirculation mode clutch control valve 200 is also connected to the port 160D of the mode fixing valve 160 in addition to the port 170F of the inhibitor valve 170.

The remaining features of the construction are identical to those of the first embodiment.

Due to this construction, the control pressure Plc generated by the power recirculation mode clutch control valve 200 is output from the output port 160F of the mode fixing valve 160 to the port 170E of the inhibitor valve 170 regardless of the gyration angle φ of the power roller 20.

Further, the control pressure Phc generated by the power recirculation mode clutch control valve 180 is output from the output port 160H of the mode fixing valve 160 to the port 170H of the inhibitor valve 170 regardless of the gyration angle φ of the power roller 20.

Therefore, when there is a shift from the N range to the D range or from the N range to the R range, the power recirculation mode clutch 9 is gradually engaged, and shocks due to engaging of the clutch are mitigated. Also when there is a decrease of transmission torque due to sudden braking, the engine is prevented from stalling.

Figure 17:
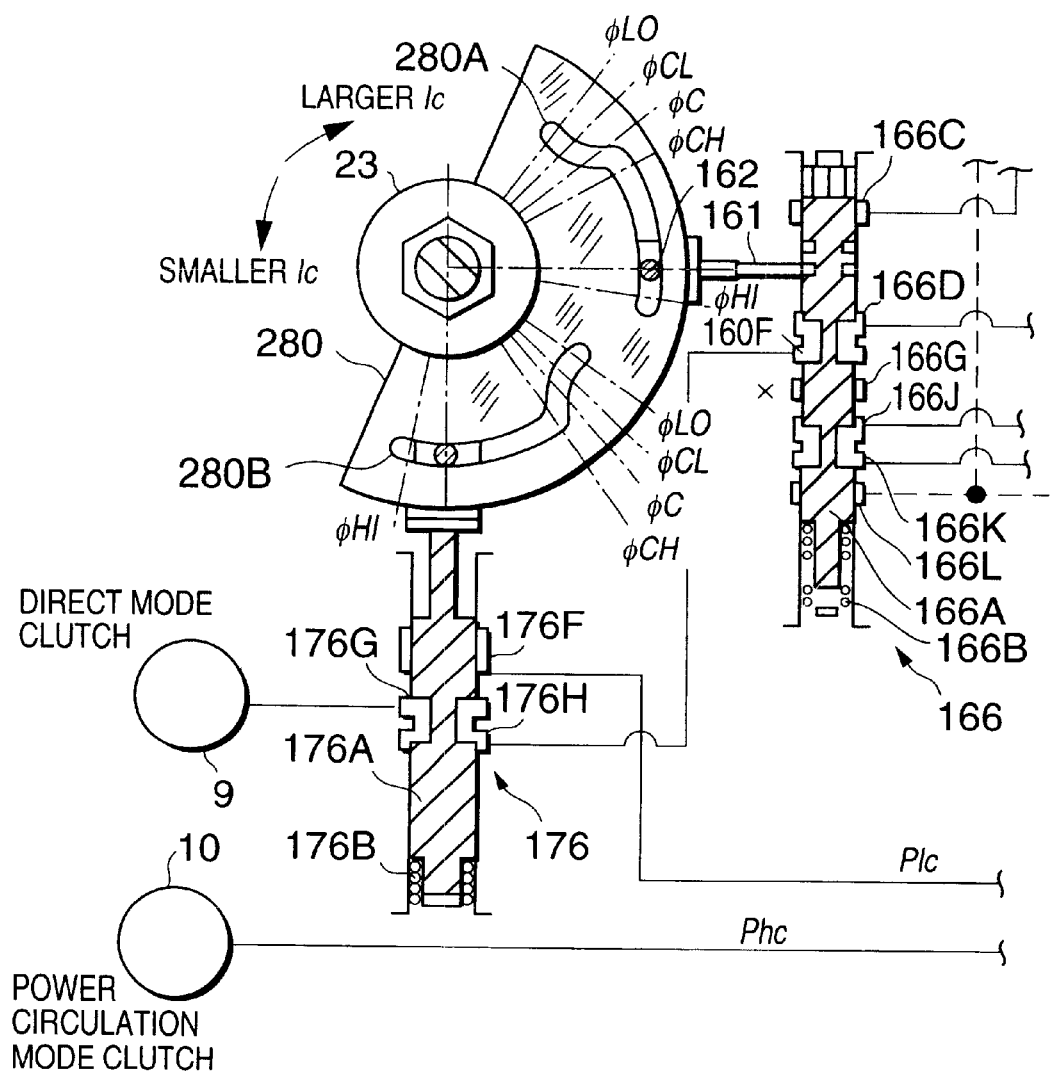
FIG. 17 is similar to FIG. 3B, but showing a third embodiment of this invention.

Next, a third embodiment of this invention will be described referring to FIG. 17.

According to this embodiment, instead of the mode fixing valve 160 and inhibitor valve 170 of the second embodiment, a mode fixing valve 166 and inhibitor valve 176 are used. The mode fixing valve 166 and inhibitor valve 176 control only the oil pressure supplied to the power recirculation mode clutch 9, the control pressure Phc generated by the direct mode clutch control valve 180 being supplied directly to the direct mode clutch 10. The remaining features of the construction are identical to those of the second embodiment.

The inhibitor valve 176 comprises a spool 170A which responds to the gyration angle φ of the power roller 20 via the cam 280. A port 176F connecting with the power recirculation mode clutch control valve 200, or the port 176H connecting with an output port 166F of the mode fixing valve 160, are connected to an output port 176G according to the displacement of the spool 170A.

The direct mode clutch 10 directly connects with the output port 180C of the direct mode clutch control valve 180.

The mode fixing valve 166 connects the port 166F communicating with the port 176H of the inhibitor valve 176 to a port 166D or drain port 166G according to the displacement of a spool 166A responsive to the signal pressure PsolH/C of the port 166C. The port 166D connects with the output port 200C of the power recirculation mode clutch control valve 200.

As in the case of the spool 160A of the first embodiment and second embodiment, the spool 166A also comprises a lock mechanism which operates according to the gyration angle φ of the power roller 20.

In the mode fixing valve 166, a port 166K communicating with the drain port 246C of the shift control valve 246 via the oil passage 105 is provided.

According to the displacement of the spool 166A, the port 166K is connected to a port 166L communicating with the pump suction passage 104 or to a port 166J connected to the port 230B of the manual valve 230.

According to this embodiment, the supply pressure to the power recirculation mode clutch 9 is restricted by the inhibitor valve 176 and mode fixing valve 166, so engaging of the power recirculation mode clutch 9 due to a malfunction or incorrect operation when the vehicle is running in the direct mode, and a resultant unintended downshift, are prevented from occurring. According to this embodiment, there is no function to prevent upshift, so the mode fixing valve 166 and inhibitor valve 176 can be made compact, and the construction of the oil passages is also simplified.

Figure 18:
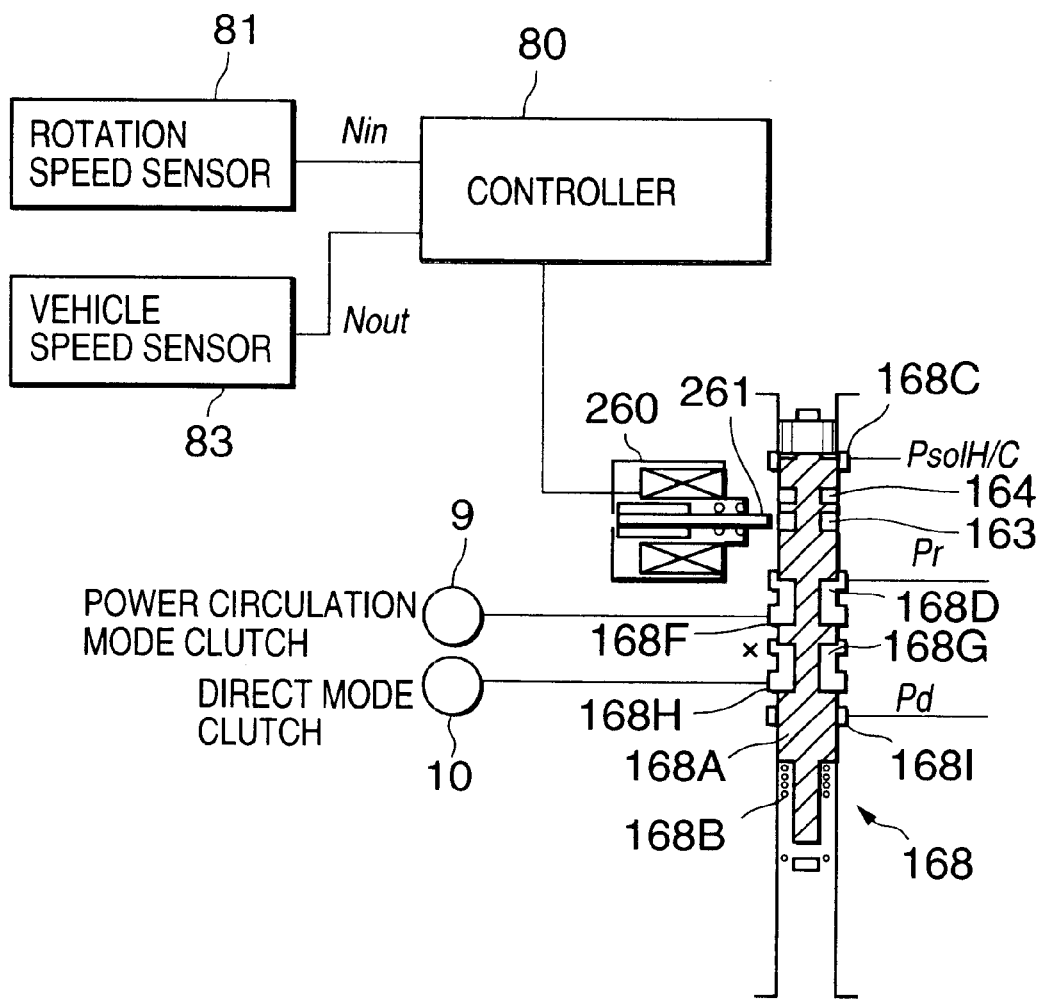
FIG. 18 is a schematic block diagram of the lock mechanism of the mode fixing valve according to a fourth embodiment of this invention.

Next, a fourth embodiment of this invention will be described referring to FIGS. 18 and 19.

According to this embodiment, the inhibitor valve 170, the direct mode clutch control valve 180, power recirculation mode clutch control valve 200 and the cam 280 of the first embodiment are omitted, and a mode fixing valve 168 is used instead of the mode fixing valve 160. Also, the lock mechanism which restricts displacement of the spool 168A of the mode fixing valve 168 comprises a rod 261 and a solenoid 260 which drives the rod. The remaining features of the construction are identical to those of the first embodiment.

The mode fixing valve 168 comprises the spool 168A, a spring 168B which elastically supports the spool 168A, and ports 168C, 168D, 168F, 168G, 168H, 168I formed facing the spool 168A. The signal pressure PsolH/C from the direct mode clutch solenoid 190 is led to the port 168C. The R range pressure Pr from the R range pressure circuit 108 is led to the port 168D. The port 168F connects with the power recirculation mode clutch 9. The port 168H connects with the direct mode clutch 10. The port 168G is released to the drain. The D range pressure Pd from the D range pressure circuit 107 is led to the port 168I.

The spool 168A displaces against the elastic supporting force of the spring 168B due to the signal pressure PsolH/C of the port 168C.

In the raised position, the spool 168A connects the port 168F to the port 168D and connects the port 168H to the drain port 168G, so the power recirculation mode clutch 9 is engaged and the direct mode clutch 10 is released. In the lowered position, it connects the port 168F to the drain port 168G and connects the port 168H to the drain port 168I, so the power recirculation mode clutch 9 is released and the direct mode clutch 10 is engaged.

Grooves 163, 164 are formed in the spool 168A, and the spool 168A is fixed in the raised position or the lowered position by the penetration of the rod 261 in the groove 163 or the groove 164.

The solenoid 260 which drives the rod 261 is energized by an energizing signal from the controller 80. In the energized state, the rod 261 is moved forward, and when the energization is stopped, the rod 261 is withdrawn.

Figure 19:
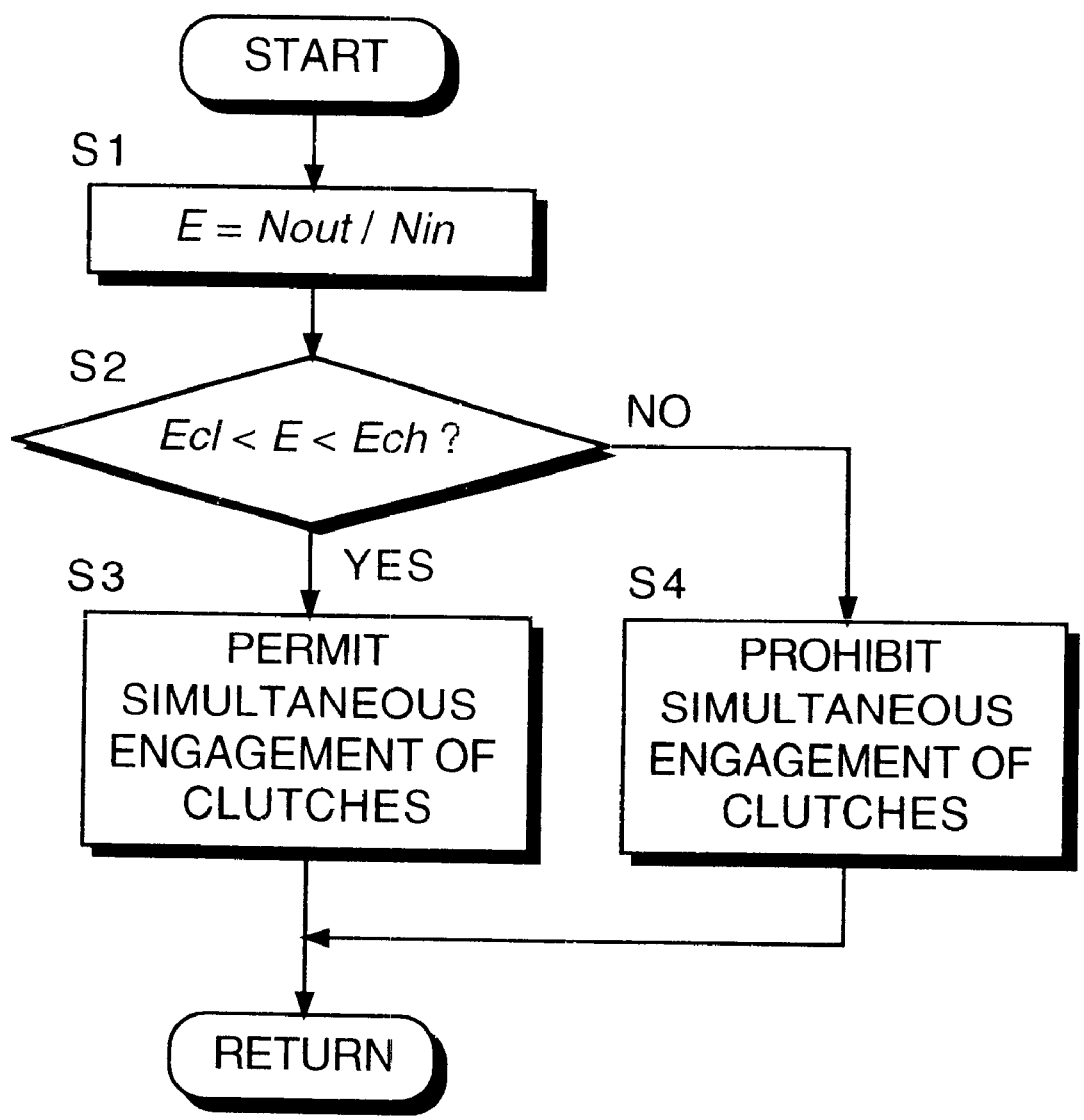
FIG. 19 is a flowchart describing a control routine of the lock mechanism performed by the controller according to the fourth embodiment of this invention.

To lock and unlock the mode fixing valve 168, the controller 80 drives the solenoid 260 by a routine shown in FIG. 19 based on the rotation speed Nin of the input shaft 1 and the rotation speed Nout of the final output shaft 6 detected by the vehicle speed sensor 83. This routine is executed at an interval of 10 milliseconds.

First, in a step S1, the input shaft rotation speed Nin and final output shaft rotation speed Nout are read, and the IVT speed ratio factor E is calculated from $$E = \frac{Nout}{Nin}.$$

In a step S2, it is determined whether or not the current IVT speed ratio factor E is in a range specified by the IVT speed ratio factor Ecl and IVT speed ratio factor Ech shown in FIG. 10.

The IVT speed ratio factor Ecl is the IVT speed ratio factor of the power recirculation mode corresponding to the first speed ratio IcC of the CVT 2 set in the vicinity of the rotation synchronous point RSP, and the IVT speed ratio factor Ech is the IVT speed ratio factor of the direct mode corresponding to the first speed ratio IcC of the CVT 2.

If the IVT speed ratio factor E lies within this range, the routine proceeds to a step S3. Here, the solenoid 260 is not energized, the rod 261 is retracted, displacement of the spool 160A is permitted, and the power recirculation mode clutch 9 and direct mode clutch 10 are permitted to engage simultaneously. After this processing, the routine is terminated.

In the step S2, when the IVT speed ratio factor E does not lie in the range from Ecl to Ech, the routine proceeds to a step S4. Here, the solenoid 260 is energized, the rod 261 is extended and the spool 160A is fixed in its current position, so simultaneous engaging of the power recirculation mode clutch 9 and direct mode clutch 10 is prohibited. After this processing, the routine is terminated.

According to this embodiment, pressure is supplied to only one of the clutches 9 or 10 according to the displacement position of the spool 160A of the mode fixing valve 160. Therefore, the clutches 9, 10 never engage simultaneously.

According to this embodiment, the pressure supplied to the power recirculation mode clutch 9 is the R range pressure Pr, and the pressure supplied to the direct mode clutch 10 is the D range pressure Pd.

According to this embodiment, the construction of the IVT is simplified. Further, the region where simultaneous engaging of the clutches is permitted may be set arbitrarily by setting Ecl and Ech in the controller 80. It is also possible to provide the direct mode clutch control valve 180 and power recirculation mode clutch control valve 200 in this embodiment. If these valves 180,200 are provided, the control pressure Plc from the power recirculation mode clutch control valve 200 may be led to the port 168D instead of the R range pressure Pr, and the control pressure Phc from the direct mode clutch control valve 180 may be led to the port 1681 instead of the D range pressure Pd.

Instead of leading the signal pressure PsolH/C of the direct mode clutch solenoid 190 to the port 168C, the signal pressure PsolL/C of the power recirculation mode clutch solenoid 210 may be led to the port 168C. In this case, a change-over to the power recirculation mode can be effected by reversing the positions of the port 168C and spring 168B in FIG. 18 so that the signal pressure PsolL/C acts on the port 168C. However, the power recirculation mode is used during startup, so the signal pressure PsolL/C must be supplied to the port 168C. If oil temperature is low, the appearance of the signal pressure PsolL/C is slow, and it is possible that when the driver changes the selector lever from the N range to the D range, the mode fixing valve 168 will not respond and the vehicle will start in the direct mode. Therefore, to ensure that the vehicle starts in the power recirculation mode, the construction shown in FIG. 18 which does not require oil pressure to shift to the power recirculation mode is advantageous.

In the step S2, instead of determining whether or not to permit simultaneous engaging of the clutches 9. 10 based on the IVT speed ratio factor E, this determination may be based on the speed ratio lc of the CVT 2. This is because the region Ecl<E<Ech coincides with the region lc>lcC as is clear from FIG. 10.

Next, a fifth embodiment of this invention will be described referring to FIGS. 20–22.

According to this embodiment, the cam 280 used in the second embodiment is omitted, and the displacement of the mode fixing valve 160 is locked by the rod 261 driven by the solenoid 260 as in the fourth embodiment. Also, an inhibitor valve 177 is used which responds to the signal pressure PsolNH from a solenoid 263 instead of the inhibitor valve 170. The remaining features of the construction are identical to those of the second embodiment.

In the mode fixing valve 160, outside the running mode change over region, the displacement of the spool 160A is prevented by the engaging of the rod 261 driven by the solenoid 260 with the groove 163 or groove 164.

The inhibitor valve 177 comprises a spool 177A, spring 177B which elastically supports the spool 177A, an outlet port 177D, ports 177C, 177E, 177F, 177G, 177H, and oil chamber 177I. A signal pressure PsolNH from the solenoid 263 is led to the oil chamber 177I. The signal pressure PsolNH led to the oil chamber 177I displaces the spool 177A in the downward direction of FIG. 20 against the spring 177B.

The output port 177D of the inhibitor valve 177 connects with the direct mode clutch 10. The port 177G connects with the power recirculation mode clutch 9. The port 177H connects with the output port 160F of the mode fixing valve 160. The port 177E connects with the output port 160H of the mode fixing valve 160. The port 177C connects with the output port 180C of the direct mode clutch control valve 180. The port 177F connects with the output port 200C of the power recirculation mode clutch control valve 200. The solenoid 263 generates a signal pressure PsolNH from a pilot pressure Pp of a pilot pressure circuit according to the output signal of the controller 80.

Figure 20:
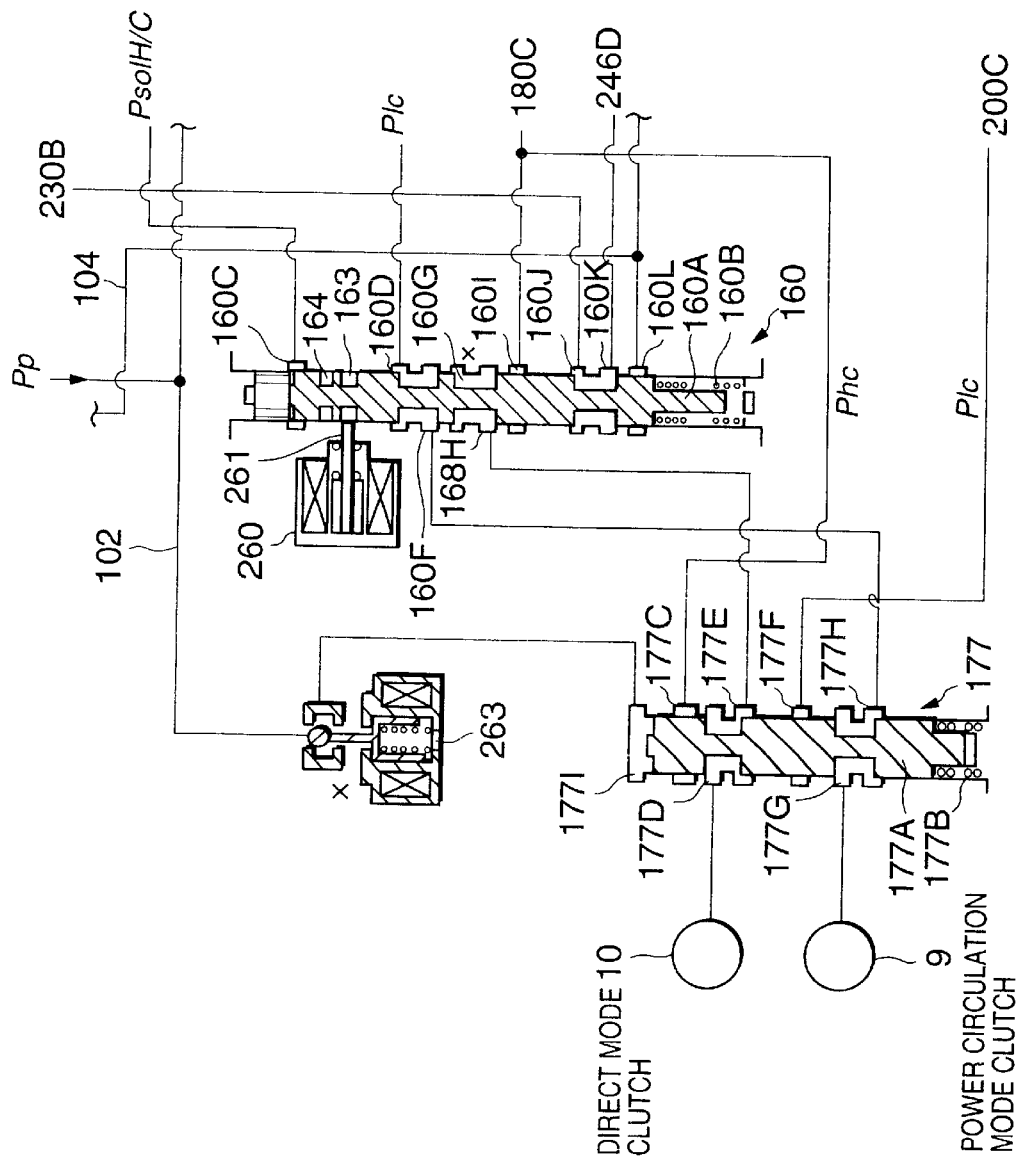
FIG. 20 is similar to FIG. 3B, but showing a fifth embodiment of this invention.
Figure 21:
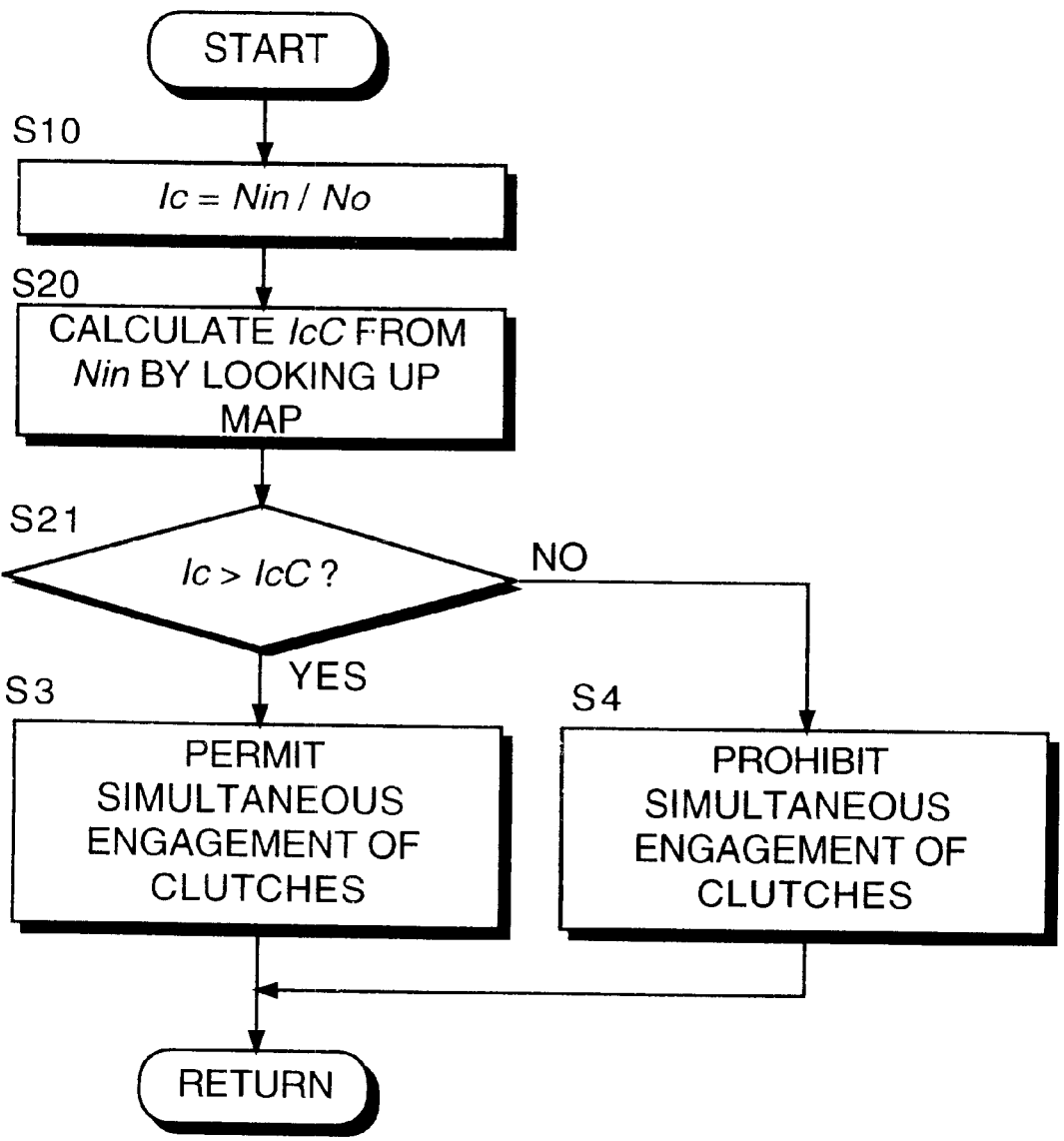
FIG. 21 is a flowchart describing the control routine of the lock mechanism performed by the controller according to the fifth embodiment of this invention.

In the inhibitor valve 177, if the signal pressure PsolNH exceeds predetermined value, a raising pressure of the port 177I pushes the spool 177A to a lowered position in the figure against the spring 177B, the output port 177D is connected with the port 177E, and the port 177G is connected with the port 177H, as shown in FIG. 20. As a result, the control pressure Phc or Plc is supplied to the direct mode clutch 10 or power recirculation mode clutch 9 according to the position of the spool 160A of the mode fixing valve 160, and the other clutch is released to the drain.

If the signal pressure PsolNH is equal to or less than the predetermined value, the spring 177B pushes the spool 177A to a raised position in the figure, the output port 177D is connected with the port 177C, and the port 177G is connected with the port 177F. As a result, the control pressure Plc is supplied to the power recirculation mode clutch 9 from the power recirculation mode clutch control valve 200, and the control pressure Phc is supplied to the direct mode clutch 10 from the direct mode clutch control valve 180.

Next, the routine for controlling the mode fixing valve 160 and inhibitor valve 177 performed by the controller 80 will be described referring to FIG. 21. This routine is performed at an interval of 10 milliseconds.

In a step S10, the rotation speed Nin of the input shaft 1 and rotation speed No of the CVT output shaft 4 are read, and the speed ratio of the CVT 2 is calculated by the equation $$lc = \frac{Nin}{No}.$$

Figure 22:
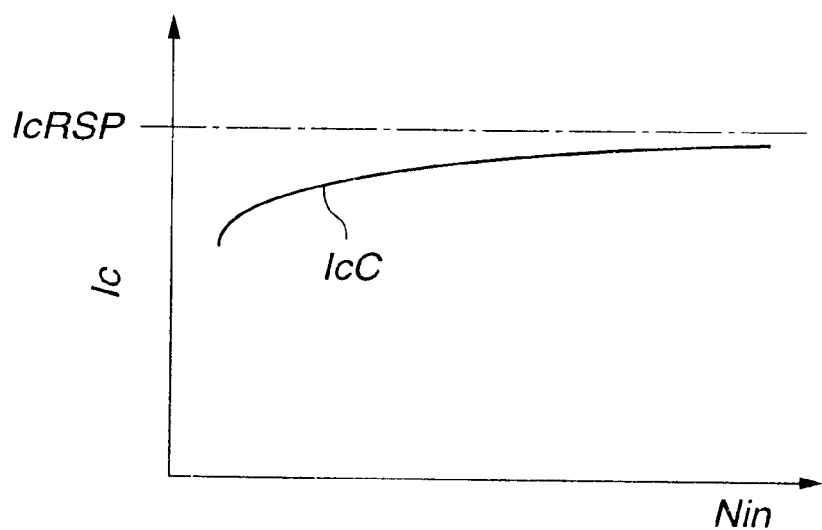
FIG. 22 is a diagram describing the contents of a map of a first speed ratio lcC of the toroidal continuously variable transmission stored by the controller according to the fifth embodiment of this invention.

In a step S20, the first speed ratio lcC of the CVT 2 for determining the running mode change-over region is calculated by looking up a map shown in FIG. 22 based on the rotation speed Nin of the input shaft 1.

In this map, the first speed ratio lcC of the CVT 2 is set to increase the larger the rotation speed Nin of the input shaft 1, i.e., the larger the engine rotation speed Ne.

In a step S21, it is determined whether or not the current speed ratio lc of the CVT 2 is larger than the first speed ratio lcC calculated in the above step S20. When the speed ratio of the CVT 2 is equal to or less than the first speed ratio lcC, the routine proceeds to the step S4, and the solenoid 260 is not energized while the solenoid 263 is energized. As a result, the rod 261 retracts, and the spool 160A can displace.

Also, due to generation of the signal pressure PsollNH by the solenoid 263 which drives the spool 177A to the lowered position, the control pressure Plc is supplied to the power recirculation mode clutch 9 or the control pressure Phc is supplied to the direct mode clutch 10 from the mode fixing valve 160. On the other hand, the clutch 10 or 9 on the opposite side is connected to the drain port 160G of the mode fixing valve 160. Therefore, simultaneous engaging of the power recirculation mode clutch 9 and direct mode clutch 10 is prohibited.

In the step S21, when the speed ratio lc of the CVT 2 is larger than the first speed ratio lcC, the routine proceeds to the step S3. Here, the solenoid 260 is energized to extend the rod 261, and displacement of the spool 160A is obstructed by the penetration of the rod into the groove 163 or the groove 164. Further, supply of power current to the solenoid 263 is stopped so that the signal pressure PsollNH is zero. Hence, the spool 177A displaces to the raised position, the control pressure Plc is supplied to the power recirculation mode clutch 9, and the control pressure Phc is supplied to the direct mode clutch 10. As a result, the power recirculation mode clutch 9 and direct mode clutch 10 are able to engage simultaneously.

According to this embodiment, the determination of simultaneous engagement of the clutches 9 and 10 is performed by the controller 80, so the first speed ratio lcC which is the basis for the determination may be varied according to the engine rotation speed Ne. Therefore, the first speed ratio lcC is made to approach the rotation synchronous point RSP, and the region of the speed ratio lc or IVT speed ratio factor E which permits simultaneous engagement is made narrower the higher the engine rotation speed Ne.

When the rotation speed Nin of the input shaft 1 is high, the variation of the engine rotation speed Ne increases even if the width of speed ratio variation due to downshift is small. It is desirable that, when the input shaft 1 is rotating at high speed, the first speed ratio lcC is set so that the variation amount of the engine rotation speed Ne is small even if simultaneous engagement of the clutches 9 and 10 occurs unintentionally. However, with such a setting, the region in which the running mode can be changed over when the input shaft 1 is rotating at low speed is then narrower, and the degree of freedom of control by the controller 80 is small.

Therefore, the speed ratio lcC of the CVT 2 is made to approach the rotation synchronous point RSP as the rotation speed Nin of the input shaft 1 increases, as shown in the map of FIG. 22. In other words, the running mode change-over region is condensed. As a result, when the rotation speed Nin of the input shaft 1 is high, the variation amount of the engine rotation speed Ne is suppressed small even if simultaneous engagement of the clutches occurs unintentionally.

When the rotation speed Nin of the input shaft 1 is low, the first speed ratio lcC decreases and the running mode change-over region enlarges, so there is more degree of freedom of control.

Next, a sixth embodiment of this invention will be described referring to FIGS. 23–25.

Figure 24:
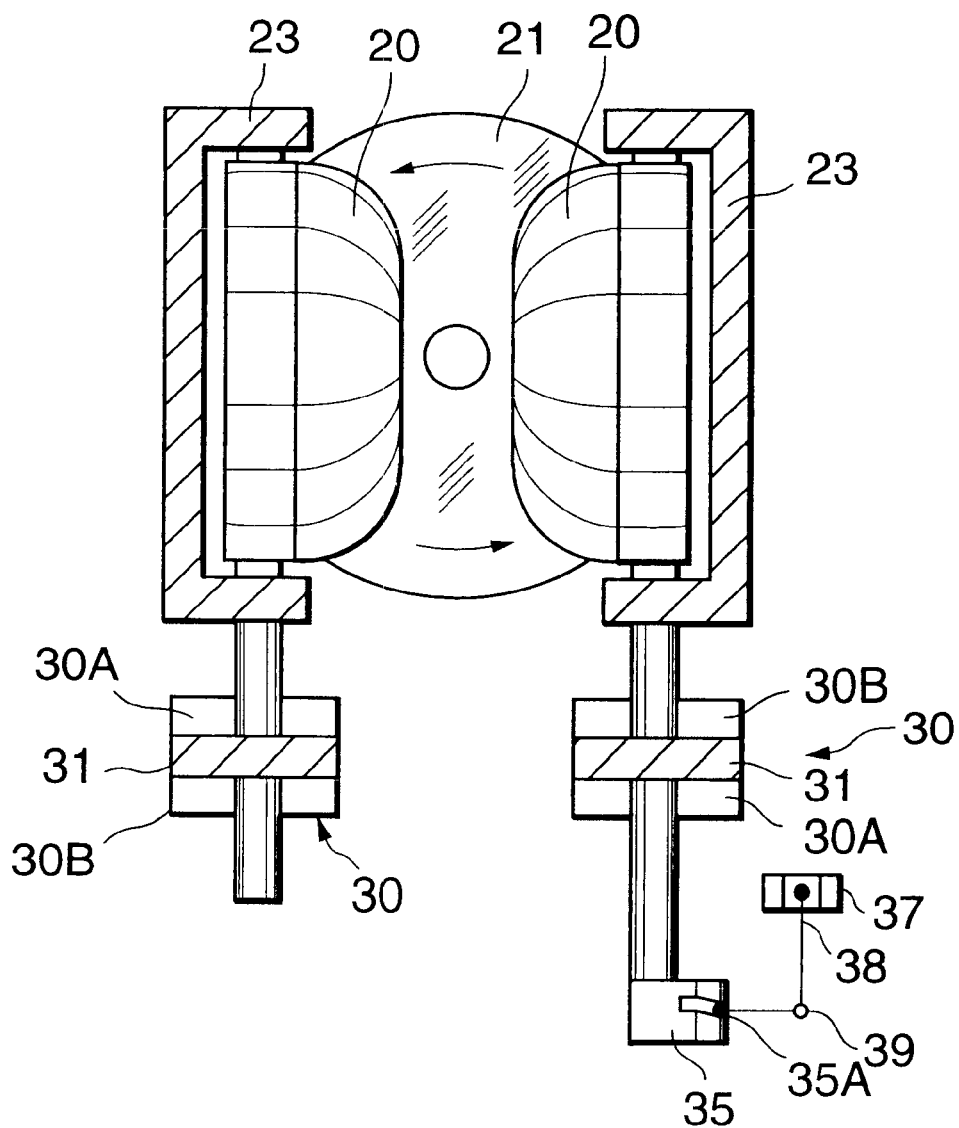
FIG. 24 is a schematic block diagram of the toroidal continuously variable transmission according to the sixth embodiment of this invention.

In this embodiment, a precess cam 35 shown in FIG. 24 is used instead of the precess cam 135 of the first embodiment. The precess 35 cam is fixed to one of the trunnions 23 in the first toroidal unit 2X. Though the input disk 21 of the first toroidal unit 2X rotates together with the input disk 21 of the second toroidal unit 2Y, since these input disks 21 are disposed to face each other, the rotation direction of the input disk 21 in the FIG. 4 and that of FIG. 24 look different.

In FIG. 24, in order to increase the speed ratio lc of the CVT 2, the trunnion 23 which is equipped with the precess cam 35 should move upward, which is the reverse direction of the movement of the precess cam 135 in FIG. 4. Due to this difference, the oil chamber 30B of this trunnion 23 is located above the piston 31 and the oil chamber 30A of the same is located under the piston 31. Also, the cam groove of the precess cam 35 is sloping in a different direction to that of the precess cam 135 in FIG. 4.

Figure 25:
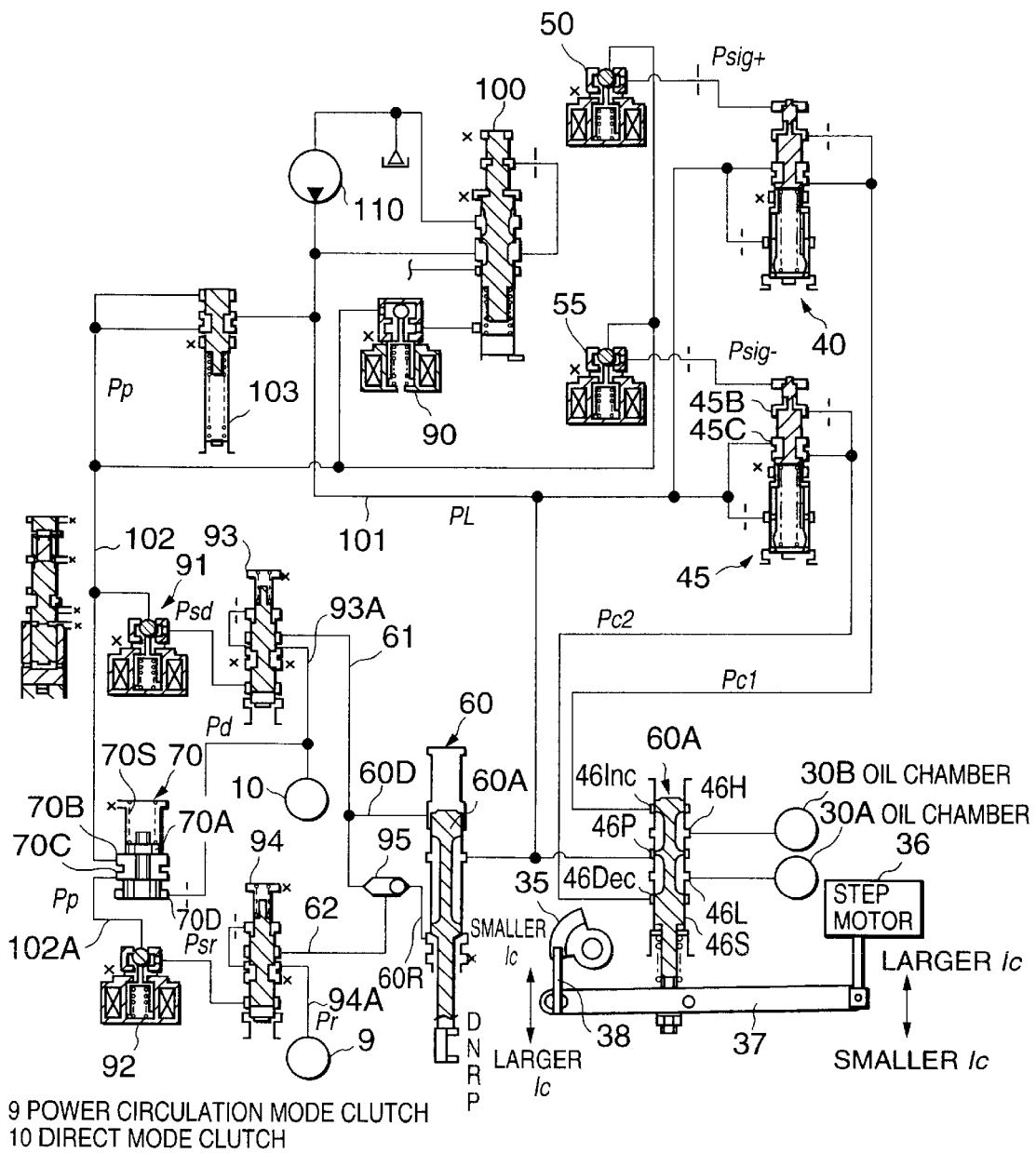
FIG. 25 is the oil pressure circuit diagram of the infinite variable speed ratio transmission according to the sixth embodiment of this invention.

A shift control valve 46 shown in FIG. 25 is used instead of the shift control valve 246 of the first embodiment. The arrangement of a port 46L communicating with the oil chamber 30A and a port 46H communicating with the oil chambers 30B in the shift control valve 46 is set to the opposite of the arrangement of the identical ports 246L, 246H in the shift control valve 246.

As a result, the displacement direction of the speed change link 37 and the variation direction of the speed ratio of the CVT 2 are opposite to those of the first embodiment.

The step motor 36 has an identical construction to that of the step motor 136 of the first embodiment, but the speed change link 37 is driven so that when the step number output as a signal by the controller 80 decreases, the speed ratio lc of the CVT 2 is increased, and when the step number increases, the speed ratio lc of the CVT 2 is decreased.

The oil pressure circuit of this embodiment will now be described referring to FIG. 25. The oil pressure supplied from the oil pump 110 is regulated by the pressure regulator valve 100 based on the signal pressure from the solenoid valve 90, and is supplied as the predetermined line pressure PL to the line pressure circuit 101.

The solenoid valve 90 is controlled by the controller 80, and generates a signal pressure from the pilot pressure Pp supplied by the pilot pressure circuit 102. The pilot valve 103 generates the pilot pressure Pp in direct proportion to the line pressure PL from the pressure regulator valve 100.

The shift control valve 46, a positive torque control valve 40 and a negative torque control valve 45 are connected in parallel to the line pressure circuit 101.

The shift control valve 46 comprises a spool 46S driven by the speed change link 37. A supply port 46P communicating with the line pressure circuit 101, the port 46L communicating with the oil chamber 30A of the oil pressure cylinder 30, the port 46H communicating with the oil pressure 30B of the oil pressure cylinder 30, a first port 46Inc communicating with the positive torque control valve 40, and a second port 46Dec communicating with the negative torque control valve 40, are formed facing the spool 46S.

The shift control valve 46 connects the oil chamber 30A to one of the second port 46Dec and supply port 46P, and simultaneously connects the oil chamber 30B to one of the supply port 46P and first port 46Inc according to the displacement of the spool 46S.

The positive torque control valve 40 and negative torque control valve 45 comprise pressure control valves.

The positive torque control valve 40 varies a pressure Pc1 supplied to the first port 46Inc according to a signal pressure Psig+ of a positive torque solenoid 50. The negative torque control valve 45 varies a pressure Pc2 supplied to the second port 46Dec according to a signal pressure Psig– from a negative torque solenoid 55.

When the spool 46S is in a position to supply the line pressure PL of the supply port 46P to the oil chamber 30A, the shift control valve 46 simultaneously maintains the oil chamber 30B at the pressure Pc1 via the first port 46Inc. Likewise, when the spool 46S is in a position to supply the line pressure PL of the supply port 46P to the oil chamber 30B, the shift control valve 46 simultaneously maintains the oil chamber 30A at the pressure Pc2 via the second port 46Dec.

The torque transmitted by the power roller 20 is controlled by controlling the pressure difference of the oil chamber 30A and oil chamber 30B. This control is achieved by the controller 80 performing duty control of the energization state of the positive torque solenoid 50 and negative torque solenoid 55.

A manual valve 60 joined to the selector lever, is connected to the line pressure circuit 101. The manual valve 60 supplies the line pressure PL to one or both of a direct mode clutch control valve 93 and power recirculation mode clutch control valve 94 according to the displacement of a spool 60A.

The spool 60A and displaces according to the selection range of the selector lever, i.e., P range, R range, N range and D range. In the D range position, the line pressure PL is supplied from a port 60D to the direct mode clutch control valve 93 via an oil passage 61.

At the same time, the line pressure PL is supplied to the power recirculation mode clutch control valve 94 via a shuttle valve 95 and oil passage 62.

In the R range position, the line pressure PL is supplied from a port 60R only to the power recirculation mode clutch control valve 94 via the shuttle valve 95 and oil passage 62. In the case of the R range, as the vehicle only reverses, it is not necessary to engage the direct mode clutch 10. In other words, it is sufficient to engage only the power recirculation mode clutch 9, so in the R range position, the line pressure PL is not supplied to the direct mode clutch control valve 93.

In the P range position and N range position, the ports 60D, 60R are shut off from the line pressure PL, and the line pressure PL is not supplied to either the power recirculation mode clutch 9 or the direct mode clutch 10.

The direct mode clutch control valve 93 communicates with the direct mode clutch 10 via an oil passage 93A. The direct mode clutch control valve 93 supplies the clutch pressure Pd to the direct mode clutch 10 via the oil passage 93A according to the magnitude of the signal pressure Psd from a direct mode clutch solenoid 91 having the same construction as the direct mode clutch solenoid 190 of the first embodiment. Specifically, the clutch pressure Pd is controlled by connecting the oil passage 93A to the oil passage 61 and drain in the proportion depending on the signal pressure Psd. As a result, the direct mode clutch 10 engages with the engaging force in direct proportion to the signal pressure Psd. When the signal pressure Psd is a minimum, the oil passage 93A is connected with the drain to release the direct mode clutch 10, and when the signal pressure Psd is a maximum, the clutch pressure Pd is equal to the line pressure PL.

Likewise, the power recirculation mode clutch control valve 90 controls the clutch pressure Pr supplied to the power recirculation mode clutch 9 according to a signal pressure Psr from the power recirculation mode clutch solenoid 92.

The solenoids 91, 92 are controlled by the controller 80. The controller 80 changes over from the power recirculation mode to the direct mode or vice versa by selectively engaging in the power recirculation mode clutch 9 or direct mode clutch 10.

Figure 23:
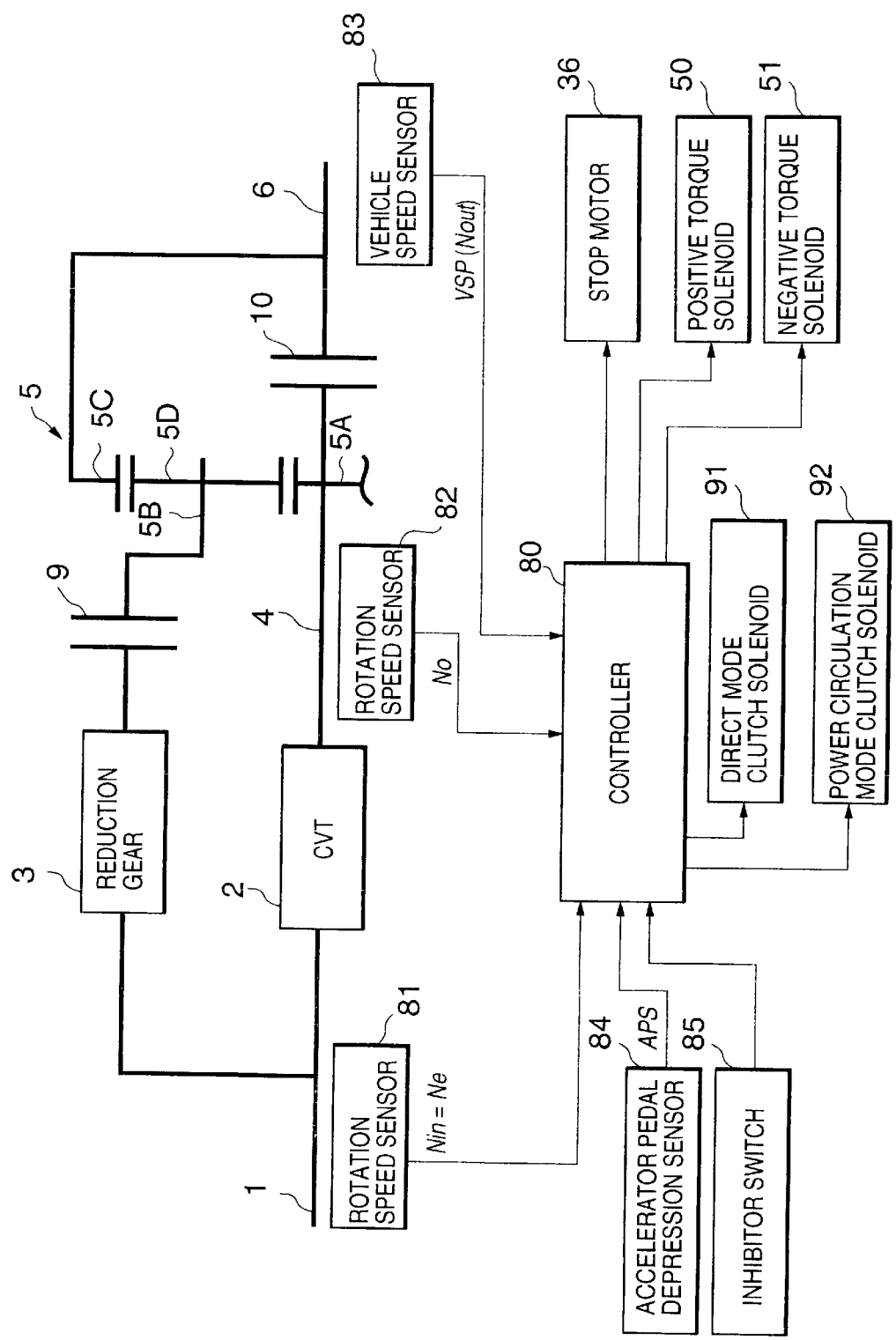
FIG. 23 is similar to FIG. 5, but showing a sixth embodiment of this invention.

In order to perform this control, signals are respectively input to the controller 80 from the rotation speed sensor 81 which detects the rotation speed of the input shaft 1, the rotation speed sensor 82 which detects the rotation speed No of the CVT output shaft 4, the vehicle speed sensor 83 which detects the vehicle speed VSP, the accelerator pedal depression sensor 84 which detects the accelerator pedal depression amount, and the inhibitor switch 85 which detects the selection range of the selector lever, as shown in FIG. 23.

The vehicle speed sensor 83 detects the vehicle speed from the rotation speed Nout of the final output shaft 6. Therefore, the detection result of the vehicle speed sensor 83 is used not only as the vehicle speed VSP, but also as the rotation speed Nout of the final output shaft 6.

The controller 80 changes over between the power recirculation mode and direct mode by selectively engaging the power recirculation mode clutch 9 and direct mode clutch 10 by controlling energization of the solenoids 91, 92 according to these detected values showing the running state of the vehicle. The step motor 36 is driven to control the CVT speed ratio lc so as to obtain an IVT speed ratio factor E suited to the running state. Further, in the power recirculation mode, the transmission torque of the CVT 2 is controlled via the pressure difference in the oil pressure cylinder 30 of the CVT 2 by controlling energization of the positive torque solenoid 50 or negative torque solenoid 55.

Here, the pilot pressure circuit 102 which supplies the pilot pressure Pp to the power recirculation mode clutch solenoid 92 which drives the power recirculation mode clutch control valve 94, receives supply of the pilot pressure Pp from the inhibitor valve 70 installed further downstream from the pilot pressure circuit 102 than the direct mode clutch solenoid 91.

The inhibitor valve 70 controls the pilot pressure Pp of the pilot pressure circuit 102 supplied to the power recirculation mode clutch solenoid 92 according to the clutch pressure Pd of the direct mode clutch 10. Until the clutch pressure Pd exceeds a preset value, the inhibitor valve 70 supplies the pilot pressure Pp to the power recirculation mode clutch 92 so as to permit engaging of the power recirculation mode clutch control valve 94 by the power recirculation mode clutch solenoid 92. However, if the clutch pressure Pd exceeds a preset value, the pilot pressure circuit 102 is shut off, and the pilot pressure Pp supplied to the power recirculation mode clutch 92 is set to zero. Due to this operation, the signal pressure Psr generated by the power recirculation mode clutch solenoid 92 is set to zero and the power recirculation mode clutch 9 is forcibly disengaged.

The inhibitor valve 70 comprises a spool 70A, and ports 70B, 70C, 70D facing the spool 70A. The port 70B communicates with the pilot pressure circuit 102 downstream of the direct mode clutch solenoid 91. The port 70C communicates with the power recirculation mode clutch solenoid 92. The inhibitor valve 70 connects or disconnects the port 70B and the port 70C according to the displacement of the spool 70A. The port 70D is provided facing one edge of the spool 70A, and communicates with the oil passage 93A supplying the clutch pressure Pd to the direct mode clutch 10. The other edge of the spool 70A is elastically supported against the clutch pressure Pd of the port 70D by a spring 70S.

The supporting force of the spring 70S is set as follows.

Until the clutch pressure Pd of the direct mode clutch 10 reaches a preset value, the spring 70S pushes the spool 70S downward in FIG. 28 so that the port 70B connects with the port 70C. However, if the clutch pressure Pd exceeds the preset value, the clutch pressure Pd pushes the spool 70A upward in FIG. 28 to shut off the port 70C, and the port pilot pressure Pp supplied to the power recirculation mode clutch solenoid 92 is set to zero.

As a result, when the vehicle is running in the direct mode, the port 70C is shut off, and the pilot pressure Pp supplied to the power recirculation mode clutch solenoid 92 is zero even if the power recirculation mode clutch solenoid 92 performs an action to engage the power recirculation mode clutch 9 due to malfunction or incorrect operation of the power recirculation mode clutch 92, so the signal pressure Psr output by the solenoid 92 is also 0. Therefore, the clutch pressure Pr is no t supplied from the power recirculation mode clutch control valve 94 to the power recirculation mode clutch 9, and when the vehicle is running in the direct mode, the power recirculation mode clutch 9 cannot be engaged.

Next, a seventh embodiment of this invention will be described referring to FIG. 26.

In this embodiment, an inhibitor valve 71 which responds to the clutch pressure Pr of the power recirculation mode clutch 9 is disposed between the direct mode clutch solenoid 91 and pilot pressure circuit 102 of the sixth embodiment.

The remaining features of the construction are identical to those of the sixth embodiment.

The inhibitor valve 71 comprises a spool 71A, and ports 71B, 71C, 71D facing the spool. The port 71B communicates with the pilot pressure circuit 102, and the port 71C communicates with the direct mode clutch solenoid 91. The port 71D is provided facing one edge of the spool 71A, and communicates with an oil passage 94A supplying the clutch pressure Pr to the power recirculation mode clutch 9. The other edge of the spool 71A is elastically supported in the direction opposite to the clutch pressure Pr of the port 71D by a spring 71S.

The supporting force of the spring 71S is set as follows.

Figure 26:
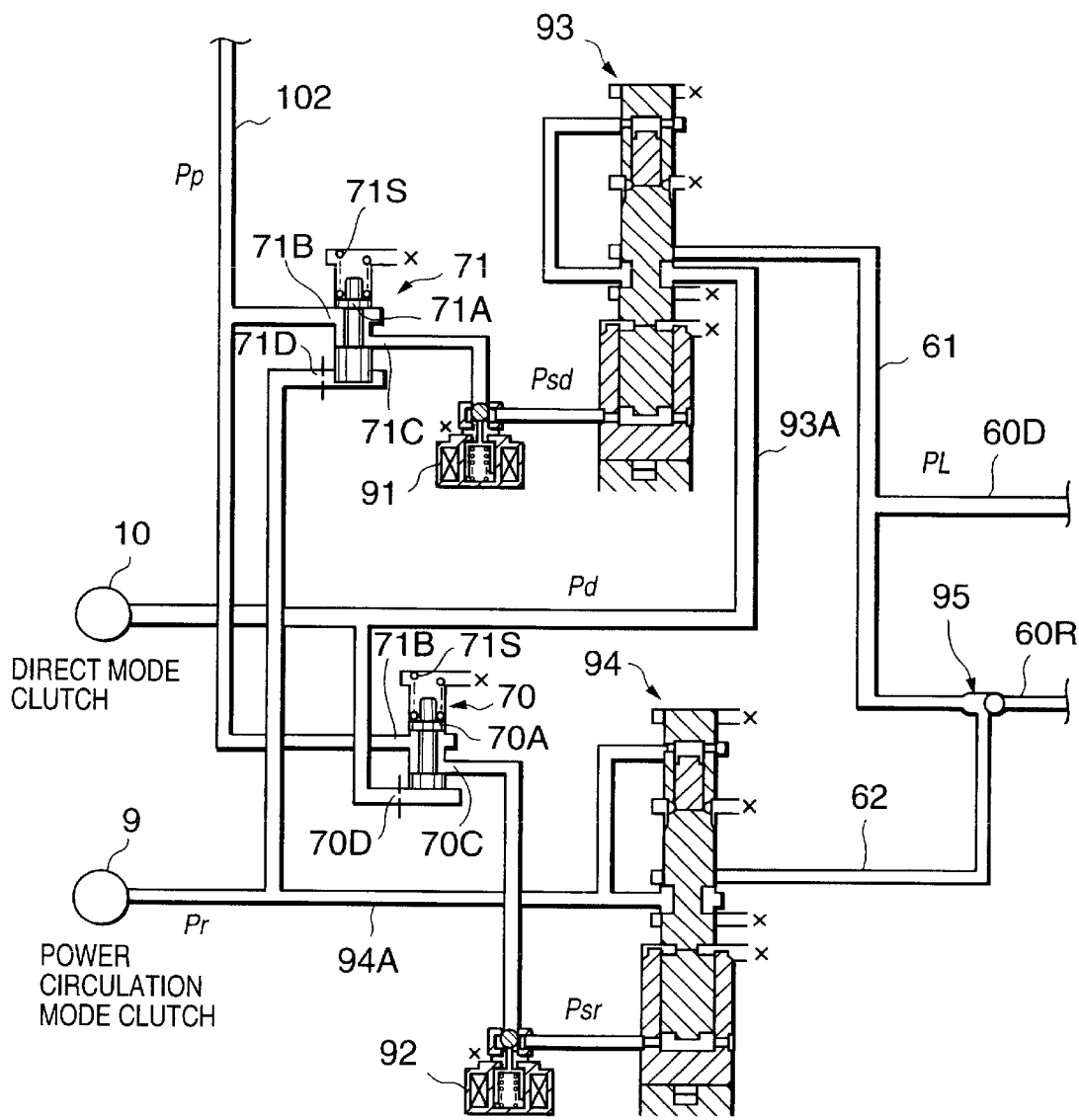
FIG. 26 is an enlarged view of the essential parts of the oil pressure circuit diagram of the infinite variable speed ratio transmission according to a seventh embodiment of this invention.

Until the clutch pressure Pr of the power recirculation mode clutch 9 reaches a preset value, the spring 71S pushes the spool 71A downwards in FIG. 26, and the ports 71B, 71C are connected so that the pilot pressure Pp is supplied as it is to the power recirculation mode clutch solenoid 91. However, when the clutch pressure Pr exceeds the preset value, the clutch pressure Pr pushes the spool 71A upwards in FIG. 29, the port 71C is shut off, and engaging of the direct mode clutch 10 is prohibited.

As a result, when the vehicle is running in the power recirculation mode, the port 71C is shut off, and the pilot pressure Pp supplied to the direct mode clutch solenoid 91 is zero even if the direct mode clutch valve 93 performs an action to engage the direct mode clutch 10 due to malfunction or incorrect operation of the direct mode clutch valve 93.

Therefore, the clutch pressure Pd is not supplied from the direct mode clutch control valve 93 to the direct mode clutch 10, and when the vehicle is running in the power recirculation mode, the direct mode clutch 10 cannot be engaged.

Therefore, according to this embodiment, in addition to the fact that engaging of the power recirculation mode clutch 9 is stopped in the direct mode as in the sixth embodiment, engaging of the direct mode clutch 10 in the power recirculation mode is also prohibited and unintended speed ratio variations are definitively prevented.

When the selector lever selects the R range, line pressure is supplied from the port 60R of the manual valve 60 only to the oil passage 62 via the shuttle valve 95, and the line pressure PL is not supplied to the oil passage 61. As a result, when the R range is selected, line pressure is not supplied to the direct mode clutch 10 regardless of the presence of the inhibitor valve 71.

Next, an eighth embodiment of this invention will be described referring to FIG. 27 and FIGS. 28A–28D.

In this embodiment, the operations of the inhibitor valves 70, 71 of the seventh embodiment are made to overlap during change-over between the direct mode and power recirculation mode. The arrangement of the oil pressure circuit is identical to that of the seventh embodiment.

In the sixth embodiment and seventh embodiment, the engaging states of the clutches 9, 10 are changed over at the rotation synchronous point RSP shown in FIG. 31. At this time, if the change-over of the engaging states of the clutches 9, 10 is performed instantaneously, a lag between the disengagement of one clutch and the engagement of the other clutch may be introduced. Such a lag may cause the engine rotation speed to increase abruptly without the driver's intention, and the driver may experience an uncomfortable feeling.

To avoid such a lag, in this embodiment, the inhibitor valve 71 which controls the pilot pressure Pp supplied to the direct mode clutch solenoid 91 is constructed as follows.

An elastic supporting force Fd(x) exerted by the spring 71S on the spool 71A is set larger than the clutch pressure Pr exerted by the power recirculation mode clutch 9 on the spool 71A. Here, the elastic supporting force Fd(x) of the spring 71S is expressed as a function of the displacement amount x of the spool 71S. If the surface area of the spool 71A on which the clutch pressure Pr is exerted, is S, and the clutch pressure which brings the power recirculation mode clutch 9 to a predetermined partial engagement state is PrH, the pressure receiving surface area S is set so that Fd(x) >PrH·S.

Figure 27:
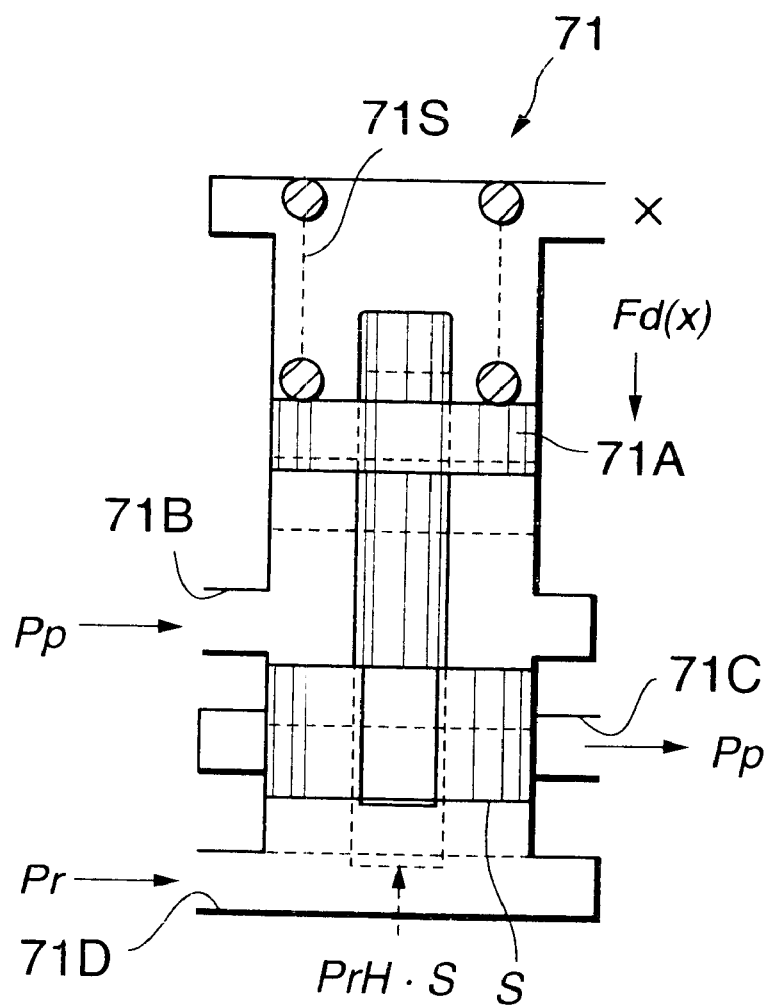
FIG. 27 is a schematic block diagram of the inhibitor valve according to an eighth embodiment of this invention.

Due to this setting, while the clutch pressure Pr of the power recirculation mode clutch 9 exceeds PrH, the spool 71A is pushed upwards as shown by the solid line of FIG. 27, and the port 71C is closed. However, if the clutch pressure Pr falls below PrH, the spool 71A descendants to the dotted line position in the figure due to the elastic supporting force Fd(x) of the spring 71, and the ports 71C, 71B are then connected with each other. Subsequently, the pilot pressure Pp supplied to the direct mode clutch solenoid 91 increases as the spool 71A descends.

Therefore, if the clutch pressure Pr of the power recirculation mode clutch 9 is less than PrH, the direct mode clutch solenoid 91 can increase the signal pressure Psd, and the direct mode clutch 10 can be engaged.

Control of change-over from the power recirculation mode to the direct mode performed by the controller 80 in the aforesaid construction will now be described referring to FIGS. 28A–28D.

First, if the observed IVT speed ratio factor E exceeds the speed ratio factor ERSP corresponding to the rotation synchronous point RSP, the controller 80 determines that the running mode change-over conditions hold. When the change-over conditions hold, firstly at a time T1, the duty ratio of the output signal to the direct mode clutch solenoid 91 is set to 100% and the direct mode clutch solenoid 91 is energized, as shown in FIG. 28B. The solenoids 91, 92 are energized according to the duty ratio of the output signals of the controller 80. At this moment, however, the pilot pressure Pp is not provided to the direct mode clutch solenoid 91, so the direct mode clutch solenoid 91 does not generate the signal pressure Psd even if it is energized.

Then, at a time T2, the controller 80 begins to gradually reduce the duty ratio of the output signal to the power recirculation mode solenoid 92, as shown in FIG. 28A.

At a time T4, the duty ratio reaches zero, and the power recirculation mode clutch 9 is completely disengaged.

On the other hand, at a time T3 prior to the time T4, when the clutch pressure Pr of the power recirculation mode clutch 9 is equal to or less than the partial engagement equivalent pressure PrH, supply of the pilot pressure Pp to the direct mode clutch solenoid 91 begins, as shown in FIG. 28C. The clutch pressure Pd of the direct mode clutch 10 then rises as shown in FIG. 28D according to the signal pressure Psd generated by the direct mode clutch solenoid 91, and engaging of the direct mode clutch 10 is complete before the time T4 is reached.

Engaging the direct mode clutch 10 while the power recirculation mode clutch 9 is still partially engaged prevents a state where both the clutches 9, 10 are disengaged, from occurring. Therefore, the engine rotation speed does not increase abruptly when there is a change-over of running mode. Further, as the power recirculation mode clutch 9 is in the partially engaged state when there is a change-over of running mode, an excessive force does not act on rotating parts of the IVT even if the direct mode clutch 10 is engaged. Hence, the change-over of the clutch takes place smoothly.

After the duty ratio of the output signal to the direct mode clutch solenoid 91 has been set to 100%, the duty ratio of the output signal to the power recirculation mode clutch solenoid 92 is decreased, so when the power recirculation mode clutch 9 enters the partially engaged state and the inhibitor valve 71 operates, the signal pressure Psd of the solenoid 91 immediately increases and engaging of the direct mode clutch 10 can be performed rapidly. When there is a change-over from the direct mode to the power recirculation mode, an identical process to the above takes place. In other words, after the duty ratio of the output signal to the power recirculation mode clutch solenoid 92 is set to 100%, the clutch pressure Pd of the direct mode clutch 10 decreases. When the direct mode clutch 10 enters the partially engaged state, the power recirculation mode clutch 9 engages rapidly.

Next, a ninth embodiment of this invention will be described referring to FIGS. 29 and 30.

Figure 29:
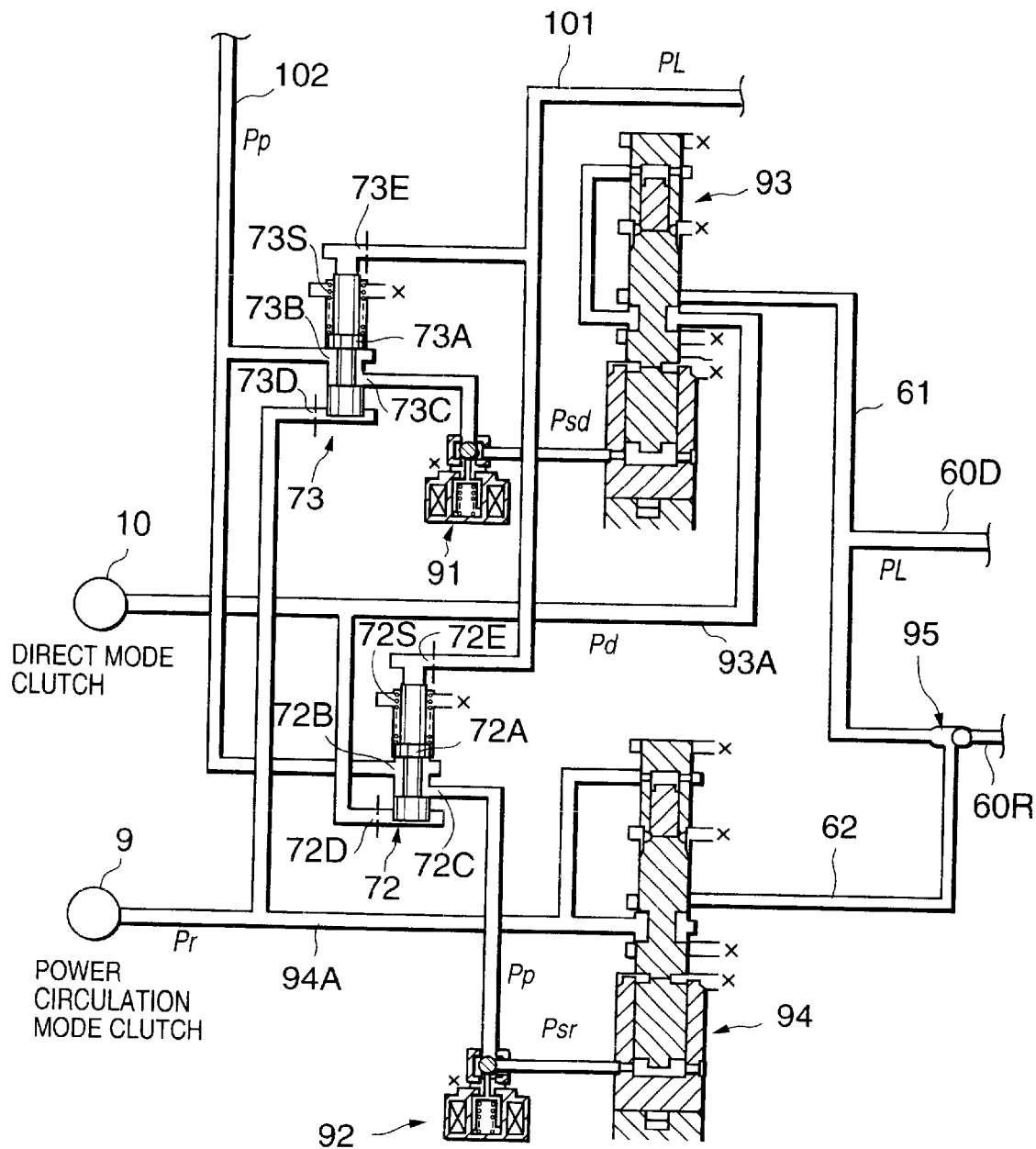
FIG. 29 is similar to FIG. 26, but showing a ninth embodiment of this invention.

According to this embodiment, inhibitor valves 72, 73 of different construction are used as shown in FIG. 29, instead of the inhibitor valves 70, 71 of the eighth embodiment.

Figure 30:
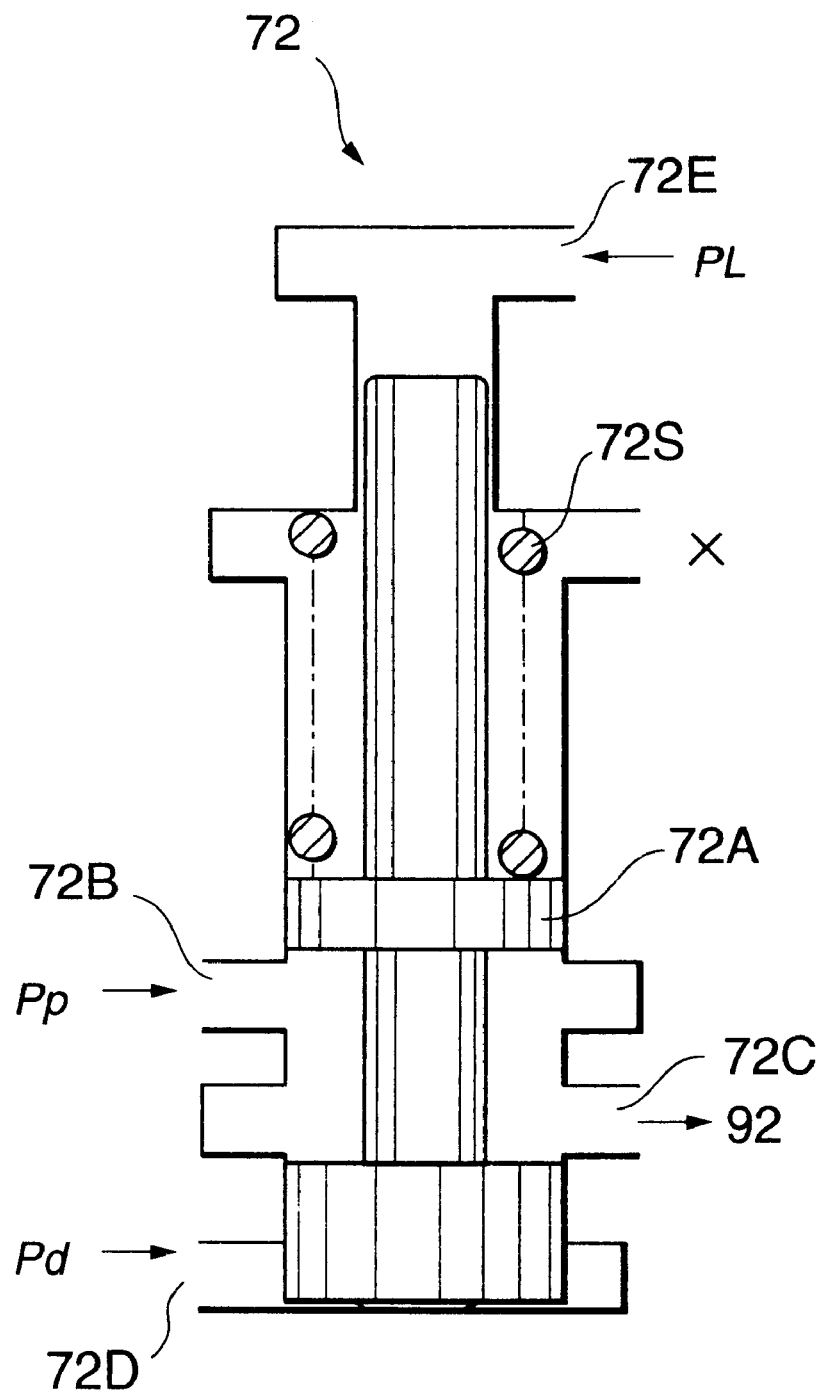
FIG. 30 is a schematic block diagram of the inhibitor valve according to the ninth embodiment of this invention.

The inhibitor valve 72 comprises a spool 72A, a spring 72S, and ports 72B, 72C, 72D, 72E facing the spool 72A as shown in FIG. 30.

The port 72B communicates with the pilot pressure circuit 102. The port 72C communicates with the power recirculation mode clutch solenoid 92. The port 72D communicates with the oil passage 93A, and exerts the clutch pressure Pd on one edge of the spool 72A. The port 72E communicates with the line pressure circuit 101, and exerts the line pressure PL on the other edge of the spool 72A in an opposite direction to the clutch pressure Pd. The spring 72S supports the spool 72A elastically in the same direction as that of the line pressure PL.

The spool 72A displaces according to the balance between the clutch pressure Pd of the direct mode clutch 10, and the line pressure PL and the elastic supporting force of the spring 72S, both of which act in the opposite direction to the clutch pressure Pd. As in the case of the eighth embodiment, by opening and closing the port 72C, engaging of the power recirculation mode clutch 9 while the direct mode clutch 10 is engaged, is prevented. On the other hand, when there is a change-over from the direct mode to the power recirculation mode, when the clutch pressure Pd on the direct mode clutch 10 decreases to the partial engagement equivalent pressure PrH, the spool displaces downwards in FIG. 30 so that the ports 72B, 72C are connected, and engaging of the power recirculation mode clutch 9 is permitted.

The inhibitor valve 73 comprises a spool 73A, a spring 73S, and ports 73B, 73C, 73D, 73E facing the spool 73A.

The port 73B communicates with the pilot pressure circuit 102. The port 73C communicates with the direct mode clutch solenoid 91. The port 73D communicates with the oil passage 94A, and exerts the clutch pressure Pr on one edge of the spool 73A. The port 73E communicates with the line pressure circuit 101, and exerts the line pressure PL on the other edge of the spool 73A in an opposite direction to the clutch pressure Pr. The spring 73S supports the spool 73A elastically in the same direction as that of the line pressure PL.

The spool 73A displaces according to the balance between the clutch pressure Pr of the power recirculation mode clutch 9, and the line pressure PL and the elastic supporting force of the spring 73S, both of which act in the opposite direction to the clutch pressure Pr.

By opening and closing the port 73C, engaging of the direct mode clutch 10 while the power recirculation mode clutch 9 is engaged, is prevented. On the other hand, when there is a change-over from the power recirculation mode to the direct mode, according to decrease of the clutch pressure Pr on the power recirculation mode clutch 9 to a partial engagement equivalent pressure PdH which is defined in the same way as the partial engagement equivalent pressure PrH, the spool displaces downwards, so that the ports 73B, 73C are connected, and engaging of the direct mode clutch 10 is permitted.

The line pressure PL varies according to the running state. For example, if the line pressure PL is supplied using an oil pump driven by the input shaft 1, the line pressure PL also varies according to the rotation speed Nin of the input shaft 1.

The clutch pressure Pd of the power recirculation mode clutch 9 and clutch pressure Pr of the direct clutch 10 are generated when the direct mode clutch control valve 93 and power recirculation mode clutch control valve 94 respectively reduce the line pressure PL. Therefore, the clutch pressures Pd, Pr also vary according to the running state of the vehicle.

It is therefore preferable that the partial engagement equivalent pressures PrH and PdH also vary together with the line pressure PL.

For this purpose, in this embodiment, in addition to the elastic supporting force of the spring 72S (73S), the line pressure PL is applied as a force opposing the clutch pressure Pd (Pr). By varying the partial engagement equivalent pressure PrH (PdH) according to the variation of the line pressure PL, the operating precision of the inhibitor valves 72, 73 when there is a change of running mode can be increased.

The contents of Tokugan Hei 11-154924, with a filing date of Jun. 2, 1999 in Japan, and Tokugan 2000-94754 with a filing date of Mar. 30, 2000 are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A clutch control device for use with an infinite variable speed ratio transmission for a vehicle, the infinite variable speed ratio transmission comprising an input shaft, a continuously variable transmission which transmits a rotation of the input shaft at an arbitrary speed ratio to a continuously variable transmission output shaft, a fixed speed ratio transmission which transmits the rotation of the input shaft at a fixed speed ratio to a fixed speed ratio transmission output shaft, a planetary gear mechanism having a first rotation member connected to the continuously variable transmission output shaft, a second rotation member connected to the fixed transmission output shaft, and a third rotation member varying a rotation direction and a rotation speed according to a difference of a rotation speed of the first rotation member and a rotation speed of the second rotation member, a direct mode clutch which engages to connect the continuously variable transmission output shaft and the third rotation member and disengages to disconnect the continuously variable transmission output shaft and the third rotation member according to a supplied oil pressure, and a power recirculation mode clutch which engages to connect the fixed speed ratio transmission output shaft and the second rotation member and disengages to disconnect the fixed speed ratio transmission output shaft and the second rotation member according to a supplied oil pressure, the clutch control device comprising:

a first valve for supplying an oil pressure to the direct mode clutch and power recirculation mode clutch;

means for detecting a running condition of the vehicle;

means for controlling the first valve according to the running condition; and means for preventing simultaneous engagement of the direct mode clutch and the power recirculation mode clutch by overriding a control of the first valve by the controlling means when the running condition does not correspond to a predetermined specific region, and permits simultaneous engagement of the direct mode clutch and the power recirculation mode clutch when the running condition corresponds to the predetermined specific region.

2. A clutch control device as defined in claim 1, wherein the running condition detecting means comprises a sensor for detecting the speed ratio of the continuously variable transmission, and the predetermined specific region is a region where the speed ratio of the continuously variable transmission exceeds a predetermined first speed ratio lcC.

3. A clutch control device as defined in claim 1, wherein the planetary gear mechanism comprises a sun gear, plural planet gears which engage with an outer circumference of the sun gear, a planet carrier which holds the plural planet gears, and a ring gear which engages with the plural planet gears, and the first rotation member comprises the sun gear, the second rotation member comprises the planet carrier, and the third rotation member comprises the ring gear.

4. A clutch control device as defined in claim 1, wherein the running condition detecting means comprises a sensor for detecting a ratio of a rotation speed of the third rotation member and a rotation speed of the input shaft, and the controlling means comprises a microprocessor programmed to control the first valve so as to engage the power recirculation mode clutch and disengage the direct mode clutch when the ratio of the rotation speed of the third rotation member and the rotation speed of the input shaft is less than a predetermined value, and disengage the power recirculation mode clutch and engage the direct mode clutch when the ratio of the rotation speed of the third rotation member and rotation speed of the input shaft is greater than the predetermined value.

5. A clutch control device as defined in claim 2, wherein the direct mode clutch is designed to be engaged when the oil pressure is supplied to the direct mode clutch and disengaged when the oil pressure is not supplied to the direct mode clutch, the power recirculation mode clutch is designed to be engaged when the oil pressure is supplied to the power recirculation mode clutch and disengaged when the oil pressure is not supplied to the power recirculation mode clutch, the first valve comprises a valve body which cuts off supply of the oil pressure to one of the direct mode clutch and power recirculation mode clutch by displacing to a predetermined position, and the simultaneous engagement preventing means comprises a cam which responds to a variation of the speed ratio of the continuously variable transmission, and a lock member driven by the cam which fixes the valve body in the predetermined position.

6. A clutch control device as defined in claim 5, wherein the first valve comprises a valve which selectively supplies the oil pressure to the direct mode clutch and the power recirculation mode clutch, and the device further comprises a direct mode clutch control valve which controls the oil pressure supplied to the direct mode clutch, a power recirculation mode clutch control valve which controls the oil pressure supplied to the power recirculation mode clutch, and a second valve comprising a valve body which displaces between a first position wherein the direct mode clutch control valve is connected to the direct mode clutch and the power recirculation mode clutch control valve is connected to the power recirculation mode clutch, and a second position wherein the first valve is connected to the direct mode clutch and power recirculation mode clutch.

7. A clutch control device as defined in claim 6, wherein the device further comprises a member which displaces the valve body of the second valve between the first position and second position according to a displacement of the cam.

8. A clutch control the device as defined in claim 5, wherein the device further comprises a direct mode clutch control valve which regulates the oil pressure supplied to the direct mode clutch according to a signal pressure and a direct mode clutch solenoid which generates the signal pressure, and the valve body of the first valve comprises a valve body which displaces between the predetermined position and another position in response to the signal pressure.

9. A clutch control device as defined in claim 8, wherein the first valve comprises a spring which elastically supports the valve body in the predetermined position, and a port which applies the signal pressure to the valve body against the spring.

10. A clutch control device as defined in claim 2, wherein the direct mode clutch is designed to be engaged when the oil pressure is supplied to the direct mode clutch and disengaged when the oil pressure is not supplied to the direct mode clutch, the power recirculation mode clutch is designed to be engaged when the oil pressure is supplied to the power recirculation mode clutch and disengaged when the oil pressure is not supplied to the power recirculation mode clutch, the first valve comprises a valve body which cuts off supply of the oil pressure to one of the direct mode clutch and the power recirculation mode clutch by displacing to a predetermined position, and the simultaneous engagement preventing means comprises an actuator which can lock the valve body in the predetermined position, and a microprocessor programmed to: determine whether or not the speed ratio of the continuously variable transmission is larger than the first speed ratio lcC, and control the actuator so as to lock the valve body in the predetermined position when the speed ratio of the continuously variable transmission is not larger than the speed ratio lcC.

11. A clutch control device as defined in claim 10, wherein the device further comprises a sensor for detecting a rotation speed of the input shaft, and the microprocessor is further programmed to increase the first speed ratio lcC the higher the rotation speed of the input shaft.

12. A clutch control device as defined in claim 2, wherein the predetermined specific region comprises a region corresponding to a rotation synchronous point wherein the rotation speed of the third rotation member in a power recirculation mode wherein the power recirculation mode clutch is engaged and the direct mode clutch is disengaged, is equal to the rotation speed of the third rotation member in a direct mode wherein the power recirculation mode clutch is disengaged and the direct mode clutch is engaged.

13. A clutch control device as defined in claim 12, wherein the first speed ratio lcC is set between the speed ratio of the continuously variable transmission corresponding to a geared neutral point where the rotation of the third rotation member stops in the power recirculation mode, and the speed ratio of the continuously variable transmission corresponding to the rotation synchronous point.

14. A clutch control device as defined in claim 2, wherein the direct mode clutch is designed to be engaged when the oil pressure is supplied to the direct mode clutch and disengaged when the oil pressure is not supplied to the direct mode clutch, the power recirculation mode clutch is designed to be engaged when the oil pressure is supplied to the power recirculation mode clutch and disengaged when the oil pressure is not supplied to the power recirculation mode clutch, the device further comprises a direct mode clutch control valve which controls the oil pressure supplied to the direct mode clutch according to a direct mode clutch control signal pressure, and a power recirculation mode clutch control valve which controls the oil pressure supplied to the power recirculation mode clutch according to a power recirculation mode clutch control signal pressure, and the simultaneous engagement preventing means comprises an inhibitor valve which prevents either one of an input of the direct mode clutch control signal pressure to the direct mode clutch control valve and an input of the power recirculation mode clutch control signal pressure to the power recirculation mode clutch control valve.

15. A clutch control device as defined in claim 14, wherein the inhibitor valve comprises a valve which prevents the input of the power recirculation mode clutch control signal pressure to the power recirculation mode clutch control valve when the oil pressure supplied to the direct mode clutch exceeds a predetermined pressure.

16. A clutch control device as defined in claim 14, wherein the inhibitor valve comprises a valve which prevents the input of the direct mode clutch control signal pressure to the direct mode clutch control valve when the oil pressure supplied to the power recirculation mode clutch exceeds a predetermined pressure.

* * * * *